(12) United States Patent
Kakigi et al.

(10) Patent No.: US 7,106,461 B2
(45) Date of Patent: Sep. 12, 2006

(54) IMAGE RECORDING DEVICE AND IMAGE RECORDING METHOD

(75) Inventors: Nobuyoshi Kakigi, Chiba (JP); Yuichi Hosoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 09/908,696

(22) Filed: Jul. 20, 2001

(65) Prior Publication Data
US 2002/0054350 A1    May 9, 2002

(30) Foreign Application Priority Data
Jul. 24, 2000  (JP)  ............................. 2000-223137

(51) Int. Cl.
*G06K 15/16* (2006.01)
*H04N 1/21* (2006.01)

(52) U.S. Cl. ................ 358/1.12; 358/1.16; 348/207.2; 348/231.1; 348/231.7

(58) Field of Classification Search ............... 358/1.16, 358/1.15, 1.9, 1.12, 1.17; 271/297, 298; 700/232; 348/231.5, 231.6, 231.7, 231.3, 348/207.2
See application file for complete search history.

(56) References Cited

U.S. PATENT DOCUMENTS

| | | | | |
|---|---|---|---|---|
| 5,308,058 A | * | 5/1994 | Mandel et al. | 271/289 |
| 6,421,582 B1 | * | 7/2002 | Wada | 700/232 |
| 6,426,801 B1 | * | 7/2002 | Reed | 358/1.16 |
| 6,600,570 B1 | * | 7/2003 | D'Alessandro et al. | 358/1.12 |
| 6,661,529 B1 | * | 12/2003 | Sanbongi et al. | 358/1.15 |
| 6,714,313 B1 | * | 3/2004 | Sugaya | 358/1.15 |

* cited by examiner

*Primary Examiner*—Scott A. Rogers
(74) *Attorney, Agent, or Firm*—Fitzpatrick, Cella, Harper & Scinto

(57) ABSTRACT

Attached information is designated, and it is discriminated whether or not there is a paper output port corresponding to attached information read from a storage unit for storing image data and attached information about the image data. If it is determined there is a corresponding paper output port, then the paper output port is determined as a selected paper output port. If it is determined there is not a corresponding paper output port, then an available paper output port is determined as a selected paper output port. Thus, recorded images can be automatically discriminated based on the attached information.

20 Claims, 53 Drawing Sheets

FIG. 6

PRINTING DESIGNATION IMAGE ON IMAGE RECORDING DEVICE  104

PRINTING MEMORY CARD

IMAGE DESIGNATION: | INDEX+ALL IMAGES ▼ |

MEDIA:
- PLAIN PAPER
- POSTCARD
- PHOTOGRAPH
- GLOSSY PAPER
- OHP SHEET

SORT METHOD:
- OWNER
- DATE
- TITLE
- DISTRIBUTION USER
- DIRECTORY

IS IT OK TO START PRINTING IN THE ABOVE SETTING?

[ OK ]   [ CANCEL ]

FIG. 11

VC · · · VIDEO CONTROLLER
EC · · · ENGINE CONTROLLER

| SIGNAL NAME | DIRECTION | CONTENTS |
|---|---|---|
| /CPRDY | VC → EC | A SIGNAL SHOWING THAT A VIDEO CONTROLLER 103 IS IN A STATUS CAPABLE OF COMMUNICATING WITH AN ENGINE CONTROLLER 105 |
| /PPRDY | VC ← EC | A SIGNAL SHOWING THAT THE ENGINE CONTORLLER 105 IS IN A STAND-BY STATUS CAPABLE OF COMMUNICATING WITH THE VIDEO CONTORLLER 103 |
| /RDY | VC → EC | A SIGNAL SHOWING THAT THE ENGINE CONTROLLER 105 IS IN A STAND-BY STATUS CAPABLE OF PRINTING |
| /PRNT | VC → EC | A SIGNAL FOR THE VIDEO CONTROLLER 103 TO MAKE A REQUEST FOR A PRINTING TO THE ENGINE CONTROLLER 105 |
| /VSREQ | VC ← EC | A SIGNAL FOR THE ENGINE CONTROLLER 105 TO MAKE A REQUEST FOR A VERTICAL SYNCHRONIZING SIGNAL TO THE VIDEO CONTROLLER 103 |
| /VSYNC | VC → EC | THE VERTICAL SYNCHRONIZING SIGNAL WHICH THE VIDEO CONTROLLER 103 OUTPUTS TO THE ENGINE CONTROLLER 105 |
| /BD | VC ← EC | THE HORIZONTAL SYNCHRONIZING SIGNAL WHICH THE ENGINE CONTROLLER 105 OUTPUTS TO THE VIDEO CONTROLLER 103 |
| /CCRT | VC ← EC | A SIGNAL NOTIFYING TO THE VIDEO CONTROLLER 103 OF A STATUS CHANGE WHEN THE CONTENT OF A STATUS NOT RELATING DIRECTLY TO A RDY SIGNAL HAS CHANEGED AND BECOMES "TRUE" |
| /SCLK | VC → EC | A SYNCHRONIZING CLOCK SIGNAL FOR A SERIAL COMMUNICATION |
| /CMD | VC → EC | A COMMAND SIGNAL BY WHICH THE VIDEO CONTROLLER 103 INSTRUCTS THE ENGINE CONTROLLER 105 |
| /CBSY | VC → EC | A STROBE SIGNAL FOR OUTPUTTING A COMMAND |
| /STS | VC ← EC | A SIGNAL SHOWING A STATUS INSIDE THE ENGINE WHICH IS OUTPUTED TO A COMMAND FROM THE VIDEO CONTROLLER 103 |
| /SBSY | VC ← EC | A SIGNAL FOR A STATUS OUTPUT |

FIG. 12

VC · · · VIDEO CONTROLLER
OC · · · OPTION CONTROLLER
EC · · · ENGINE CONTROLLER

| SIGNAL NAME | DIRECTION | CONTENTS |
|---|---|---|
| SERIAL COMMUNICATION I/F | VC ↔ OC | I/F WHICH PERFORMS A FEED DESIGNATION TO A FEED OPTION, A DISCHARGE DESIGNATION TO A DISCHARGE OPTION, A COMMAND DESIGNATION OR THE LIKE THROUGH A COMMON MEMORY |
| /OPTRDY | VC ← OC | SHOWS A READY STATUS FOR A FUNCTION WITH WHICH A DESIGNATION OPTION APPARATUS IS PROVIDED |
| /POUTT | EC → OC | A TIMING SIGNAL BY WHICH A PRINTER MAIN BODY DISCHARGES A RECORDING PAPER |
| /PFEDT | EC → OC | A TIMING SIGNAL BY WHICH THE PRINTER MAIN BODY RECEIVES A RECORDING PAPER FROM AN OPTION UNIT |
| /SPCNG | EC → OC | A SIGNAL FOR SLOWING DOWN A SPEED OF THE RECORDING PAPER CONVEYED AT HIGH SPEED INSIDE THE POTION APPARATUS AND ADJUSTING IT TO THE CONVEYING SPEED OF THE PRINTER MAIN BODY |

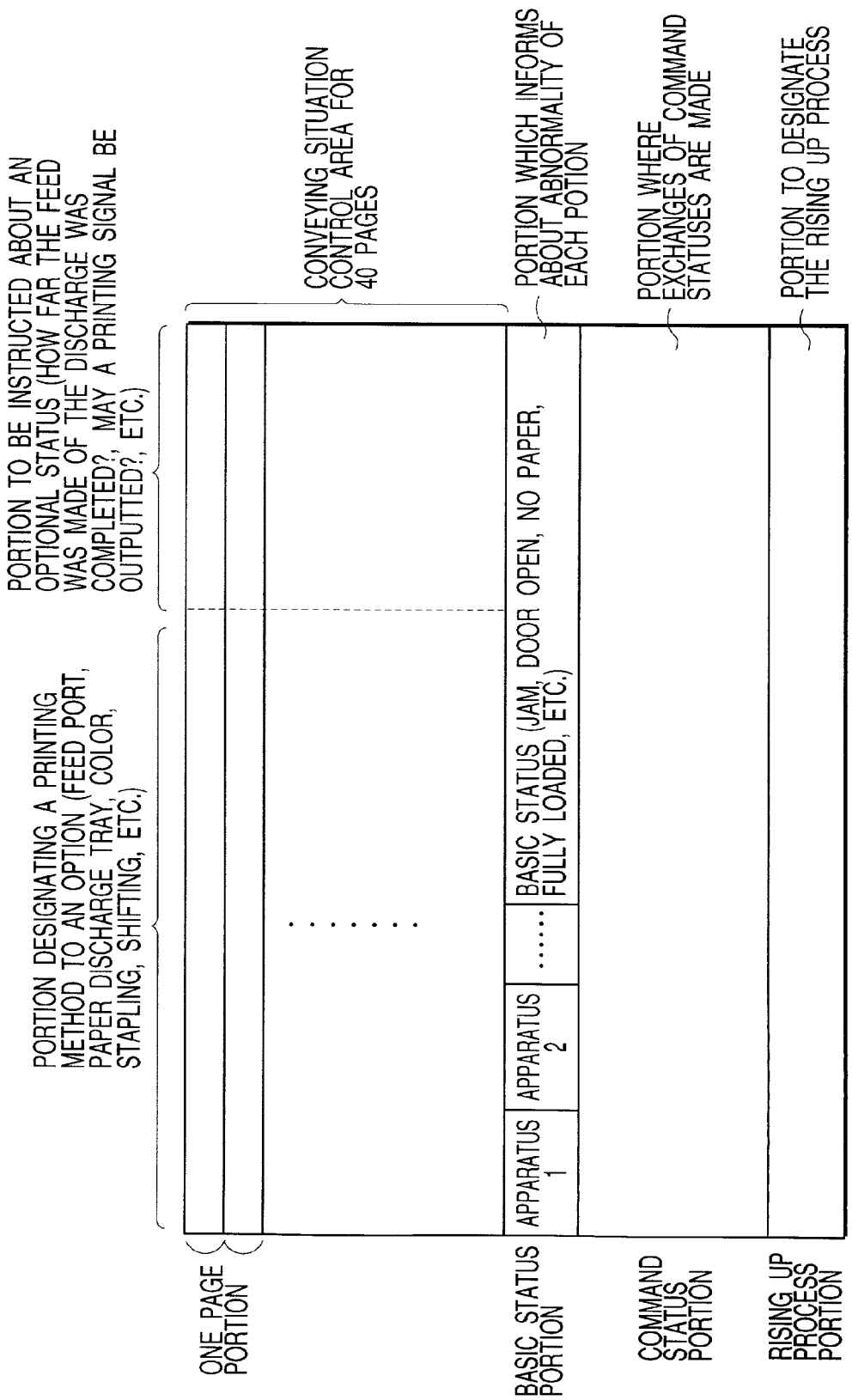

FIG. 32A

MENU

PHOTOGRAPHING MODE
PLAY BACK MODE
EDITING MODE
PRINTING SETTING
*PRINTING EXECUTION

EXECUTE THE FOLLOWING ITEMS

| DECIDE (→) | RETURN (←) |

FIG. 32B

PRINTING EXECUTION

UNDER PRINTING EXECUTION ... 50%
*INTERRUPT PRINTING
 DISPLAY JOB CONTENT
 DISPLAY DISCHARGE CONDITION OF PRINTER

RETURN TO MENU IMAGE

| DECIDE (→) | RETURN (←) |

FIG. 35
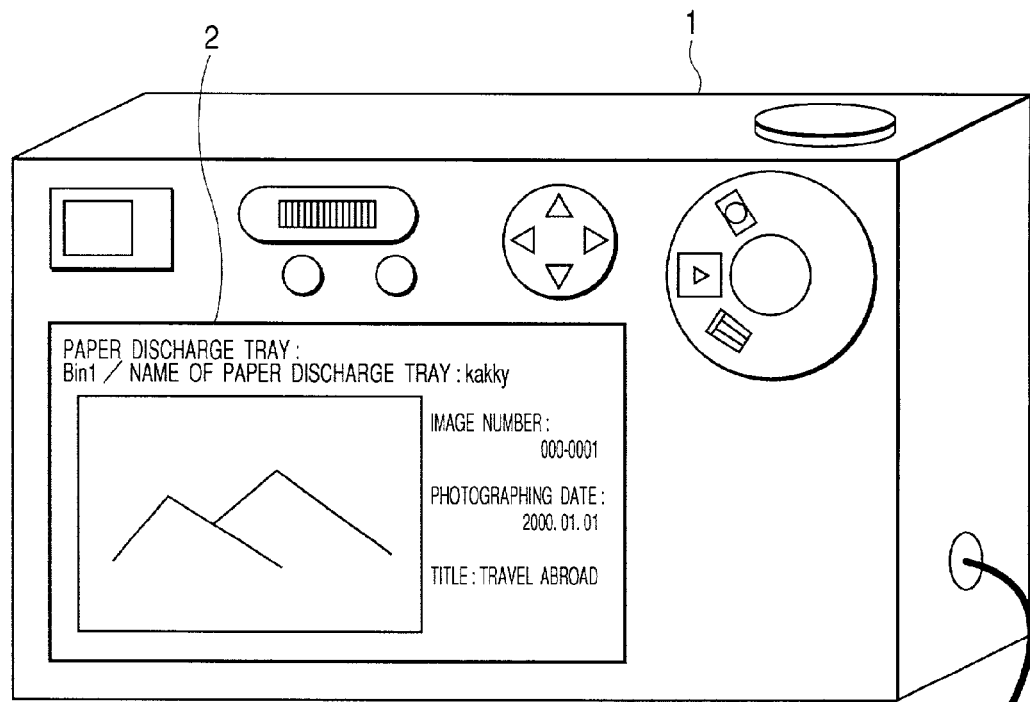
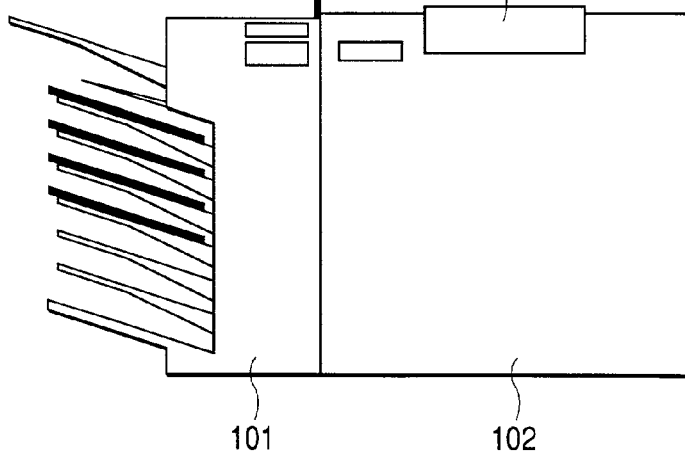

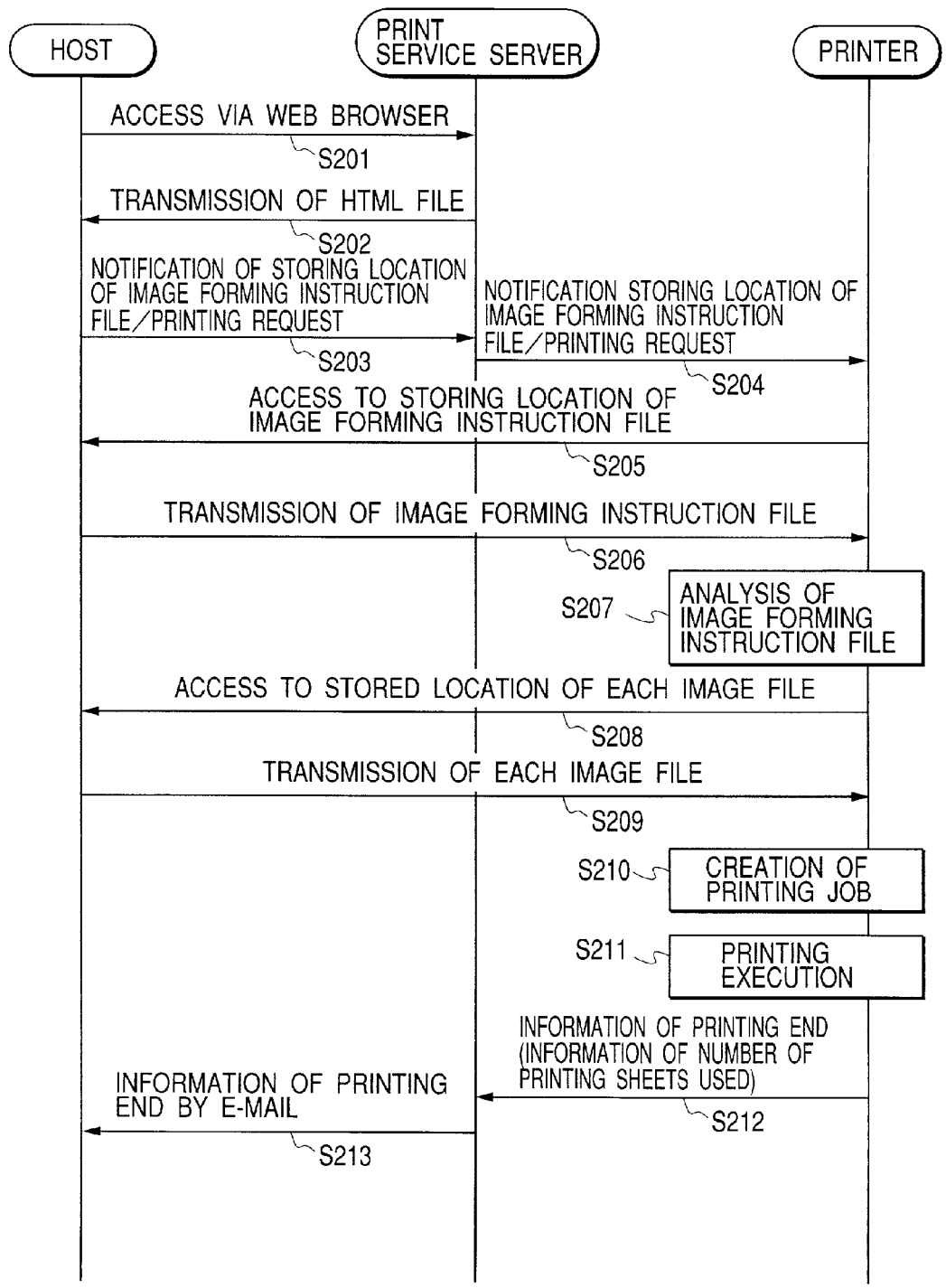

FIG. 39

REQUEST OF PRINT SERVICE

TRUSTEE SERVICE COMPANY:

[ PATENT PRINTING SERVICE ▼ ]

STORE LOCATION OF IMAGE FORMING INSTRUCTION FILE

HOST INFORMATION (IP ADDRESS):

[ 111.2.33.44 ]

DIRECTORY INFORMATION:

[ /user/share/doc/www/print/form.dpf ]

[ EDIT OF IMAGE FORMING INSTRUCTION FILE ]

RECEPTION METHOD:

☑ PERSONAL DELIVERY AT SERVICE WINDOW

SPECIFIED SERVICE WINDOW: [ PATENT PRINTING SERVICE SHIMOMARUKO BRANCH ▼ ]

☐ HOME DELIVERY

[ PRINT START ]  [ PRINT RESERVATION ]

FIG. 40

```
┌─────────────────────────────────────────────────────────┐ 401
│ ▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓  □ □ □   │
│ FILE  EDIT  DISPLAY  HELP                               │
│ ┌────┬────┬────┬──────┐                                 │
│ │BACK│NEXT│STOP│SEARCH│                                 │
│ └────┴────┴────┴──────┘                                 │
│ BOOKMARK      LOCATION: │http//:www.printservice.aa.bb/form/index.html│
│                                                         │
│   EDIT OF IMAGE FORMING INSTRUCTION FILE                │
│                                                         │
│     STORE LOCATION OF IMAGE                             │
│     FORMING INSTRUCTION FILE (DIRECTORY): [REFERENCE]   │
│    ┌──────────────────────────────────────────────┐     │
│    │ /user/share/doc/www/print/form.dpf           │     │
│    └──────────────────────────────────────────────┘     │
│                                                         │
│     SPECIFICATION OF IMAGE FILE: [REFERENCE]            │
│    ┌──────────────────────────────────────────────┐     │
│    │ /user/share/doc/www/print/travel/000-0000.jpg│     │
│    │ /user/share/doc/www/print/travel/000-0001.jpg│     │
│    │ /user/share/doc/www/print/travel/000-0002.jpg│     │
│    │ /user/share/doc/www/print/travel/000-0003.jpg│     │
│    │ /user/share/doc/www/print/home/002-0002.jpg  │     │
│    │ /user/share/doc/www/print/home/002-0003.jpg  │     │
│    │ /user/share/doc/www/print/home/002-0005.jpg  │     │
│    └──────────────────────────────────────────────┘     │
│    [EDIT OF IMAGE FILE]  [EDIT OF IMAGE ATTACHED INFORMATION]│
│                                                         │
│   USER INFORMATION:                                     │
│                                                         │
│       NAME: │TARO SHIMOMARUKO│                          │
│                                                         │
│       E-MAIL ADDRESS: │taro@xx.yy│                      │
│                                                         │
│       ADDRESS: │0-1-2 SHIMOMARUKO OTA-KU TOKYO│         │
│                                                         │
│       TELEPHONE NUMBER: │0120-123-456│                  │
│                                                         │
└─────────────────────────────────────────────────────────┘
```

FIG. 43
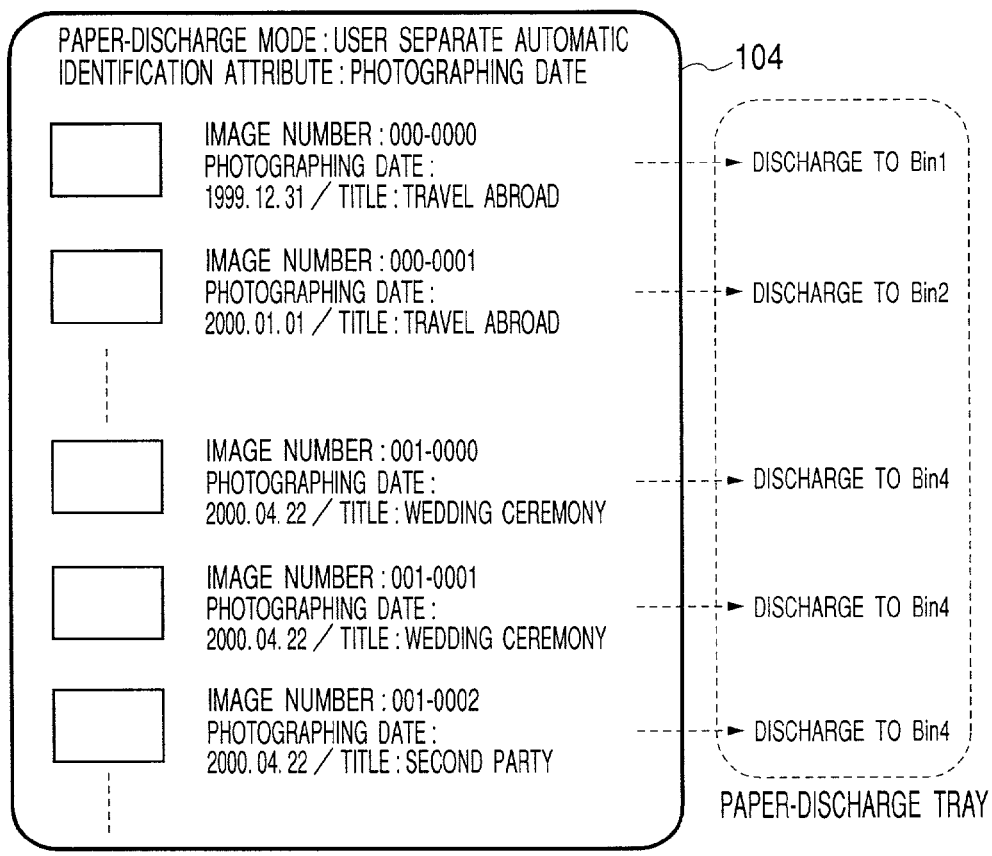
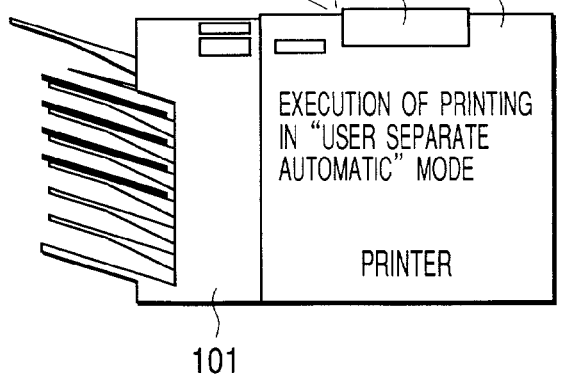

FIG. 46

```
┌─────────────────────────────────────────────────────────┐ 104
│ PRINTING INSTRUCTION                                    │
│                                                         │
│   IMAGE DESIGNATION: │ INDEX + ALL IMAGES      ▼ │      │
│  ─────────────────────────────────────────────────────  │
│   MEDIA:                      SORT METHOD:              │
│   ┌──────────────────┬─┐      ┌──────────────────┬─┐    │
│   │ PLAIN PAPER      │▲│      │ OWNER            │▲│    │
│   │ POSTCARD         │ │      │ DATE             │ │    │
│   │ PHOTOGRAPH       │ │      │ TITLE            │ │    │
│   │ GLOSSY PAPER     │ │      │ DISTRIBUTION USER│ │    │
│   │ OHP SHEET        │▼│      │ DIRECTORY        │▼│    │
│   └──────────────────┴─┘      └──────────────────┴─┘    │
│  ─────────────────────────────────────────────────────  │
│  IS IT OK TO START PRINTING IN THE ABOVE SETTING ?      │
│                                                         │
│                          ┌────────┐    ┌────────┐       │
│                          │   OK   │    │ CANCEL │       │
│                          └────────┘    └────────┘       │
└─────────────────────────────────────────────────────────┘
```

IMAGE RECORDING DEVICE AND IMAGE RECORDING METHOD

BACKGROUND OF THE INVENTION

1. Field of the Invention

The present invention relates to an image recording device and an image recording method for obtaining image information and attached information about an image stored in an information storage medium or an information storage device, and printing out predetermined image data under predetermined output control at each of a plurality of paper output ports of the image recording device to which an option device can be connected.

The present invention also relates to an image recording device and an image recording method for obtaining image information and attached information about an image in the memory of a data processing device, etc. through Internet, generating a printing job, and printing out predetermined image data under predetermined output control based on the generated printing job.

2. Related Background Art

There has been a conventional picture print service as a common method of regenerating image data a user has at hand. This print service is performed by: a user taking a semitransparent negative cover (negative holder) containing a roll of developed film with the requested number of prints written or marked to a print shop, etc.; and the print shop designating an image to be regenerated (printed) to print only the designated image.

Recently, a photo CD system has been developed. In this system, an image in film is read, and the image data is written on CD-ROM, and is further read from the CD-ROM to regenerate and display on an image display device such as a display, etc. In this photo CD system, a computer system reads the image data recorded on the CD-ROM and outputs on a high quality image printer, thereby obtaining a printed image. Since the high quality image printer is expensive, and it is hard for a personal user to own it, it is common that a user requests a print shop for a print service to obtain a printed image.

When a user requests a print service, he or she normally presents CD-ROM and a memo containing the information (for example, an image number, etc. confirmed using an index print, etc.) designating image data recorded on the CD-ROM.

Furthermore, with the improvement of computer technology and the spread of personal computers and image input devices such as digital cameras, users have become able to process high precision digital image data. The image data is stored in a predetermined information storage medium in various image file formats such as the TIFT, PICT, JPEG, RAW, etc., and is normally output on a printer connected to a computer owned by a personal user.

However, since an output result from a personally owned printer is normally inferior to an output result by a print service of a developer, a print shop, a DPE shop, or a personal computer shop, there are not a few requests for print services.

When a user receives a print service, it is recently possible to request to print image data by transmitting the image data through a communications line. However, it is common to present or take an information storage medium storing image data to a service shop. In this case, it is necessary to indicate a desired image in the image data stored in an information storage medium, and a user who requests a print service has to notify a service shop of the number or name of the image to specify a desired image in the image data stored in the information storage medium.

On the other hand, the image print service shop receives the instruction written on the memo, etc. of the user who requests the print service, manually selects and prints the user specified image from the image data stored in the information storage medium.

Normally, since the computer system for the above mentioned print service requires complicated operations, it is not easy for a common staff of a service shop to correctly select and print an image to be printed. Additionally, it is a laborious process to actually select and print a user desired image data from the image data stored in the information storage medium, thereby limiting the printing time.

Under the situation, a method of quickly obtaining a printed image by automatically specifying a desired image from among a plurality of images stored in an information storage medium has recently been suggested.

FIGS. 53A to 53C show examples of the configurations of a storage medium 5001 as an information storage medium.

In FIG. 53A, the storage medium 5001 is mapped into four independent areas, that is, a reserved area 5002, a file allocation table area 5003 (hereinafter referred to as a FAT area), a root directory area 5004, and a file area 5005.

The reserved area 5002 stores, for the storage medium 1, the size of the reserved area 5002, the size of the FAT area 5003, and the number of entries in the root directory area 5004. The FAT area 5003 stores the use of the storage medium space in the file area 5005 of the storage medium 5001. The root directory area 5004 stores directory entry information indicating the information such as a file name, a size, a position, etc. stored in the storage medium 5001. The file area 5005 stores image generation indication data and actual image data.

For convenience of explanation, the image generation indication data is expressed as DPFxxx as shown in FIG. 53B, and the image data is expressed as IMGxxx as shown in FIG. 53C (where xxx indicates characters or numerals for identification of plural pieces of image generation indication data and image data).

Next, as an example of a conventional print control process, a process of generating and outputting a desired print image by a printing device using image data recorded in the storage medium 5001 as shown in FISG. 53A to 53C is described below by referring to the flowchart shown in FIG. 54.

In FIG. 54, in step S5101, it is confirmed whether or not the storage medium 5001 has been set in the data reading unit in the printing device (refer to FIGS. 9 and 13 described later). If it is confirmed that the storage medium 5001 has been set, control is passed to step S5102.

In step S5102, it is checked in the data reading unit whether or not there is a file having the name of DPFxxx by referring to the contents of the root directory area 5004 stored in the storage medium 5001. If there is no DPFxxx file, the printing device terminates the operation. If there is a DPFxxx file, control is passed to step S5103, and the first DPFxxx file (FIG. 53B) in the file area 5005 is read.

In step S5104, the first file name IMGxxx indicated in the read DPFxxx file is read. In step S5105, the image data (FIG. 53(C)) stored in the file name IMGxxx read in step S5104 is read.

In step S5106, an image generating process is performed by an image generating unit (refer to FIG. 13 described later) in the printing device on the image data read in step S5105, and bit map image data is generated. The generated bit map image data is printed in step S5107 by the image output unit (refer to FIG. 13 described later) in the printing device.

In step S5108, it is checked whether or not there is another IMGxxx indicated in the DPFxxx file being read (refer to FIG. 53B). If another IMGxxx is indicated, then control is passed to step S5109. If there is no other IMGxxx indicated, control is passed to step S5110. In step S5109, the IMGxxx file is read, and control is passed to step S5105.

In step S5110, the storage medium 5001 is accessed. If there is another DPFxxx file, then control is passed to step S5111, the next DPFxxx file is read, and control is passed to step S5104. If there is no other DPFxxx files, then the operation of the printing device terminates.

However, there has been the following problems in the above mentioned conventional system.

(First Problem)

Recently, computers are interconnected through a LAN (local area network), and a LAN connection can be made not only to a printer, but also to various other peripheral devices such as a multifunction image processing device, etc. having copying and facsimile functions. Therefore, an image recording device has realized a method of outputting paper in various paper output modes satisfying all needs of a plurality of users sharing a network, for example, a user separately fixing (mail box) mode, a user separately automatic (job separate) mode, a sort mode, a stack mode, etc.

In the user separately fixing mode and the user separately automatic mode, a unique name is assigned to each paper output port of an image recording device, and the paper output ports are discriminated based on the names.

The difference between the modes will be described below. In the user separately fixing mode, paper is output by registering in advance an identification name for each paper output port of an image recording device, and specifying the identification name as a selected paper output port when a printing process is performed, thereby specifying and using a selected paper output port by a user easily discriminated name.

On the other hand, in the user separately automatic mode, for example, a user name of a print requesting user is dynamically registered as an unused and available paper output port during a printing process, and the paper output port registered when the printing process is first performed is retrieved to output paper to the paper output port if the same user specifies a print request again, thereby appropriately performing a printing job for each user without prompting a user to specify a correct selected paper output port when the printing process is performed.

In the sort mode, a print of a printing job is sorted into the specified number of paper output ports using a series of paper output ports. In the stack mode, paper is continuously output to the same paper output port in a printing job until it is full. When it is full, the paper output port is switched to the next highest priority paper output port to which paper is output. These paper output methods are well known.

As described above, when a printing process is performed by a host computer through a printer driver, various settings are made by selecting a paper output mode, etc., and various processes can be performed in various paper output modes. However, when a printing process is performed using a digital camera or performed directly from an information storage medium such as a memory stick, etc., there are no means for specifying a medium for performing the printing process or for specifying a selected paper output port, thereby having a user prints, and requiring a laborious and time-consuming process in selecting prints for personal use, or various selecting operations in a print service operations for each clients, etc.

(Second Problem)

For example, in a photo print service, in the embodiment in which an information storage medium such as a negative cover, CD-ROM, etc. storing image data is directly taken to a service shop in the above mentioned conventional technology, a client has to go directly to a service shop, etc. to request them for prints, and has to go to the shop again to obtain requested prints, thereby requiring a considerable time and laborious steps.

Furthermore, when a user requests a service shop for a print service, he or she has to specify a desired image to be printed, and write the number of prints, etc. on a memo, etc. in a predetermined format, and the staff of the service shop has to follow the information written on the memo in selecting the image to be printed, etc. As a result, the staff also requires a laborious operation.

In addition, when a print is made through an information storage medium such as CD-ROM, image data is stored in an information storage medium such as CD-ROM, etc., and a user has to check contents of the data in advance, and prepare a memo.

When image data is transmitted through a communications line, a user does not have to go to a service shop to request a print service, but has to specify an image to be printed and the number of prints by preparing a memo. Therefore, a staff at the service shop still requires some laborious steps.

On the other hand, with the recent spread of personal computers, a large number of common users have installed their own personal computers at home. In addition, without personal computers, users are allowed to realize connections to Internet using domestic electric appliances such as a TV set, a game machine, etc. having the functions of personal computers. Furthermore, with the remarkable spread of mobile terminals, data has been transmitted and received through portable handy phones, etc. Thus, not only computers but also all media have been interconnected regardless of cable or radio.

That is, when a printing process is performed using electronic image data without using any physical item such as a negative, etc., any user can easily issue an instruction to make a print through a personal computer, a portable handy phone, etc. at home. Accordingly, in making copies of a photograph, etc., a user can request from home any service shop to make copies.

However, even with the spread of personal computers at home, the above mentioned print service, etc. has not been effectively used. As a result, these services have not been efficiently provided.

SUMMARY OF THE INVENTION (With Regard to the First Problem)

A first object of the present invention is to provide an image recording device and an image recording method capable of automatically realizing a paper output method satisfying all needs of users in performing a printing process from a storage device in an external device such as a digital camera, etc. or from a storage medium such as a memory card, etc. regardless of the existence of a host computer, by issuing an instruction to perform a printing process with a paper output mode selected through an existing device such as a digital camera, a printing device, etc., and also capable of efficiently performing various selecting operations such as selection of prints for each personal user or for each client.

(With Regard to the Second Problem)

A second object of the present invention is to provide an image recording device and an image recording method capable of requesting any service shop from home to copy any number of prints of desired image data by allowing an image recording device to be notified of necessary information by adding information such as an image data storage location, a print destination, the number of prints, a paper output method, a print reception method, a payment method, etc. to the electronic information communicated between an image recording device such as a printer, etc. and an external device such as a personal computer, a mobile terminal, a digital camera, etc. in a print service such as making copies of a photograph, etc.

A third object of the present invention is to provide an image recording device and an image recording method capable of allowing a user to specify the delivery of a print service to a place where an image recording device is installed, a nearest service shop (a convenience store, a developer, a personal computer shop, etc.) or to home, etc. thereby realizing the convenience of users and satisfying the need of users.

A fourth object of the present invention is to provide an image recording device and an image recording method in which a print instruction is all stored in the electronic information, a staff of a service shop is free of selection of an image according to a user memo, etc., thereby reducing a laborious steps in a printing process, and realizing an efficient print service.

A fifth object of the present invention is to provide an image recording device and an image recording method capable of automatically realizing a paper output method satisfying all needs of users in performing a printing process directly from a host computer in a network, a storage device in an external device such as a digital camera, etc. or directly from a storage medium such as a memory card, etc. without an instruction of the host computer, by issuing an instruction to perform a printing process with a paper output mode selected through an existing device such as a digital camera, a printing device, etc., and also capable of efficiently performing various selecting operations such as selection of prints for each personal user or for each client.

To attain the above mentioned objects, the image recording device according to the present invention includes: designation means for designating attached information; discrimination means for discriminating whether or not there is a paper output port corresponding to the attached information read from storage means for storing image data and attached information about the image data; and determination means for determining, if the discrimination means discriminates that there is a corresponding paper output port, the paper output port as a selected paper output port and determining an available paper output port as a selected paper output port if the discrimination means discriminates that there is not a corresponding paper output port.

The image recording method according to the present invention includes: a designating step of designating attached information; a discriminating step for discriminating whether or not there is a paper output port corresponding to the attached information read from storage means for storing image data and attached information about the image data; and a determining step of determining, if it is discriminated in the discriminating step that there is a corresponding paper output port, the paper output port as a selected paper output port and determining an available paper output port as a selected paper output port if it is discriminated in the discriminating step that there is not a corresponding paper output port.

A computer-readable program according to the present invention includes: a designating step of designating attached information; a discriminating step for discriminating whether or not there is a paper output port corresponding to the attached information read from storage means for storing image data and attached information about the image data; and a determining step of determining, if it is discriminated in the discriminating step that there is a corresponding paper output port, the paper output port as a selected paper output port and determining an available paper output port as a selected paper output port if it is discriminated in the discriminating step that there is not a corresponding paper output port.

Furthermore, a computer-readable program stored in a storage medium according to the present invention includes: a designating step of designating attached information; a discriminating step for discriminating whether or not there is a paper output port corresponding to the attached information read from storage means for storing image data and attached information about the image data; and a determining step of determining, if it is discriminated in the discriminating step that there is a corresponding paper output port, the paper output port as a selected paper output port and determining an available paper output port as a selected paper output port if it is discriminated in the discriminating step that there is not a corresponding paper output port.

BRIEF DESCRIPTION OF THE DRAWINGS

FIG. 6 shows an example of a UI screen used by a user to issue a print instruction on an image recording device;

FIG. 11 shows contents and direction of a signal communicated between a video controller and an engine controller according to the first embodiment;

FIG. 12 shows serial communications performed by an option controller, a video controller, and an engine controller, and contents and direction of a signal according to the first embodiment;

FIG. 14 shows a type of memory shared with the video controller reserved in a RAM provided in the option controller according to the first embodiment;

FIGS. 32A and 32B show an example of a UI screen on which a user issues an instruction to perform a printing process using a digital camera according to the second embodiment;

FIG. 35 shows an example of the digital camera displaying in detail an image loaded at a specific paper output port of the image recording device to which the camera is attached according to the second embodiment;

FIG. 38 shows an operation of the system in which a user issues an instruction to perform a printing process on the image data stored in a host computer to a remote printer connected through Internet, and the printer prints out the image data in the user separately automatic mode at the instruction according to a sixth embodiment;

FIG. 39 shows an example of a Web browser UI screen on which a user issues a print request to a printer connected by the host computer through Internet according to the sixth embodiment;

FIG. 40 shows an example of a Web browser UI screen on which an image generation indication file is edited to issue a print request through Internet according to the sixth embodiment;

FIG. 43 shows an example of selecting an output image depending on the capture date, and shows the paper output control by a printer when a user designates the user separately automatic mode to the printer according to the seventh embodiment.

FIG. 46 shows an example of a UI screen on which a print instruction is issued in a printer panel operation based on an image generation indication file and an image file downloaded from the host computer according to the seventh embodiment;

DESCRIPTION OF THE PREFERRED EMBODIMENTS

Figure 1:
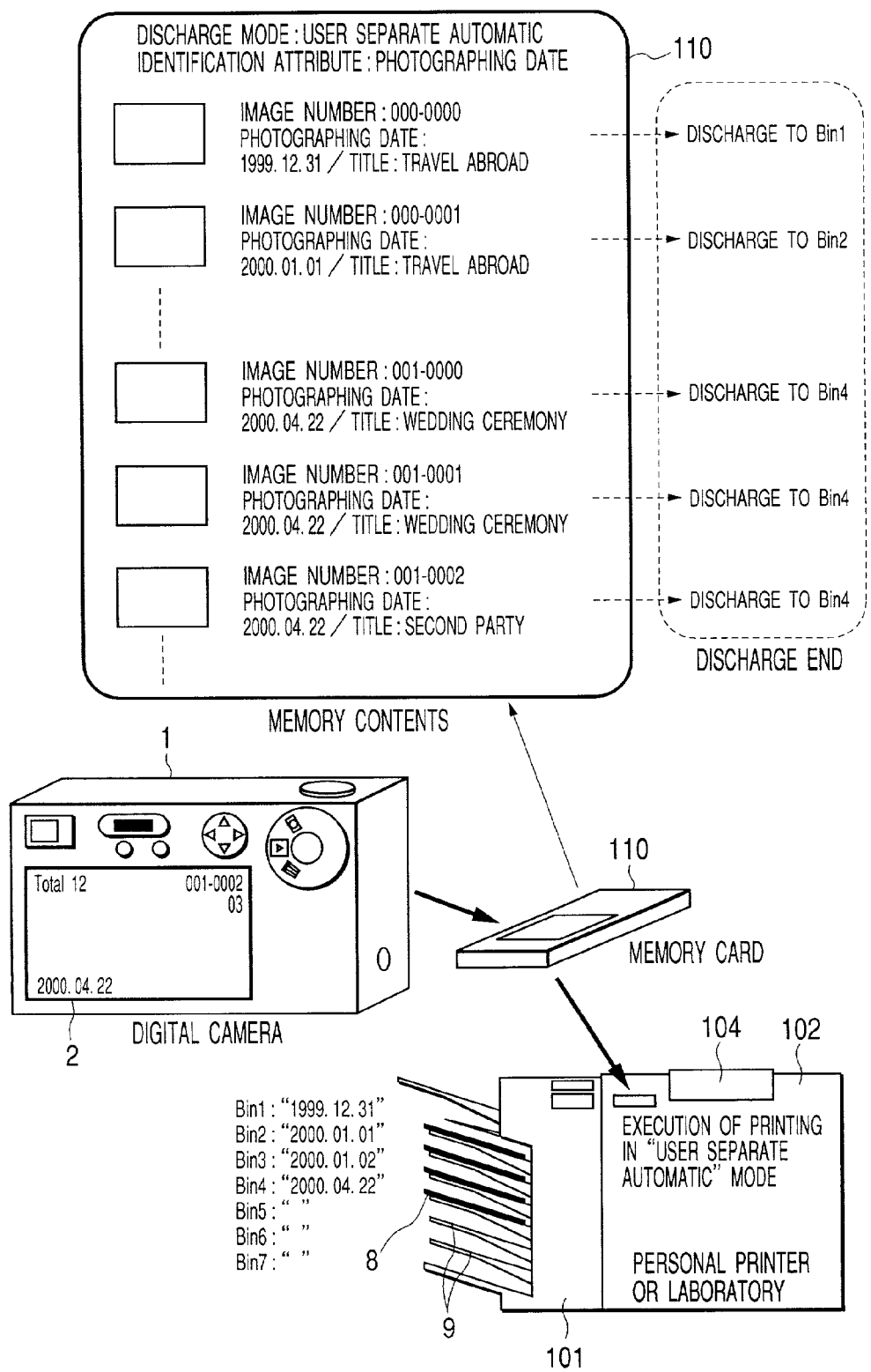
FIG. 1 shows a process of selecting a job according to date information in a memory card according to a first embodiment of the present invention.

The embodiments of the present invention will be described below with reference to the drawings.

(Summary)

First, the summary of the present invention will be described by means of practical examples.

(With Respect to the First Problem)

The first invention according to the present invention is an image recording device for discharging an output image to a desired paper discharge tray by using at least an image forming instruction data and an image relative information containing an image data and provides an image recording device, comprising: means for inputting the above described image relative information; means for reading a instruction data contained in the above described image forming instruction data based on a setting information which contains the above described image relative information, a selected file designation or the like; printing job forming means for forming a printing job based on the above described read instruction data and the image data; deciding means for deciding a paper discharge end based on a printing job received from the above described formed printing job or an outside device; paper discharge tray releasing means for releasing an identification name registered when a load capacity became zero; notifying means for notifying a using status of the paper discharge tray; and display means for performing a display based on notifying means for notifying a using status of the paper discharge tray and the above described notified contents.

The second invention according to the present invention provides the image recording device, wherein, when there have been a printing indication from an input portion such as a panel or the like, the printing indication from an external device and an installation of an information storage medium and the external device, the reading and process of the above described instruction data are performed based on the above described setting information which is settable from the external device such as the image recording device, the image inputting apparatus, the data processor or the like, and wherein identification name forming means for forming an identification name and printing job forming means for adding the identification name formed by the above described identification name forming means to a printing job and forming the printing job are provided.

The third invention according to the present invention provides an image recording device, wherein, when there have been a printing indication from an input portion such as a panel or the like, the printing indication from the external device and an installation of an information storage medium and the outside device, judgment means for judging whether the image recording device can perform a paper discharge based on the contents of the inputted or formed printing job and warning means for warning the user when the paper discharge can not be performed by the above described judgment means according to a designation are provided.

The forth invention according to the present invention provides the image recording device, which, based on the load factor detected by detection means for performing a three stage detection as to whether at least a paper is not loaded, the paper is loaded and the paper is fully loaded with a paper discharge tray, retrieves and decides a paper discharge tray matching to the identification name which is contained in the printing job or a paper discharge tray having a load factor of zero and registers an identification name for the paper discharge tray decided on that occasion.

The fifth invention according to the present invention provides the image recording device, wherein, when the load factor of each paper discharge tray detected by the above described detection means becomes zero, the paper discharge tray in use is released and a paper discharge of a new printing job is performed.

The sixth invention according to the present invention provides the image inputting apparatus, wherein, when there have been a printing indication from an input portion such as a panel or the like, the printing indication from the external device and an installation of an information storage medium and the external device, the reading and process of the above described instruction data are performed based on the above described setting information which is settable from the external device such as the image recording device, the image inputting apparatus, the data processor or the like, and wherein identification name forming means for forming an identification name and printing job forming means for adding the identification name formed by the above described identification name forming means to a printing job and forming the printing job are provided.

The seventh invention according to the present invention provides the image inputting apparatus, wherein, when there have been a printing indication from an input portion such as a panel or the like, the printing indication from the external device and an installation of an information storage medium and the external device, judgment means for judging whether the paper discharge can be performed based on the content of the printing job formed and warning means for warning the user when the paper discharge can not be performed by the above described judgment means according to the designation are provided.

The eighth invention according to the present invention provides the image inputting apparatus comprising display means for receiving notified contents by the above described notifying means and displaying a using status of the paper discharge tray.

The ninth invention according to the present invention provides a data processor, wherein, when there have been a printing indication from an input portion such as a panel or the like, the printing indication from the external device and a installation of an information storage medium and the external device, the reading and process of the above described instruction data are performed based on the above described setting information settable from the external device such as the image recording device, the image inputting apparatus, the data processor or the like, and wherein identification name forming means for forming an identification name and printing job forming means for adding to the printing job the identification name formed by the above described identification name forming means and forming the printing job are provide.

The tenth invention according to the present invention provides the data processor, wherein, when there have been a printing indication from an input portion such as a panel or the like, the printing indication from the external device and an installation of an information storage medium and the external device, judgment means for judging whether the paper discharge can be performed based on the content of the printing job formed and warning means for warning the user when the paper discharge can not be performed by the above described judgment means according to the designation are provided.

The eleventh invention according to the present invention provides the data processor comprising display means for receiving notified contents by the above described notifying means and displaying a using status of the paper discharge tray.

(With Respect to the Second Problem)

The twelveth invention according to the present invention provides the data processor comprising: means for inputting a storage location of an image forming instruction data inside the storage device; editing means for editing the above described image forming instruction data; designation means for designating the image recording device which performs a printing; receiving method inputting means for inputting a receiving method of printing matters; timing instruction means for instructing a printing timing; and host information input means for inputting a host information, wherein an transmission of the image forming instruction file, an transmission of the image file and a printing indication are performed to the image recording device.

The thirteenth invention according to the present invention provides the data processor comprising, display means for displaying the storage location of the above described image forming instruction data, the image file, the user information or the like and making it possible to renew each display content by selecting or editing it.

The fourteenth invention according to the present invention provides the data processor, which transmits the above described image forming instruction data edited by the above described editing means to a designated image recording device.

The fifteenth invention according to the present invention provides the data processor, which transmits the image data to the designated image recording device based on the above described image forming instruction data edited by the above described editing means.

The sixteenth invention according to the present invention is an image recording device, which discharges an output image to a desired paper discharge tray by using the image relative information containing at least the image forming instruction data and the image data, and which comprises: means for inputting the above described image relative information; means for reading the above described image forming instruction data and the above described image data based on a setting information containing the above described image relative information and a selection file designation or the like; printing job forming means for forming the printing job based on the above described read image forming instruction data and the image data; deciding means for deciding the paper discharge end based on the above described printing job formed or the printing job received from the outside; paper discharge tray release means for releasing the identification name registered when the load factor became zero; notifying means for notifying a using status of the paper discharge tray; and display means for performing a display based on the above described notified contents.

The seventeenth invention according to the present invention provides the image recording device, which makes a request for a transmission of the image forming instruction file to the storage location of the image forming instruction file contained in the printing indication information.

The eighteenth invention according to the present invention provides the image recording device, which comprises the image forming instruction data interpreting means for interpreting the above described image forming instruction data and makes a request for a transmitting of the image data to the storage location of the image file based on its designated contents.

The nineteenth invention according to the present invention provides the image recording device, which is settable from the external device such as the image recording device, the image inputting apparatus, the data processor or the like, and wherein, when there have been a printing indication from an input portion such as a panel or the like, the printing indication from the external device and an installation of an information storage medium and the external device, identification name forming means for reading and process the above described image forming instruction data based on the above described setting information and forming the identification name and printing job forming means for adding to the printing job the identification name formed by the above described identification name forming means and forming the printing job are provided.

The twentieth invention according to the present invention provides the image recording device, wherein, when there have been a printing indication from an input portion such as a panel or the like, the printing indication from the external device and an installation of an information storage medium and the external device, judgment means for judging whether the paper discharge can be performed based on the content of the printing job inputted or formed by the image recording device and warning means for warning the user when the paper discharge can not be performed by the above described judgment means according to the designation are provided.

The twenty first invention according to the present invention provides the image recording device, based on the load factor detected by detection means for performing a three stage detection as to whether at least a paper is not loaded, the paper is loaded and the paper is fully loaded with each discharge tray, which retrieves and decides a paper discharge tray matching to the identification name contained in the printing job or a paper discharge tray having a load factor of zero and registers an identification name for the paper discharge tray decided on that occasion.

The twenty second invention according to the present invention provides the image recording device capable of releasing the paper discharge tray in use and performing a paper discharge of a new printing job when the load factor of each paper discharge tray detected by the above described detection means becomes zero.

The twenty third invention according to the present invention provides the image inputting apparatus, which is settable from the external device such as the image recording device, the image inputting apparatus, the data processor or the like, and wherein, when there have been a printing indication from an input portion such as a panel or the like, the printing indication from the external device and an installation of an information storage medium and the external device, identification name forming means for reading and process the above described image forming instruction data based on the above described setting information and forming the identification name and printing job forming means for adding to the printing job the identification name formed by the above described identification name forming means and forming the printing job are provided.

The twenty fourth invention according to the present invention provides the image inputting apparatus, wherein, when there have been a printing indication from an input portion such as a panel or the like, the printing indication from the external device and an installation of an information storage medium and the external device, judgment means for judging whether the paper discharge can be performed based on the content of the printing job formed and warning means for warning the user when the paper discharge can not be performed by the above described judgment means according to the designation are provided.

The twenty fifth invention according to the present invention provides the image inputting apparatus comprising display means for receiving notified contents by the above described notifying means and displaying a using status of the paper discharge tray.

The twenty sixth invention according to the present invention provides the data processor, which is settable from the external device such as the image recording device, the image inputting apparatus, the data processor or the like, and wherein, when there have been a printing indication from an input portion such as a panel or the like, the printing indication from the external device and an installation of an information storage medium and the external device, identification name forming means for reading and processing the above described image forming instruction data based on the above described setting information and forming the identification name and printing job forming means for adding to the printing job the identification name formed by the above described identification name forming means and forming the printing job are provided.

The twenty seventh invention according to the present invention provides the data processor, wherein, when there have been a printing indication from an input portion such as a panel or the like, the printing indication from the external device and an installation of an information storage medium and the external device, judgment means for judging whether the paper discharge can be performed based on the content of the printing job formed and warning means for warning the user when the paper discharge can not be performed by the above described judgment means according to the designation are provided.

The twenty eighth invention according to the present invention provides the data processor, comprising display means for receiving notified contents by the above described notifying means and displaying a using status of the paper discharge tray.

The twenty ninth invention according to the present invention provides the data processor, comprising: means for inputting a storage location of an image forming instruction data inside the storage device; editing means for editing the above described image forming instruction data; designation means for designating the image recording device which performs a printing; receiving method inputting means for inputting a receiving method of printing matters; time instruction means for instructing a printing timing; and host information input means for inputting a host information, and wherein an transmission of the image forming instruction file, an transmission of the image file and a printing indication to a predetermined printing server are performed.

The thirtieth invention according to the present invention provides the data processor, wherein the above described printing server performs the storing of the above described image forming instruction file, the image file and the printing indication information and transmits a part or the whole of the above described image forming instruction file, the image file and the printing indication information to a designated image recording device.

The thirty first invention according to the present invention provides the image recording device, wherein when there is a printing indication regarding an input of a user ID, an insertion of ID card or the like and when the above described image forming instruction file, the image file and the printing indication information are not down-loaded inside the image recording device, a retrieval is made as to whether there exist the above described image forming instruction file, the image file and the printing indication information of the user for the above described printing server and, when existing, a request is made for a transmission of the above described information to the above described printing server and, when not existing, an error message is displayed on the display device or a host computer on the image recording device.

The thirty second invention according to the present invention provides the image recording device, comprising: means for inputting a storage location of an image forming instruction data of the inside of the storage device; editing means for editing the above described image forming instruction data; designation means for designating the image recording device which performs a printing; receiving method inputting means for inputting a receiving method of printing matters; timing instruction means for instruction a printing timing; and host information input means for inputting a host information, and wherein a request for a transmission of the image forming instruction file and a request for a transmission of the image file are made to the above described data processor.

The thirty third invention according to the present invention provides the image recording device, comprising display means for displaying the storage location of the above described image forming instruction data and the contents of the image file and the user information or the like and making it possible to renew each display content by selecting or editing it.

PRACTICAL EXAMPLES

Practical examples will be cited and described below.

(As Examples Corresponding to the First Problem)

First Example

A first embodiment of the present invention will be described based on FIG. 1 to FIG. 26.

Figure 2:
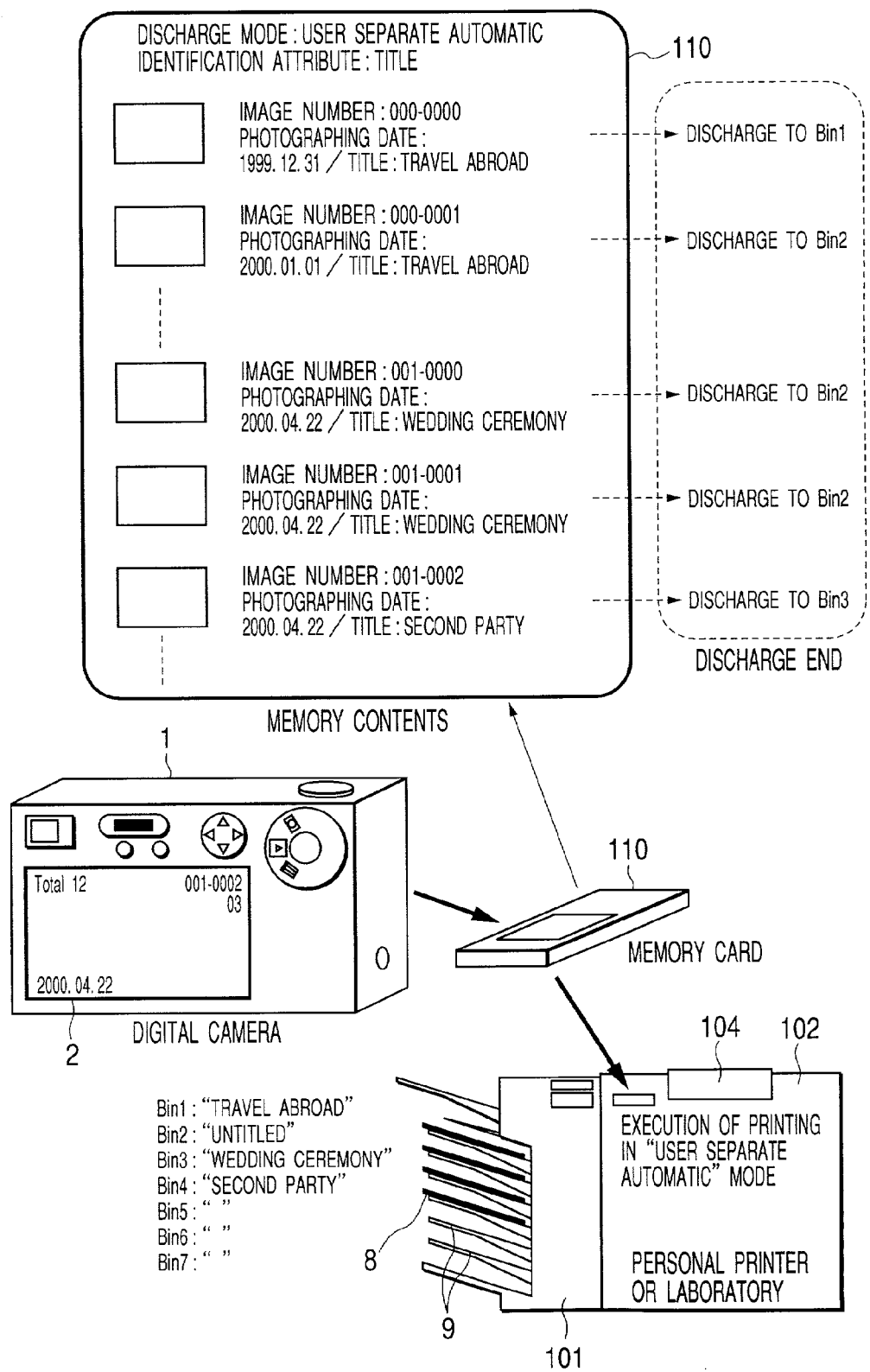
FIG. 2 shows a process of selecting a job according to title information in a memory card in the first embodiment.
Figure 3:
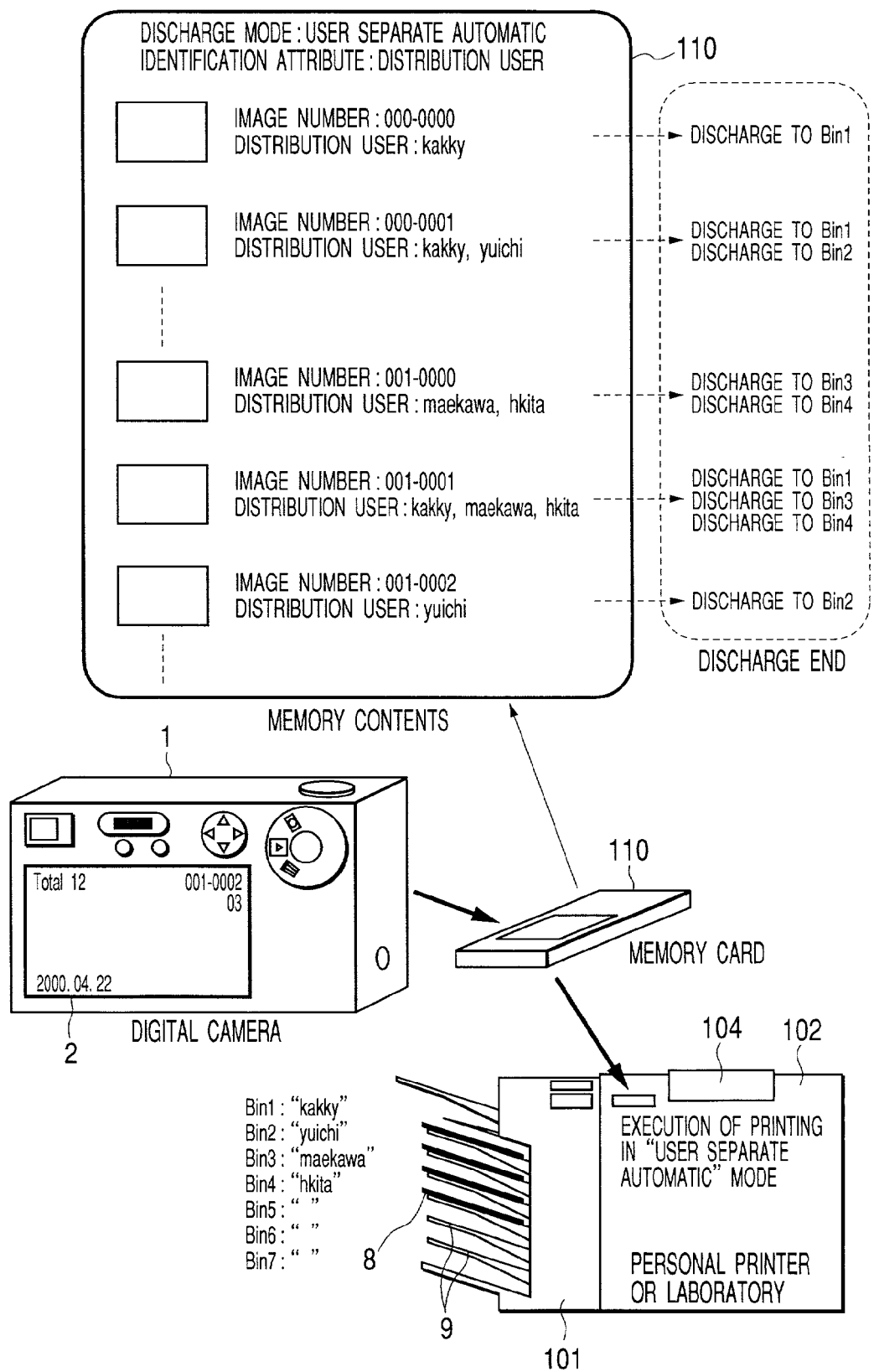
FIG. 3 shows a process of selecting a job according to delivery user information in a memory card according to the first embodiment.

FIG. 1 to FIG. 3 show a configuration example of the system which prints out an image photographed by a digital camera by "User separate automatic mode".

The present system is constituted by a laser beam printer (hereinafter referred to as a printer) provided with a data processor 101 in which a paper 8 is classified for controlling and outputted and a memory card 110 as an information storage medium which is detachably attachable with the printer 102. The digital camera 1 is installable with the memory card 110, and a photographed image is recorded in the memory card 110.

On a operation panel 104 of the printer 102 and a display screen 2 of the digital camera 1, the information such as the image recorded in the memory card 110 or the like and items or the like required for various types of operations and settings are displayed.

Functions such as a sorting control, a data process or the like according to the present invention can be disposed inside a main body portion of the printer 102 and the data processor 101. Further, functions such as the setting of a sorting information, a job formation of a printing job, a request for a printing, a printing indication or the like can be disposed inside the digital camera 1 and the main body portion of the laser beam printer 102.

The description will be practically made below.

FIG. 1 is an example of classifying an output image according to a photographing date, and FIG. 2 is an example of classifying the output image according to a title, and FIG. 3 is an example of classifying the output image according to a distribution user to be input to deliver same images to a plurality of persons similarly to the case of an extra printing.

FIG. 1 to FIG. 3 show examples where the image data photographed by the digital camera 1 is stored in the information storage medium inside the digital camera 1 and a printing is performed based on the information of this information storage medium. This information storage medium may be either the medium fixedly housed inside the digital camera 1 or a detachable flush memory such as a compact flush, a smart media, a memory stick or the like. The present examples use the detachable memory card 110.

In these information storage media, in addition to the image data of the photographed image, an image relative attribute information relating to each image is stored. In this image relative attribute information, as the information which is automatically stored, there are an image number, a photographing date, a format form of the image file or the like and, further, as the information inputted by the user after photographing, there are a title, a trimming information, a rotational information, the number of prints or the like. In addition, the information may be such that it can include a name, an assigned post or the like of the person who requires a distribution as a distribution user to deliver the same images to a plurality of persons similarly to the case of an extra printing.

Furthermore, in the information storage medium, not only the above described image relative attribute information, but also the printing indication information are contained. In this printing indication information, a graphic mode, a color mode, a paper discharge mode, the number of printed copies or the like which become a printing information of an output end or a control information at a printing time are contained and also respective detailed setting information or the like are contained.

In FIG. 1 to FIG. 3, either "paper discharge mode" or "user separate automatic" are designated, respectively. When "user separate automatic" is designated for "paper discharge mode", the designation of "identification attribute" is also necessary and, in FIG. 1 to FIG. 3, a different designation is performed, respectively.

What is meant by "identification attribute" is a designation as to which attribute from among various attributes stored as respective image relative attribute information with respect to the paper discharge name of "user separate automatic" should be taken as the identification name at a classification time and, at a printing time, the descriptive content of the attribute designated as "identification attribute" from the image relative attribute information of respective images is automatically adapted as the identification name.

"Identification attribute" may be whatever attribute it is if it is the attribute contained in the image relative attribute information stored in the information storage medium by an image unit. As for the attribute which can be designated as the "identification attribute", there are cited, for example, a photographing date, a title, a distribution user, a format form of the image file, an image number, a directory of the image data, an output paper size or the like.

A printing process executed by a printing indication from the operation panel 104 of the printer 102 through the memory card 110 will be described below by using FIG. 1 to FIG. 3.

First, the example of FIG. 1 will be described.

In FIG. 1, in the information storage medium such as the memory card 110 or the like, "user separate automatic" as the paper discharge mode and "photographing date" as the identification attribute are stored by an input operation from the user. When the printing indication was received from the user, a job generation unit 440 inside the printer 102 (refer to FIG. 17 to be described later) starts the preparation of a printing job based on "user separate automatic" mode designated as the paper discharge mode.

When the printing job by "user separate automatic" mode is prepared, "photographing date" designated as the identification attribute becomes a judgment material for performing a classification process for each image. In the example of FIG. 1, "1999.12.31", "2000.01.01", "2000.02.02", "2000.04.22" or the like which are "photographing date" of each image are used for the classification process as the identification name.

Accordingly, in the preparation process of the printing job, if "user separate automatic" mode is designated, the date information designated as the identification attribute referred to as the "photographing date" is extracted from each image relative attribute information and added to the printing indication information of each image as the identification name for classifying respective date information. In this way, the printing job is constituted by a header portion which contains the extracted image relative attribute information and the printing indication information and the image data. This printing job comprises a command group by a packet unit.

When the forming of the printing job is completed, the job generation unit 440 delivers the printing job to a data analysis portion. Here, the printer 102 is provided with the data processor 101 comprising a plurality of paper discharge trays 9, and this data processor 101 should be taken as capable of classifying and discharging based on the identification name such as an user separate automatic mode, an user separate fixed mode or the like.

The printer 102 analyzes the contents of the printing job based on the generated printing job formed and performs a predetermined printing process according to the contents. In the case of the printing job such as the example of FIG. 1, respective paper discharge ends of the images are decided in such a manner that the image photographed on the same "photographing date" according to the identification name designated as the "photographing date" is classified into the same paper discharge tray 9. The image for which the paper discharge end was decided is subsequently subjected to a predetermined printing process so that, similarly to the example of FIG. 1, the output result of the image for which the paper discharge end was designated under the identification name of "1999.12.31" is discharged to the paper discharge tray "Bin1", the output result of the image for which the paper discharge end was designated under the identification name of "2000.01.01" is discharged to the paper discharge tray "Bin2", the output result of the image for which the paper discharge end was designated under the identification name of "2000.02.02" is discharged to the paper discharge tray "Bin3" and the output result of the image for which the paper discharge end was designated under the identification name of "2000.04.22" is discharged to the paper discharge tray "Bin4".

In this way, in the printing process by "user separate automatic" mode with "photographing date" as the identification attribute, it is realized that the identification name extracted by the identification attribute "photographing date" from the image relative attribute information stored in the information storage medium is registered at each paper discharge tray 9 of the data processor 101 and the image for which the paper discharge end is designated under the same identification name is classified and discharged into the paper discharge tray 9 which is registered under the same identification name.

Next, the example of FIG. 2 will be described.

In FIG. 2, in the information storage medium such as the memory card 110 or the like, "user separate automatic" as the paper discharge mode and "title" as the identification attribute are stored by the input operation from the user. When the printing indication was received from the user, the job generation unit 440 starts the preparation of a job based on "user separate automatic" mode designated as the paper discharge mode. When the printing job by "user separate automatic" mode is formed, "title" designated as the identification attribute becomes a judgment material for performing a classification process for each image.

In the example of FIG. 2, "title" of each image such as "travel abroad", "Untitled", "wedding ceremony", "a second party" or the like is used for the classification process as the identification name. Here, "untitled" should be taken as a title name which is default-set in "title" attribute. After photographing, unless there is any particular input designation from the user, "title" attribute may remain as "untitled".

In the printing job forming process, when "user separate automatic" mode is designated, a location information designated as the identification name referred to as the "title" is extracted from each image relative attribute information and added to the printing indication information of each image as the identification name for classifying respective location information and constitutes the header portion of the printing job.

When the formation of printing job is completed, the job generation unit 440 delivers its printing job to the data analysis portion. The printer 102 analyzes the contents of the printing job based on the printing job formed and performs a predetermined printing process according to the contents.

In the case of the printing job such as the example of FIG. 2, the images for which the same "title" were inputted according to the identification name designated as "title" decide the paper discharge end for each image so as to be classified into the same paper discharge tray 9. The image which the paper feeding and discharge tray decided performs a predetermined printing process in order and, as the example of FIG. 2, an output result of the image for which the discharge end was designated under the identification name of the "travel abroad" is discharged to the paper discharge tray "Bin1", the output result of the image for which the discharge end was designated under the identification name of "untitled" is discharged to the paper discharge tray "Bin2", the output result of the image for which the discharge end was designated under the identification name of "wedding ceremony" is discharged to the paper discharge tray "Bin3" and the output result of the image for which the discharge end was designated under the identification name of "a second party" is discharged to the paper discharge tray "Bin4".

In this way, in the printing process by "user separate automatic" mode with "title" as the identification attribute, it is realized that the identification name extracted by the identification attribute "title" from the image relative attribute information stored in the information storage medium inside the digital camera 1 is registered at each paper discharge tray 9 of the data processor 101 and the image for which the paper discharge end is designated under the same identification name is classified and discharged into the paper discharge tray 9 which is registered under the same identification name.

Next, the example of FIG. 3 will be described.

In FIG. 3, in the information storage medium such as the memory card 110 or the like, "user separate automatic" mode as the paper discharge mode and "distribution user" as the identification attribute are stored by the input operation from the user. The attribute which is referred to as "distribution user" is prepared as the image relative attribute information by assuming the case where, similarly to the case of an extra printing, the same copy is copied and distributed to a plurality of persons.

When the printing indication was received from the user, the job generation unit 404 starts the preparation of the printing job based on "user separate automatic" mode designated as the paper discharge mode. When the printing job by "user separate automatic" mode is formed, "user distribution" designated as the identification attribute becomes a judgment material for performing a classification process for each image.

In the example of FIG. 3, there is also the case where a plurality of "distribution users" is inputted for one image and is used for the classification process as the identification name such as "kakky", "yuichi", "maekawa", "hkita" or the like which are "distribution users". Accordingly, in the preparation process of the printing job, when "user separate automatic" mode is designated, the person's name information designated as the identification attribute referred to as the "distribution user" is extracted from each image relative attribute information and added to the printing indication information of each image as the identification name for classifying respective person's name information and constitutes the header portion of the printing job.

When the printing formation is completed, the job generation unit 440 delivers its printing job to the data analysis portion. The printer 102 analyzes the contents of the printing job based on the printing job formed and performs a predetermined printing process according to the contents.

In the case of the printing job such as the example of FIG. 3, the paper discharge end of each image is decided in such a manner that the image required by the same "distribution user" is classified into the same paper discharge end according to the identification name designated as "distribution user". When a plurality of "distribution users" is designated for one image, that image is copied so as to be the number of pages for "distribution users" and one person of "distribution user" is allotted to each page as the paper discharge end.

The image which the paper feeding and discharge end decided is subsequently subjected to a predetermined printing process so that, similarly to the example of FIG. 3, the output results of the images such as "000-0000" "000-0001" "001-0001" or the like for which the paper discharge end was designated under the identification names of "kakky" are discharged to the paper discharge tray "Bin1", the output results of the images such as "000-0001", "001-0002" or the like for which the paper discharge end was designated under the identification name of "yuichi" are discharged to the paper discharge tray "Bin2", the output results of the images such as "001-0000", "001-0001" or the like for which the paper discharge end was designated under the identification name of "maekawa" are discharged to the paper discharge tray "Bin3" and the output results of the images such as "001-0000", "001-0001" or the like for which the paper discharge end was designated under the identification name of "hkita" are discharged to the paper discharge tray "Bin4".

In this way, in the printing process by "user separate automatic" mode with "distribution user" as the identification attribute, it is realized that the identification name extracted by the identification attribute "distribution user" from the image relative attribute information stored in the information storage medium such as memory card 110 is registered at each paper discharge tray 9 of the data processor 101 and the image for which the paper feeding and discharge end was designated under the same identification name is classified and discharged into the paper discharge tray 9 which is registered under the same identification name.

When a plurality of identification names is designated for one image, that image is copied so as to be the number of pages for the identification names and the same image is discharged to the paper discharge tray 9 which is registered under respective identification names.

As described above, the configuration example of the system for printing and outputting the image photographed by the digital camera 1 by the user separate automatic mode through the information storage medium such as the memory card 110 or the like was described.

The above described system example (refer to FIG. 1 to FIG. 3) will be described more in detail by using block diagrams, flow charts or the like.

(Directory Structure of the Information Storage Medium)

Figure 4:
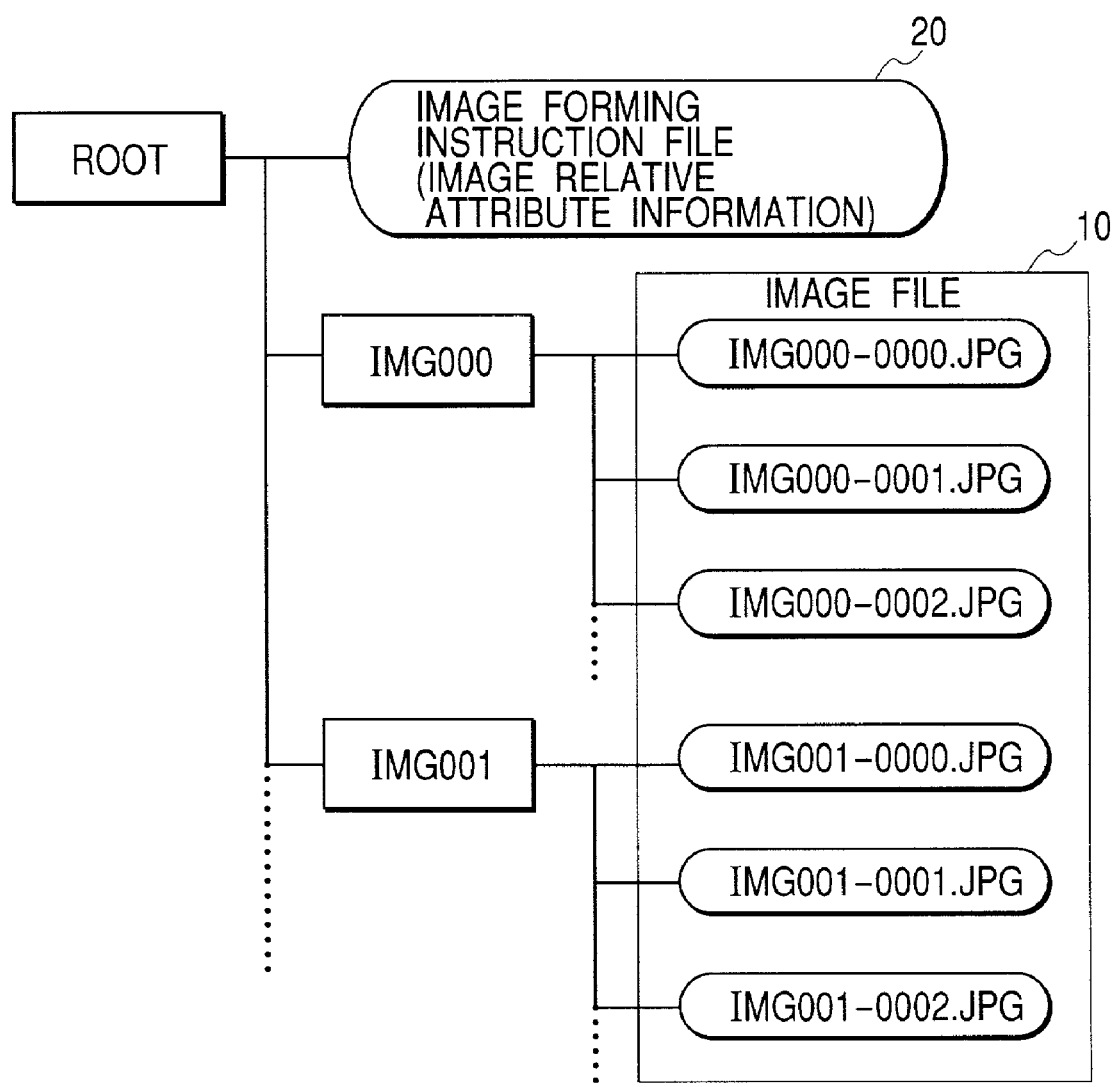
FIG. 4 shows a directory structure of a storage medium according to the first embodiment.

FIG. 4 shows one example of the directory structure of the information storage medium.

In FIG. 4, the image data is taken as an image file 10 and the data as the image relative attribute information is taken as an image forming instruction file 20 and each is disposed in the lower layer of a root directory.

The image file 10 is brought together by an option directory arranged in the lower layer of the root directory according to the instruction of the user or an automatic setting of the job generation unit 440 and is constituted stratum-wise. The stratum may be of multiple and adjustable to a pass designation of the image file 10 described in the image forming instruction file 20. Similarly, regarding the image forming instruction file 20, a predetermined directory may exist between it and the root directory and the job generation unit 440 may be arranged at a detectable position.

Figure 5:
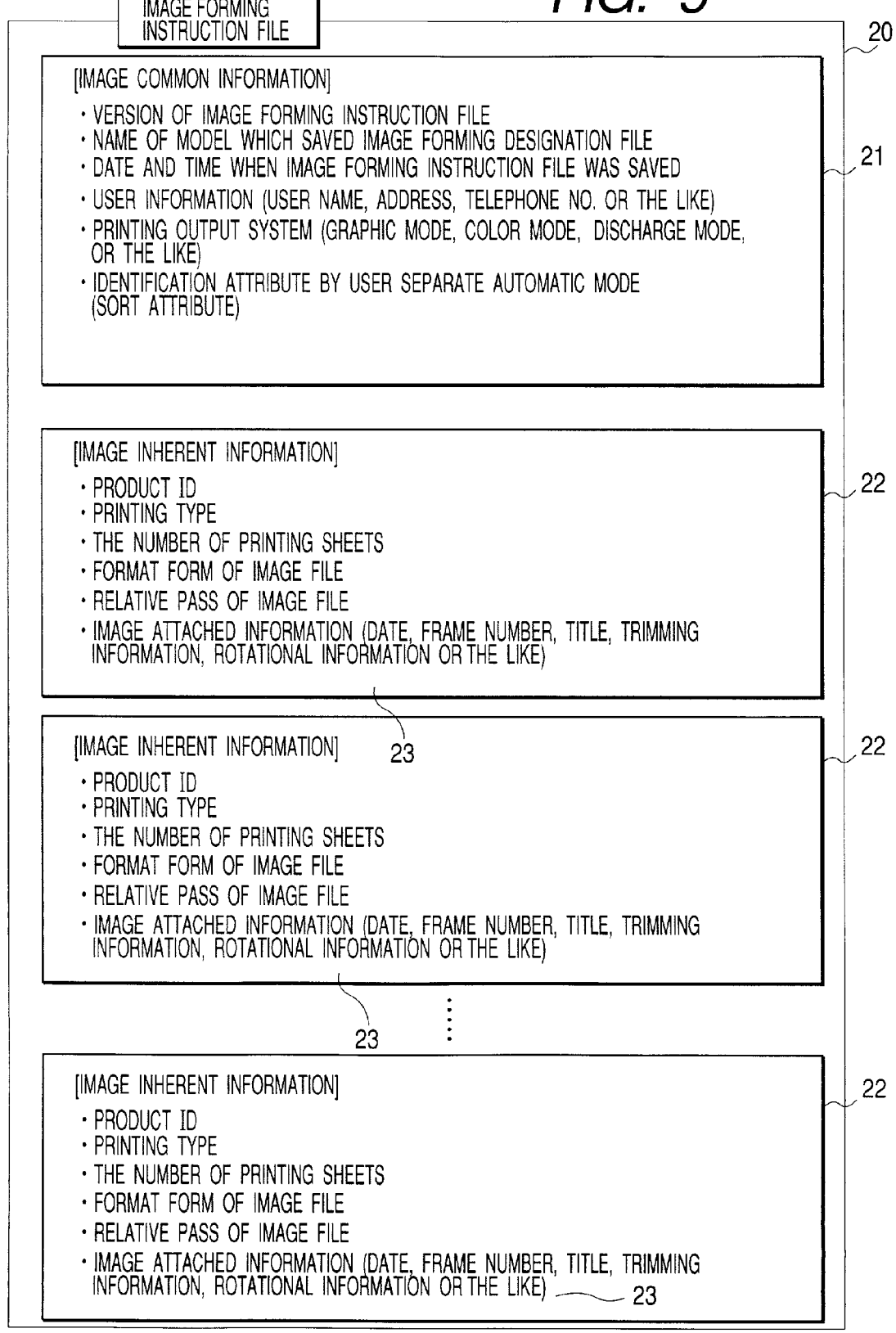
FIG. 5 shows contents of a data described in an image generation indication file according to the first embodiment.

FIG. 5 shows the data contents described in the image forming instruction file 20.

In the image forming instruction file 20, the information (hereinafter referred to as the image common information) common to the image data stored in the information storage medium 21 and the information (hereinafter referred to as the image inherent information) inherent to each image data 22 are described.

In the image common information 21, a version of the image forming instruction file 20, a model name which saved the image forming instruction file 20, a date and time when the image forming instruction file 20 was saved, a user information (a user name, an address, a telephone number or the like), a print output system (a graphic mode, a color mode, a paper discharge mode or the like), an identification attribute (a classification attribute) at the user separate automatic mode or the like are described.

In respective pieces of image inherent information 22, a product ID, a print class, the number of prints, the format form of the image file, a relative path of the image file, an image attached information (a date, a panel serial number, a title, a trimming information, a rotational information or the like) or the like are described.

These pieces of the information are sometimes automatically described according to the setting of an image inputting time or described by specifically being designated by the user after the image was inputted.

When the printing indication was received from the user, the job generation unit 440 performs the retrieval of the above described image forming instruction file 20 from the information storage medium and analyzes the contents of the retrieved image forming instruction file 20 and performs the preparation of the printing job based on the contents.

(Printing Designation Screen)

FIG. 6 is an example (UI) which performs the printing indication of the data inside the memory card 110 at the inserting time of the memory card 110 in the display screen 104.

The printing from the storage medium such as the memory card 110 or the like may start with its insertion as a trigger or the printing may start by waiting for the setting or the instruction from the user so that the designation relating to the printing can be performed similarly to the case of the present example.

As shown in FIG. 6, "image designation", "medium", "classifying method" are displayed in the display portion of the image recording device 102 and can be selected.

"Image designation" selects, for example, the printing of all the images inside the memory card 110, or the printing of a part of the images or the printing also of the page of the index printing which shows a list of the images selected or the like.

"Medium" corresponds to the printing indication information and selects on which the image is to be printed. Although, depending on the image recording device, there is available a machine exclusively for photographing, in the present example, a plain paper, a postcard, a photograph, a glossy paper, an OHP paper or the like are selected as printable for a plurality of media and, in FIG. 6, a photograph is selected.

"Classification method" corresponds to the image relative attribute information and selects how to classify based on which information inside the memory card 110 and can select an owner, a date, a title, a distribution user, a directory or the like and, in FIG. 6, a date is selected.

After the selection of these items was made and a "OK" button was pushed, the information inside the memory card is read and the printing is started according to the above described setting.

(Printing Execution Indication Process)

Figure 7:
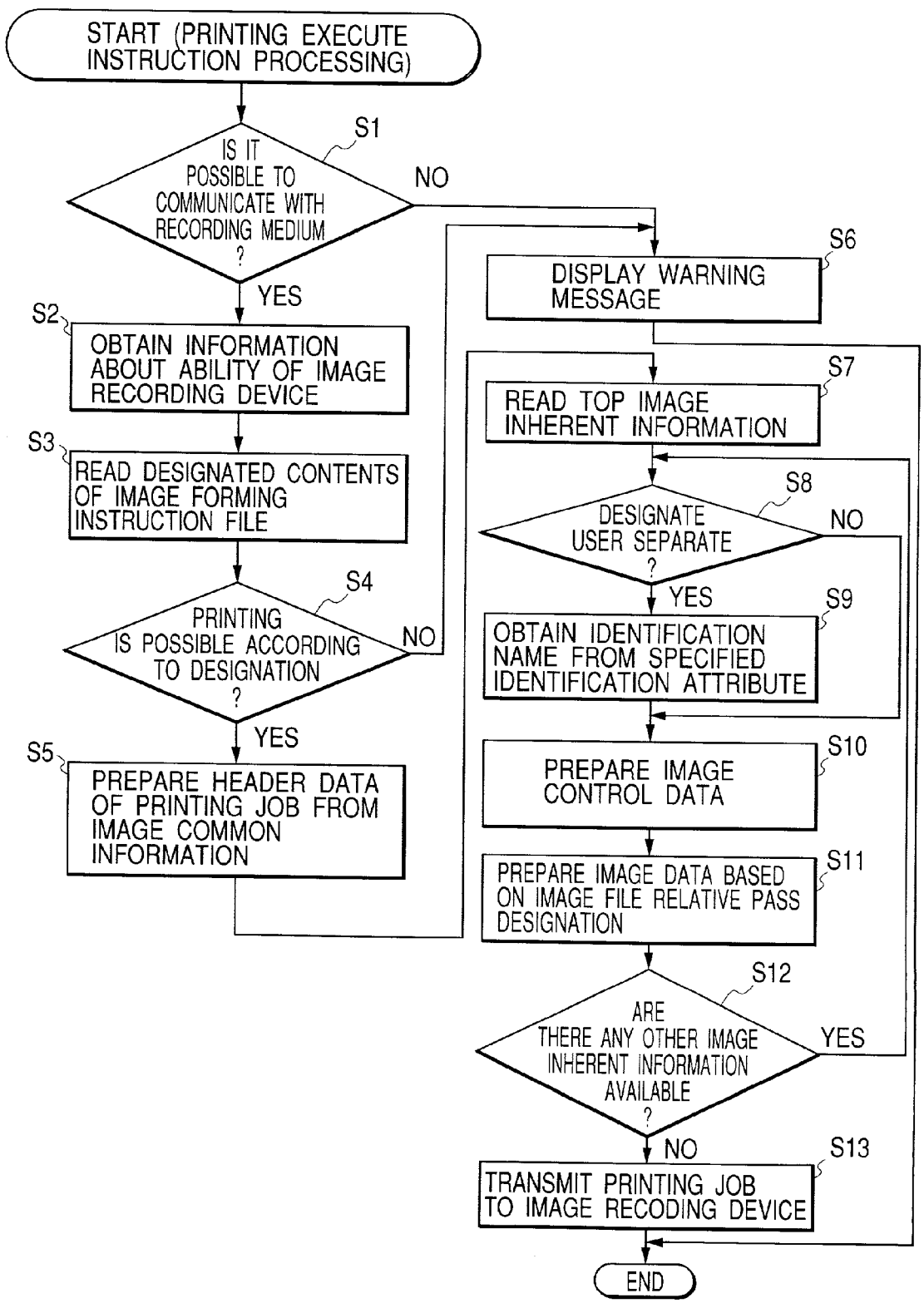
FIG. 7 is a flowchart of a print execution instructing procedure in the image recording device according to the first embodiment.

FIG. 7 is a flow chart showing a process procedure when the printing execution indication of the memory card 110 was received from the user.

In FIG. 7, when the printing execution indication was received from the user, a data reading portion starts taking in the data from a predetermined information storage medium and checks whether a communication with the installed information recording medium is possible (S1).

In a S1, if a judgment is made that the communication with the information recording medium is impossible, a warning such as "please install the memory card" or the like is displayed and notifies the user that the communication connection is not made from the information recording medium (S6), and the printing execute instruction process is completed.

In S1, if the communication with the information recording medium is possible, a capacity information (the number of paper discharge trays, the number of paper feeding ports, a paper-passable paper size, a type or the like) of the printer 102 as the image recording device and the data processor 101 is obtained.

In S3, the image forming instruction file 20 is retrieved from the information storage medium and the contents are read, and the image data, the image attached data (image relative attribute information), the printing setting data or the like are referred to.

From the referred contents, in S4, a judgment is made as to whether the printing according to the designation can be executed and, in S4, if the execution of the printing is not possible, the warning such as "no user separate paper discharge possible" or the like is displayed according to the contents, thereby notifying the user that the printing according to the designation is not executable(S6), and the printing execution indication process is completed. In S4, if the printing execution is possible, the step moves to the process subsequent to S5.

In S5, the printing job is formed by adding the header data to the printing image based on the image common information which is described in the image forming instruction file 20 read in the S3. Furthermore, each image inherent information described in the image forming instruction file 20 is read first of all, and the image inherent information at the top of S7 is read in order, and the other inherent information is read to form a printing job.

In S8, a judgment is made as to whether "paper discharge mode" of the printing setting is a user separate mode designation, and when it is the user separate mode, in order to add an identification name for the classification which is matched to the setting content, an identification name is obtained from the image common information or the image inherent information under reference based on the attribute which is described in "identification attribute" of the printing setting in S9, and it is taken as the paper discharge end name of that image. These identification names may be from the image common information or from the image inherent information or its combination and are prepared based on the designated contents of the classification method previously set up in the UI of FIG. 6. In S8, if it is not the user separate mode designation, there is no need to add the identification name and the S8 moves to S10.

In S10, based on the image inherent information under reference, the control data of that image is prepared. Further, in S11, the image data of the printing job is prepared from the image file which is stored in the location showing the relative path of the image file, and the process for the image inherent information under reference is completed.

In S12, a judgment is made to whether there is any other image inherent information available and, if available, the processes of the S8 to S12 are repeated with the next image inherent information as a reference. Here, the image data which is used for a job forming is selected based on the image designation previously set up in FIG. 6, and all the image data or a part of the image data matched to the designated contents are selected.

If there is no other image inherent information available, the step moves to S13 and, in S13, the printing job prepared by the above described process is transmitted to the image recording device and the printing execution indication process is completed.

(System Configuration of Image Recording Device)

Figure 8:
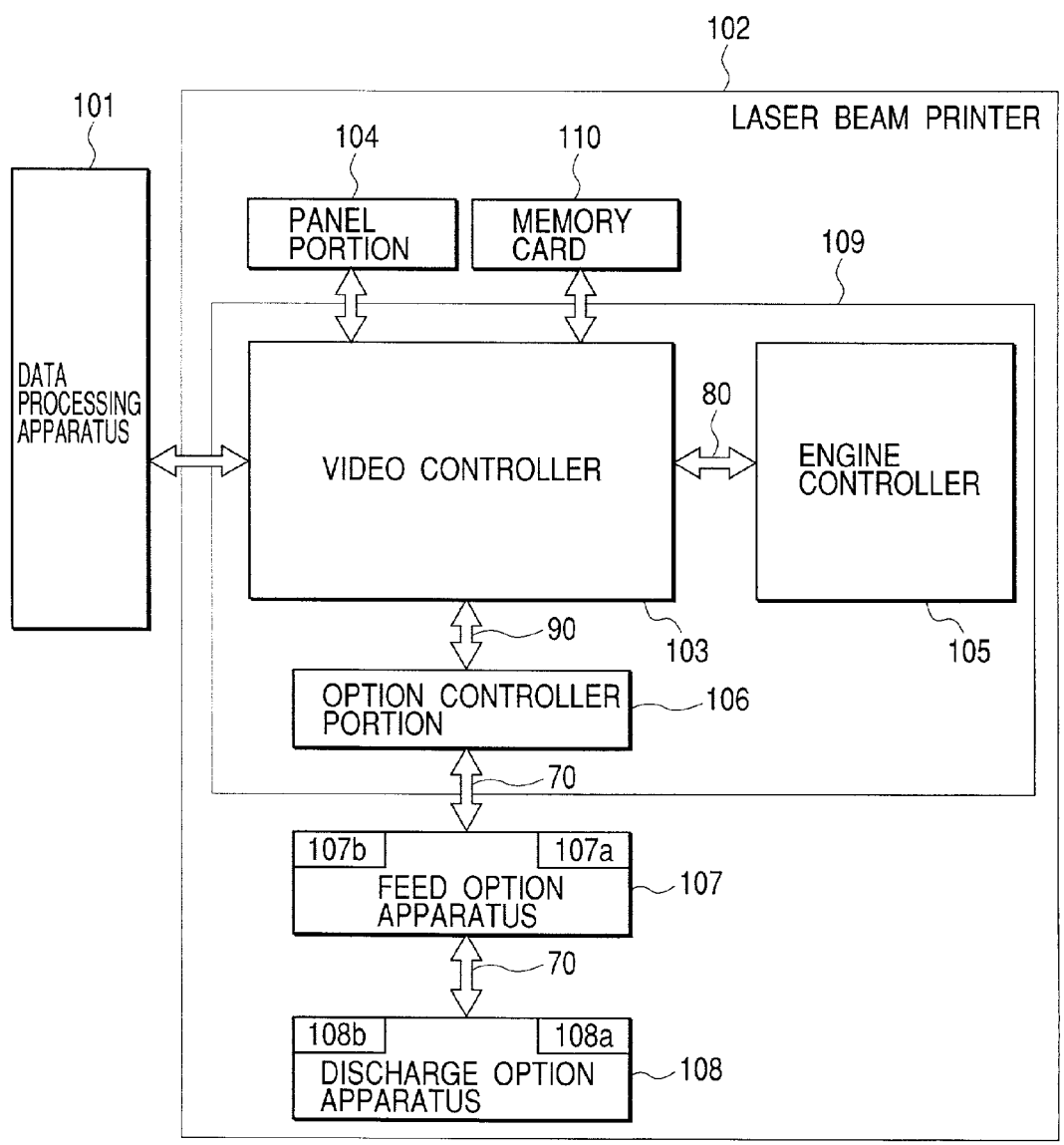
FIG. 8 is a block diagram of a configuration of the image recording device according to the first embodiment.

FIG. 8 is a block diagram explaining a system configuration of the image recording device in the image recording system of the present example, and here is shown the case of the printer 102 comprising a laser beam printer.

Note that the image recording device which adapts the present invention is not limited to the laser beam printer, but an ink jet printer or the like or the printer of another printing system may be used. Further, in the following description, while an example where two sets of an option unit are connected will be described, more option units can be connected and the function of the option unit may be possessed jointly with the main body.

In FIG. 8, the printer 102 is connectable with various option devices, and connected with the data processor 101 by the general interface (for example, Centronics, RS232C or the like) and performs an image recording based on the printing information transferred from data processor 101 through the general interface (the control information containing, for example, PostScript, LIPS III, LIPS, IV, image data such as the code data or the like based on a predetermined printer language) or the memory card 110 installed in the printer 102.

Reference numeral 103 denotes a video controller, which is connected with an data processor 101 by the above described general interface and receives a code data (an ESC code, various types of PDL data or the like) from the data processor 101 through the above described general interface and forms a page information comprising a dot data or the like based on the code data and transmits an image data (binary valued or multi valued) to an engine controller 105 to be described later through a video interface 80 and transmits a command of a paper feed designation and a paper discharge designation to an option controller portion 106 to be described later through an overall interface 90.

The engine controller 105 forms a latent image on a photosensitive drum by the known electro-photographic process based on the image data transmitted from the above described video controller 103 and performs a transfer, a fixing and a printing on the paper to be supplied. Note that, on that occasion, an instruction or the like for the timing of the paper feeding and discharge is issued to the option controller portion 106.

Reference numeral 104 is a panel portion and an interface with the user which is constituted by various types of switches for operation (buttons), a LED display device, a LCD display device or the like, and the user can instruct the printer 102 of a predetermined operation by operating an operation panel 104. Note that various types of data or the like which were set up by the user are stored and controlled in a non-volatile memory (not shown), for example, NVRAM, EEPROM or the like.

The option controller 106 is provided with CPU, ROM, RAM or the like (not shown) and is an overall controller which superintends and controls more than one set of the option device (unit) based on the paper feeding and paper discharge instructions or the like transferred from the above described video controller 103 and the paper feed and the paper discharge instructions or the like from the engine controller 105 and performs a communication through the option controller unit and the option unit interface 70 which are provided for each option device, and superintends and controls each option device.

Further, inside RAM of the option controller portion 106, there is available a common memory (refer to FIG. 14 to be described later) accessible by the video controller 103, and the common memory is constituted by about 40 pages of a conveying status control area, a basic status area, a command status control area, a rising process area or the like. The video controller 103 performs a designation for each option device through each area of the above described common memory.

Note that the above described conveying status control area is constituted by the area in which the video controller 103 notifies a printing method (the paper feeding port, the paper discharge tray, the color, stapling, shifting or the like) to each option device and the area in which each option status (how far the printing was made, the paper discharge has been completed or the like) is notified to the video controller 103.

Further, the basic status area is an area in which troubles (door open, a paper jam, a failure, no cassette paper, a paper size discrepancy, fully loaded, no staple needle or the like) of each option device are notified to the video controller 103, and the command and status control area is an area in which the command status is exchanged between the video controller 103, and the rising process area is an area in which the video controller 103 designates the rising process of each option device.

Reference numeral 107 is a paper feeding option device (unit), which is, for example, a paper deck option unit and comprises a paper deck controller (a large-capacity paper feeding cassette controller) 107*a* in its inside and controls the paper feed based on the control information transmitted from the option controller portion 106.

Note that the above described paper deck controller 107*a* is provided with CPU, ROM and RAM (not shown), and the CPU is stored in the ROM and controls the paper feeding option device 107 based on a program. Further, in the ROM, an expansion information of the paper feeding option device 107, for example, the information or the like about the paper size storable in the paper deck is stored.

Reference numeral 108 is a paper discharge option device (unit), which is, for example, a sorter option unit with sorting function and comprises a sorter controller (a large-capacity stacker controller) 108*a* in its inside and performs the sorting operation and the paper discharge operation based on the control information transmitted from the option controller portion 106.

Note that the above described sorter controller 108*a* is provided with CPU, ROM and RAM (not shown) and the CPU is stored in the ROM and controls the paper discharge option device 108 based on a program.

Further, in the ROM, the expansion information of the paper discharge option device 108, for example, the number of paper discharge trays, the presence or absence of the sorting function, the presence or absence of the stapling function, the presence or absence of the shift function to shift the discharge paper to a predetermined direction, the presence or absence of the reverse function to reverse the face direction of the discharge paper or the like are stored.

Note that, in the paper feeding option device 107 and the paper discharge option device 108, operation portions 107*b* and 108*b* comprising a display portion and various types of keys are disposed and make it possible to display a message and an operation method or the like for the user at the using time of each option and can be operated.

Reference numeral 110 denotes a memory card and its installing port is disposed for more than one piece on the frame of the printer 102 and detachable. When the user installs the memory card or operates the operation panel 104, he or she can instruct the printer 102 of a predetermined operation.

Further, reference numeral 109 denotes a control unit, which is constituted by the engine controller 105 which performs a printing process control of the printer 102, the video controller 103 which analyzes and converts the control of the whole of the printer 102 and the data from the data processor 101 into the image data and the option controller portion 106 which superintends and controls each option unit.

Note that the option controller 106 controls each option unit by a common option unit interface 70 and communicates with the video controller 103 through the overall interface 90. The present example is characterized in that the video controller 103 controls each paper feeding and paper discharge option unit through the option controller 106.

(Printer Configuration)

Figure 9:
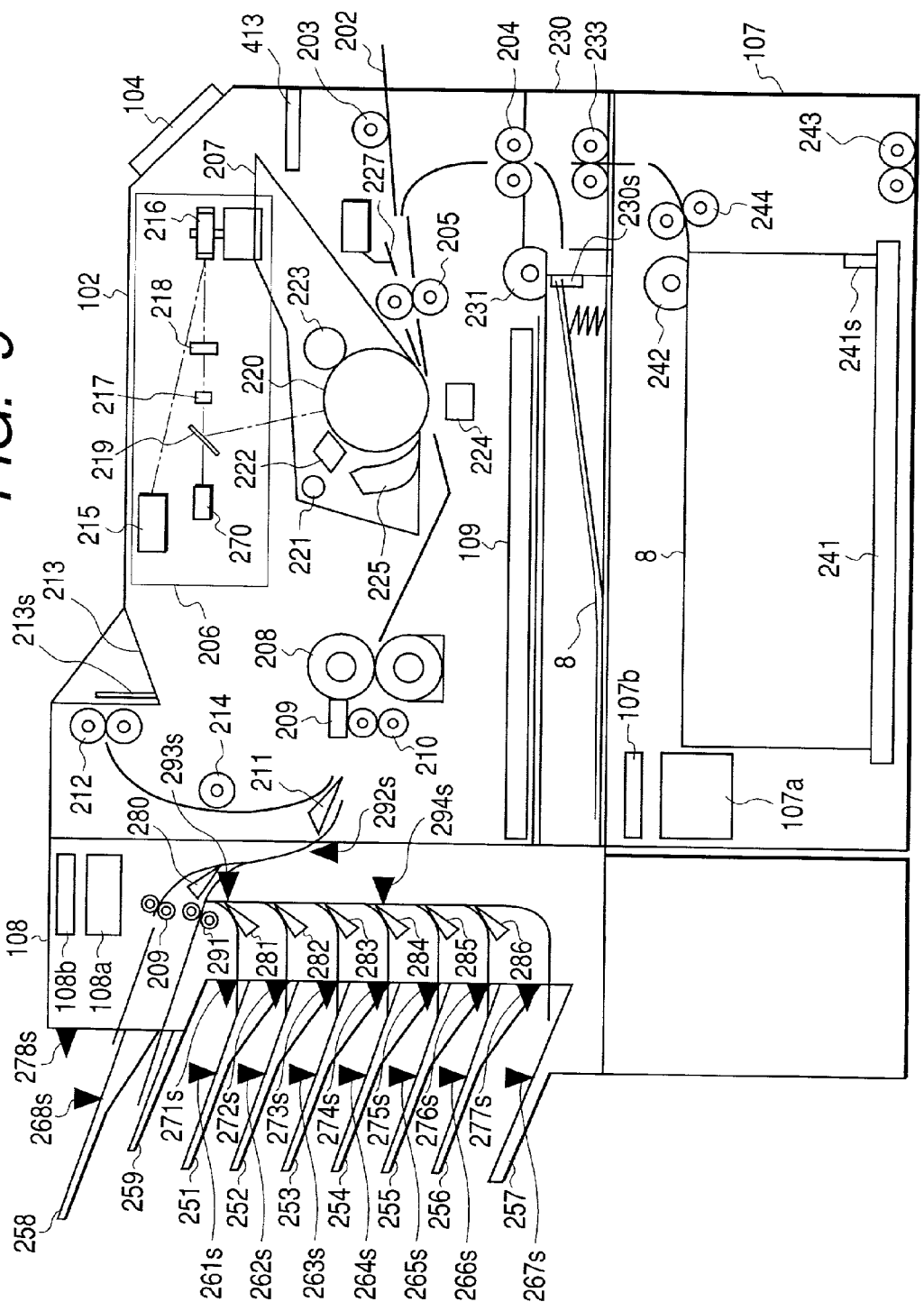
FIG. 9 is a sectional view of an outline of the image recording system configured by the image recording device and an option unit according to the first embodiment.

FIG. 9 is a cross-sectional view explaining the configuration of the printer 102 as shown in FIG. 8 and the same reference numerals are attached to the same components of FIG. 8.

In FIG. 9, reference numeral 230 denotes a paper cassette, which holds a recording paper 8 and has a mechanism for electrically detecting a size of the recording paper 8 by a partition plate (not shown). Reference numeral 231 denotes a cassette paper feed clutch, which is a cam for separating the top most one paper only of the recording papers 8 which are placed on the paper cassette 230 and conveying the recording paper 8 separated by driving means (not shown) to a paper feed roller 204 and intermittently rotates for every paper fed and feeds one recording paper 8 in correspondence with one rotation. Reference numeral 230S denotes a recording paper detection sensor, which detects the amount of the recording paper 8 held in the paper cassette 230.

Reference numeral 227 denotes a resist shutter, which stops the paper feed by pressing the paper. The paper feed roller 204 conveys the tip portion of the recording paper 8 to the resist shutter 227. Reference numeral 202 denotes a manual paper feed tray, which places the recording paper 8. The reference numeral 203 is a manual paper feed clutch, which conveys the recording paper 8 placed on the manual paper feed tray 202 to the resist shutter 227. Reference numeral 233 denotes an option paper feed roller (a paper feed relay conveying roller), which supplies a recording paper S fed from the paper feed option 107 to the inside of the main body of the printer 102.

Further, in the downstream of the above described manual paper feed roller 203, the cassette paper feed clutch 231 and the option paper feed roller 233, a pair of resist rollers 205 which synchronously convey the recording paper S are disposed and, in the downstream of the resist rollers, an image recording portion 207 which forms a toner image on the recording paper S by means of the known electro-photographic process by a laser beam emitted from the laser scanner portion 206 is disposed.

In the laser scanner portion 206, reference numeral 215 denotes a laser unit, which emits a laser light based on the image signal (VDO signal) transmitted from the video controller 103. The laser light emitted from the laser unit 215 is scanned by a polygon mirror 216 and forms a latent image on a photosensitive drum 220 through a group of image forming lenses 218 and a return mirror 219. Reference numeral 217 denotes a beam detection device, which detects the laser light emitted from the laser unit 215 and outputs a main scanning synchronous signal. Reference numeral 270 denotes an amount of light sensor, which detects the amount of light of the laser light emitted from the laser unit 215.

Further, in the image recording portion 207, reference numeral 222 denotes a primary charge device, which evenly charges over the photosensitive drum 220. Reference numeral 223 denotes a developing device, which is charged by the primary charge device 222 and is laser-exposed by the laser scanner portion 206 and develops the latent image formed on the photosensitive drum 220. Reference numeral 224 denotes a transfer charge device, which transfers the toner image developed by the above described developing device 223 on the photosensitive drum onto the recording paper 8 fed by the resist roller 205. Reference numeral 225 is a cleaner, which removes a residual toner on the photosensitive drum 220. Reference numeral 221 denotes a front exposure lamp, which optically charge-neutralizes the photosensitive drum 220.

Reference numeral 208 denotes a fixing device, which thermally fixes the toner image formed in the recording paper 8 by the image recording portion 207 on the recording paper 8. Reference numeral 210 denotes a conveying roller, which discharges and conveys the recording paper 8. Reference numeral 209 denotes a discharge sensor, which detects a delivery status of the recording paper 8. Reference numeral 211 is a flapper, which changes a conveying direction of the recording paper 8, for which a recording was completed, to a paper discharge tray 213 side or the paper discharge option 108 side. Reference numerals 214 and 212 denote paper discharge rollers, which discharge the recording papers S conveyed by the exchange of the flapper 211 onto a loading tray 213. Reference numeral 213 denotes a paper discharge load capacity detection sensor, which detects the load capacity of the recording paper loaded on the loading tray 213.

Further, the engine controller 105 inside the control unit 109 performs the control of the electro-photographic process by the laser scanner 206, the image recording portion 207 and the fixing device 208 and the conveying control of the recording paper 8 inside the main body of the laser printer 102.

Further, the video controller 103 is connected with the data processor 101 by the general interface (for example, Centronics, RS232C or the like) and develops the image information through the general interface into a bit data and transmits its bit data to the engine controller 105 as a VDO signal through the video interface 80.

Further, a data reading portion 413 is a portion which is installed with a detachable information storage medium such as a compact flush, a smart media, a memory stick or the like and, when the information storage medium is installed, a printing data is read from the data stored in the information storage medium and a process is executed and a printing is performed similarly to the case as transmitted from the above described data processor 101.

Next, various types of option units which are connected detachably with the main body of the printer 102 will be described.

The option controller portion 106 as shown in FIG. 8 is disposed inside the main body as shown in FIG. 9 and is communicably constituted by the same protocol through the option unit interface 70 which becomes a common bus for various option units. Further, the option controller portion 106 is connected with the video controller 103 through the overall interface 90.

In the paper feed option 107 such as a paper deck option unit or the like, reference numeral 241 denotes a paper deck, which loads a large amount of recording papers 8 on a deck which ascends and descends. Reference numeral 242 denotes a paper deck paper feeding roller, which feeds the recording paper S loaded on the paper deck 241. Reference numeral 244 denotes a covey roller, which coveys the recording paper S fed from the paper deck paper feed roller 242 to the direction of the option paper feeding roller 233. Reference numeral 243 denotes a paper feed relay conveying roller, which relay-conveys the recording paper 8 fed from another paper feed system option unit (capable of feeding the recording paper having a different size or the same size) which is detachably attachably multiply connectable with the lower portion of the paper deck option. Further, reference numeral 241 denotes a recording paper storage amount detection sensor, which detects the load capacity of the recording paper S to be loaded on the paper deck 241. Note that the paper deck option unit 107 is controlled by the paper deck controller 107a.

In the paper discharge option 108 such as the sorter option unit or the like, reference numerals 251 to 257 are the first paper discharge bin to the 7th paper discharge bin for performing a face-down discharging, which classify and load the recorded recording papers 8. Further, reference numeral 258 is the 8th paper discharge bin, which straightly passes the paper as it is which has been conveyed to the sorter option and performs a face-up paper discharge. Reference numeral 280 is a flapper, which performs a switching of the conveying so that a face switching of the paper for the recording paper 8 sorted by the flapper 211 of the main body of the printer 102 and conveyed to the sorter option unit 108 can be performed based on the instruction from the video controller 103. Further, reference numerals 261S to 268S are paper discharge empty detection sensors, which detect the presence or absence of the loaded papers of the recording papers discharged into the first discharge bin 251 to the 8th discharge bin 258.

Further, paper discharge load capacity detention sensors S271S to S278S are full load capacity sensors and, when the height of the recording papers loaded in the above described first paper discharge bin 251 to 8th paper discharge bin 258 reaches (detects), for example, 18 mm (equivalent to about 120 sheets of paper) the sort controller 108a notifies the video controller 103 of the full load through the option controller portion 106.

Further, the above described first paper discharge bin 251 to the 8th paper discharge bin 258 can be filled with about 120 papers for each bin, and about 960 papers can be loaded for 8 bins, among which the first paper discharge bin 251 to the 7th paper discharge bin 257 can perform a sorting discharge.

When the face-up designation was made by the video controller 103 through the overall interface 90, a sorting is made by turning the face up flapper 280 on and the sorted recording paper 8 is conveyed straight to the paper discharge tray 9 by a roller 290. Further, when the face-down designation was made by the video controller 103 through the overall interface 90, a sorting is made by turning the face up flapper 280 off and the sorted recording paper 8 is conveyed to the extent that the rear end of the recording paper 8 crosses over the face-up flapper 280 by means of a roller 291. Next, the roller 291 turns reverse and is led to a vertical pass from the rear end of the recording paper 8 and drives the bin flappers 281 to 286 at a predetermined timing by a designated paper discharge bin to distribute the bin flappers 251 to 286 to each face-down paper discharge tray 9 and completes the paper discharge in the face-down status. When the paper discharge bin is the 7th paper discharge bin 257, the bin flapper is not driven, but straightly performs the paper discharge, thereby completing the face-down paper discharge.

Furthermore, when a stapling designation is made by a stapler (not shown) by the video controller 103 through the overall interface 90, the recording paper 8 is stored in a stapler tray (not shown) and, with the recording papers 8 lined up, the stapler executes the stapling and performs the paper discharge to any of the 1st paper discharge bin 251 to the 8th paper discharge bin 258. Further, when a shift designation is made by the video controller 103 through the overall interface 90, similarly to the case where the stapling is designated, the recording paper 8 is stored in the staple tray (not shown) and, with the recording papers 8 lined up and shifted for each tray, that is, with the loading area (tray) of the recording papers 8 to be discharged shifted, the paper discharge to any of the 1st paper discharge bin 251 to the 8th paper discharge bin 258 is performed. Further, a staple needle residual amount detection sensor (not shown) is provided, which detects the residual amount of staple needles stored inside the stapler. Note that the sorter option unit 108 is controlled by the sorter controller 108a.

Further, the option controller portion 106, the paper deck controller 107 and the sorter controller 108 are connected with a connector, respectively and a serial communication is performed by the option unit interface 70. They are mutually connected with the same connector and therefore the paper deck option unit 107 and the sorter option unit 108 can be connected by replacing the connecting sequence.

Note that, in the downstream of the above described manual paper feed roller 203, the cassette paper feed clutch 231 and the paper deck paper feed roller 242, the above described pair of resist rollers 205 which convey the recording paper 8, the paper feeding roller 204 and the covey roller 244 are disposed, respectively and, in the downstream of the pair of resist rollers 205, the above described image recording portion 207 which forms the toner image on the recording paper 8 by the laser light emitted from the above described laser scanner portion 206 is disposed. Further, in the downstream of the image recording device 207, the above described fixing device 208 which thermally fixes the toner image formed on the recording paper 8 is disposed and, in the downstream of the fixing device 208, the paper discharge sensor 209 for detecting the conveying status of the paper discharge tray portion, the conveying roller 210 for conveying the recording paper 8, the flapper 211 which changes the conveying direction of the recording paper 8 in which a recording has been completed or the like are disposed.

(Configuration of Control System of Printer 102)

Figure 10:
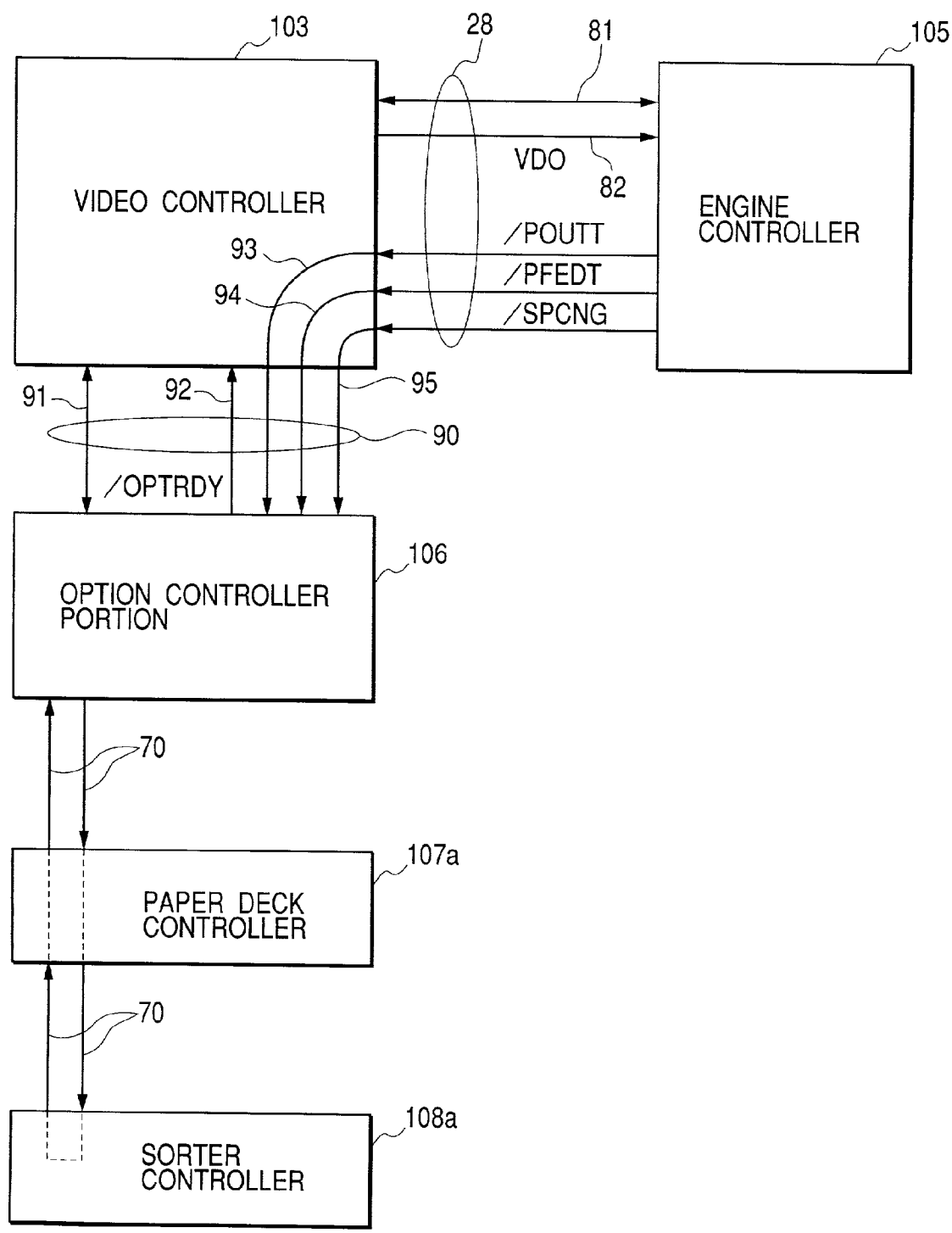
FIG. 10 shows an interface of each controller in the image recording device according to the first embodiment.

FIG. 10 is a block diagram explaining the configuration of the printer 102 as shown in FIG. 8 and the same reference numerals are attached to the same components of FIG. 8.

In FIG. 10, reference numeral 91 denotes a serial communication interface, wherein a command such as a paper feed designation to the paper deck option unit, a paper discharge bin designation to the sorter option unit 108 or the like is transmitted from the video controller 103 to the option controller portion 106. And a status such as the presence or absence status of the paper deck option unit 107, a loading status of each paper discharge bin of the sorter option unit 108, the presence or absence status of the staple needle or the like, are provided to the option controller portion 106. The controller portion 106 and the video controller 103 may be directly connected by a CPU bus.

Reference numeral 92 denotes an OPTRDY signal, which functions as a signal showing whether an option designated by the video controller 103, for example, the staple is in a state of being usable and is transmitted from the option controller portion 106 to the video controller 103. Reference numeral 93 is a POUTT signal, which functions as a timing signal for the printer 102 main body to discharge the recording paper. Reference numeral 94 denotes a PFEDT signal, which functions as a timing signal showing timing for the printer 102 main body to receive the recording paper from the option unit. Reference numeral 95 denotes a PCNG signal, which functions as a signal for speeding down the recording paper S conveyed at high seed inside the option unit and adjusting it to the conveying speed of the printer 102.

Reference numeral 81 denotes a communication interface, wherein a command such as a paper feed designation to the paper feed cassette of the printer 102 main body, a paper discharge designation to the paper discharge tray 231 of the printer 102 main body, a printing or the like is transmitted from the video controller 103 to the engine controller 105 and a status such as the paper presence or absence status of the cassette 230 of the printer 102 main body, a paper jam or the like is transmitted from the engine controller 105 to the video controller 103. Reference numeral 82 is a VDO signal, which shows a bit data transmitted from the video controller 103.

In addition (not shown), the control for each process by this engine controller 105 is executed based on the signals exchanged with the video controller 103 and, as these signals, there are available such signals as /CPRDY, /PPRDY, /RDY, /PRNT, /VSREQ, /VSYNC, /BD, /SCLK, /CMD, /CBSY, /STS, /SBSY, /CCRT (Condition Change Report), the details of which are as shown in FIG. 11.

Among the above described signals, to show a using method of the/CCRT signal, the following procedure 1 and the procedure 2 are followed for its process.

(Procedure 1)

The video controller 103 usually checks the /RDY signal and the /CCRT signal and, when there is found any change in these signals, it is hard to read a status information. On that occasion, when the /CCRT signal became "FALSE" and the /DYR signal became "FALSE", at first a status of the contents such as misprint, wait, sleep, operator call or the like are checked. According to the result, a lower status corresponding to each bit is referred and confirmed.

(Procedure 2)

On the other hand, when the /CCRT signal became "TRUE", at first a status such as changes in the paper size, changes in the presence or absence of the paper feed portion paper, changes in the paper feed portion function, changes in the contents of the warning or the like is read and the type of the changed status is recognized, and the status of the group is read in order to recognize the detail.

Further, regarding a reset procedure of the /CCRT signal, the engine controller 105 always checks status changes in the lower end, that is, changes in the paper size, changes in the presence or absence of the paper, changes in the function of the paper feed portion and changes in a warning status and, when there is found any change, the status change status corresponding to the upper end is as "1" and the /CCRT signal which is a hard signal is set as "TRUE".

After that, a status request command is received from the video controller 103 and the status change status is read by the video controller 103, thereby setting the /CCRT signal to "FALSE".

Further, the overall interface 90 is constituted by five pieces of the hard signals such as the serial interface 91, the OPTDY signal 92, the POUTT signal 93, the PFEDT signal 94 and the PCNG signal 95.

Note that three signals of the POUTT signal 93, the PFEDT signal 94 and the PCNG signal 95 are outputted from the engine controller 105 and inputted to the option controller portion 106 through the video controller 103 through the video interface 80. The detail of the above described each signal is shown in FIG. 12.

(Configuration of Video Controller)

Figure 13:
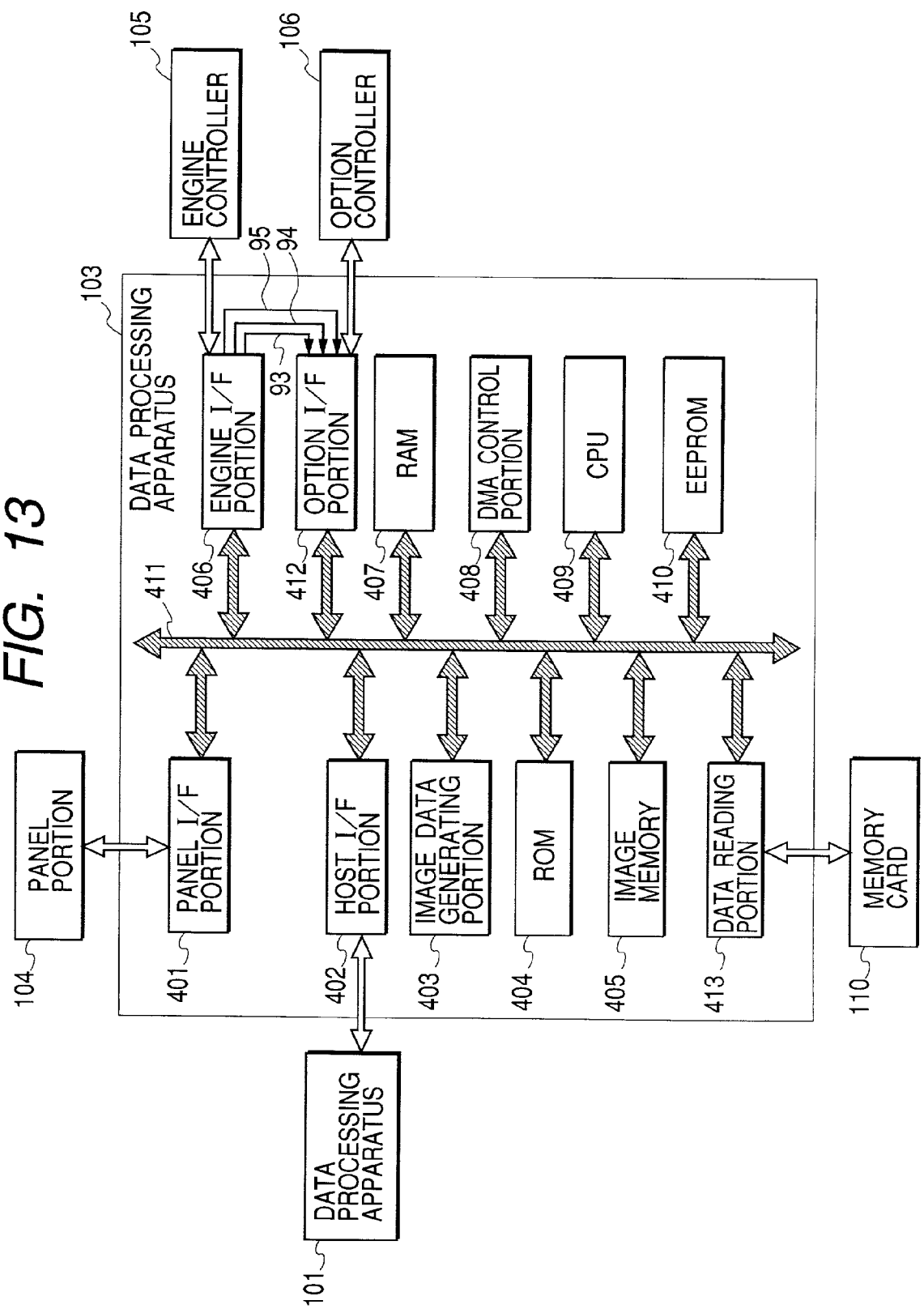
FIG. 13 is a block diagram of the detailed configuration of the video controller according to the first embodiment.

FIG. 13 is a block diagram explaining the configuration of the video controller 103 as shown in FIG. 8 and the same reference numerals are attached to the same components of FIG. 8.

In FIG. 13, reference numeral 401 denotes a panel interface (I/F) portion, which receives various settings and instructions from an operator from the operation panel 104 by a data communication with the operation panel 104.

Reference numeral 402 denotes a host interface (I/F) portion, which is an input output portion of a signal with the data processor 101. Reference numeral 406 denotes an engine interface (I/F) portion, which is an input output portion of a signal with the engine controller 105 and performs a data send and receive from an output buffer resistor (not shown) and a communication control with the engine controller 105.

Reference numeral 403 denotes an image data forming portion, which generates a bit map data for an actual printing based on the control code data transmitted from the data processor 101. Reference numeral 405 denotes an image memory, which stores an image data. Reference numeral 409 denotes a CPU, which governs the control of the whole of the video controller 103. Reference numeral 404 denotes a ROM, which stores a control code of the CPU 409. Reference numeral 407 is a RAM, which functions as temporary storage means used by the CPU 409. Reference numeral 410 denotes an EEPROM, which is constituted by a non-volatile memory medium.

Reference numeral 408 denotes a DMA control portion, which transmits the bit map data inside the image memory to the engine interface portion 406 by the instruction from the CPU409. Reference numeral 412 denotes an option interface (I/F) portion, which performs a communication with the option controller portion 106 according to the instruction from the CPU 409 and also transmits POUTT93, PFEDT94 and SPCNG95 to the overall interface 90 through the engine interface portion 406.

Reference numeral 413 is a data reading portion, which performs the reading of the printing data based on the insertion of the memory card 110 or the instruction from the operator from the operation panel 104. Based on the data read here, a printing is executed similarly to the receiving time of the data from the data processor.

Reference numeral 411 denotes a system bus, which comprises an address bus and a data bus. The panel interface portion 401, the host interface portion 406, the image data generation portion 403, the ROM 404, the image memory 405, the engine interface portion 406, the RAM 407, the DMA control portion 408, the CPU 409, the EEPROM 410 and the option interface portion 412 are respectively connected with the system bus 411 and accessible to all the functional portions on the system bus 411.

Figure 17:
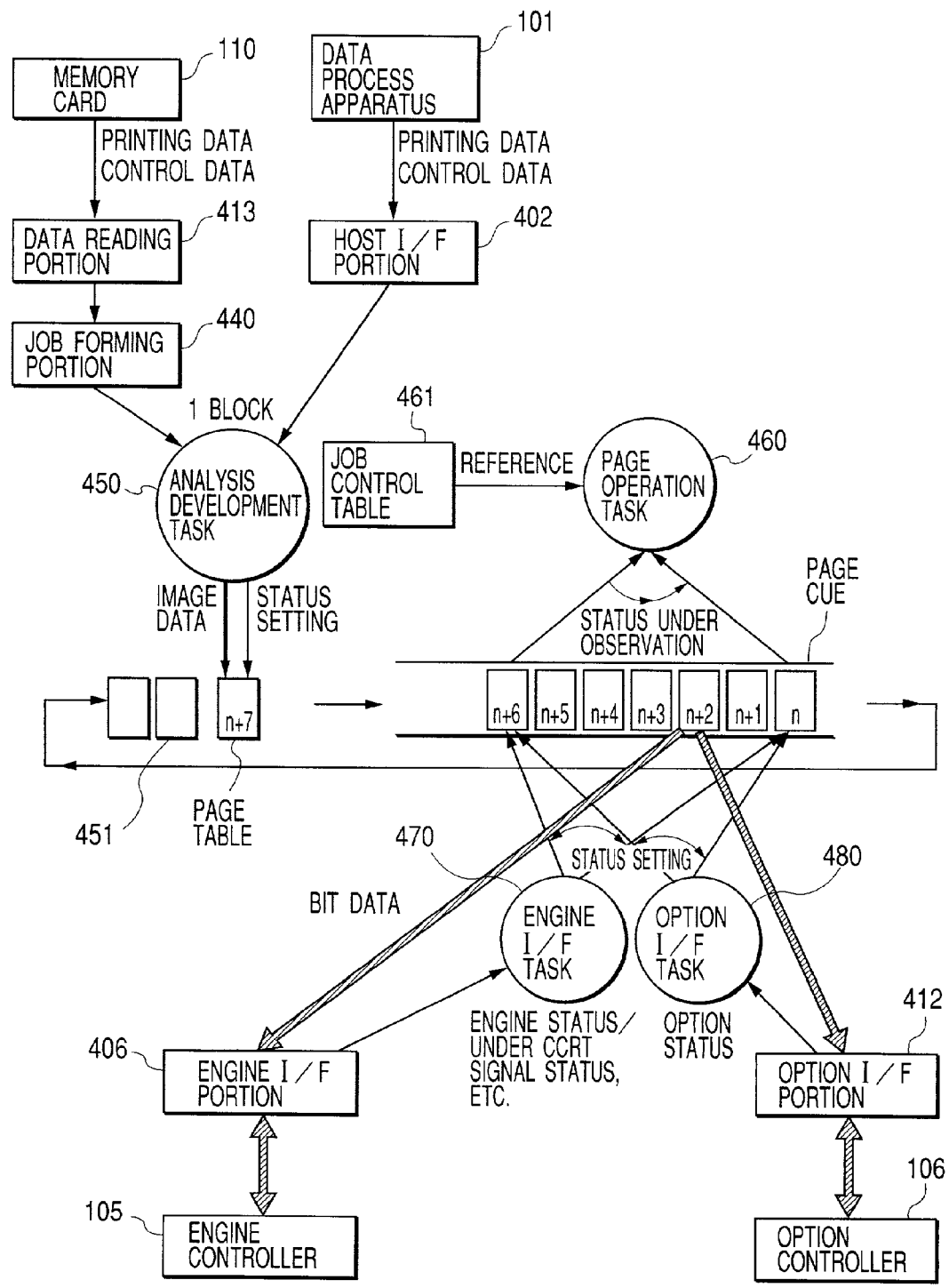
FIG. 17 shows a data flow in the image recording process according to the first embodiment.

Note that the control code for controlling the CPU 409 shall be constituted by an OS which performs a time sharing control by a load module unit referred to as a task by a system clock (not shown) and a plurality of load modules (tasks) which operates by a functional unit as shown in FIG. 17 to be described later.

(Common Memory)

FIG. 14 is a typical view of the common memory with the video controller 103 to be secured by the RAM disposed inside the option controller portion 106 as shown in FIG. 8 in the present example, and FIG. 15 is a typical view showing the procedure for issuing a command status based on the basic status and obtaining the detailed information of each input and output option.

First, a control method for the video controller 103 to multi-control each option device through the option controller 106 will be described by using FIG. 14 and FIG. 15.

The common memory as shown in FIG. 14 is constituted by a conveying status control area which performs a page designation and learning conveying status of papers, a basic status portion for learning about an abnormal status of each option, a command status portion for performing exchanges of command statuses and a rising up process portion for designating the rising up process of the option device.

The rising up process portion comprises a rising up designation portion which performs the designation from the video controller 103 and a completion notice portion for notifying that each portion has completed the process as a result of the designation performed. The video controller 103 performs a designation to this rising up process portion, so that the rising up process of each class of option is performed. When the electric power source is inputted, a designation of initialization of the common memory from the video controller 103, a designation of acquisition of the configuration information of each option which is required at the option controller 106, a completion of acquisition of the information or the like are notified to a rising up designation portion, and the completion notice portion is watched to see whether each process has been completed and, when all is completed, the rising up process is completed.

The conveying status control area comprises a portion for designating a printing method such as a feed port, a paper discharge tray, color/mono-color, a stapling position and execution and a portion to be taught about a option status such as how far the paper was fed, is it all right if a printing signal is outputted, was the discharge completed or the like. The video controller 103 designates the above described printing method and executes the printing, while grasping each option status.

The above described designation is possible for the maximum 40 pages and the designation is made in order for every one page. The area which has completed the discharge is taken as a vacant area and initialized so as to be re-designated and used as a ring buffer.

The basic status portion is an area which notifies an abnormal status of each device, and a status such as no paper, a paper jam, a door open, a failure, fully loaded or the like is obtained from this area. From the contents of the basic status, further detailed information is obtained by the command status.

The command status portion is an area which performs acquisition of the detailed information of each option and the operation control of each option and designates a command according to the requirement of this area and obtains the information.

For example, the obtainable information is such as a device name, a feeding paper size, a feeding paper residual amount, a location of paper jam, a type, an access point, a load capacity of the discharge paper, a detail of failure or the like.

Figure 15A:
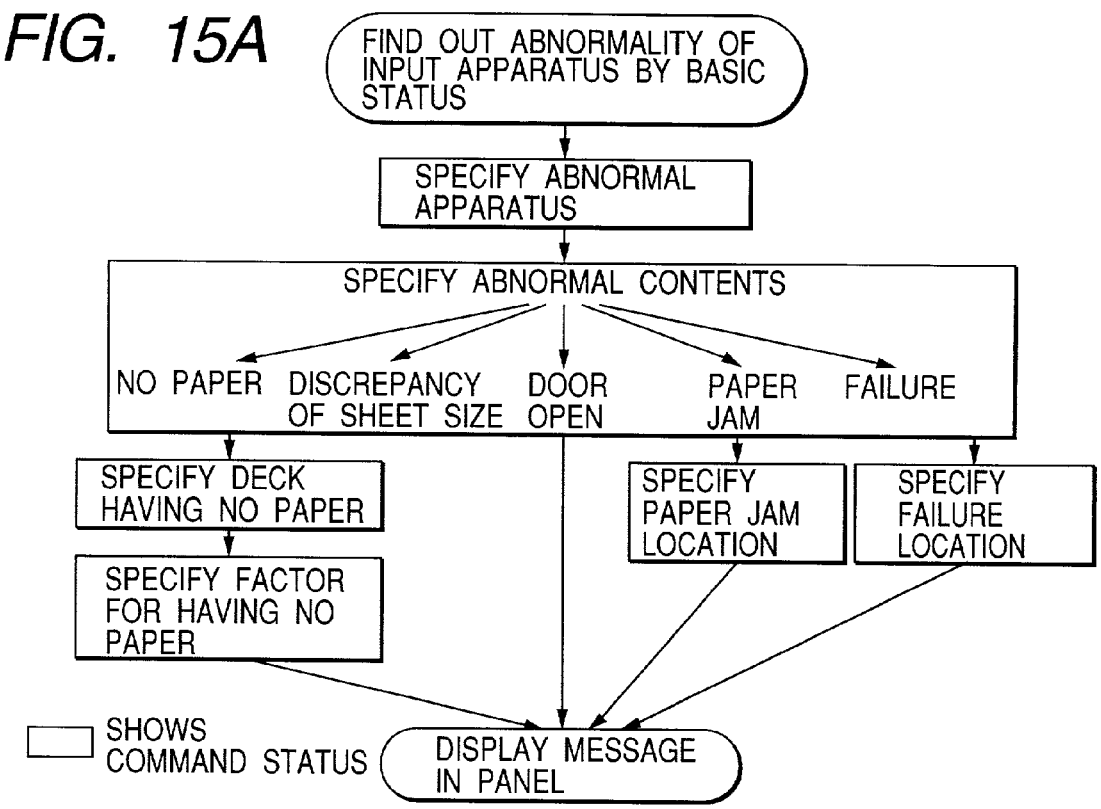
FIGS. 15A and 15B show a type of the procedure of obtaining detained information about each paper supply/output option unit by issuing a command status based on a basic status of an option unit according to the first embodiment.
Figure 15B:
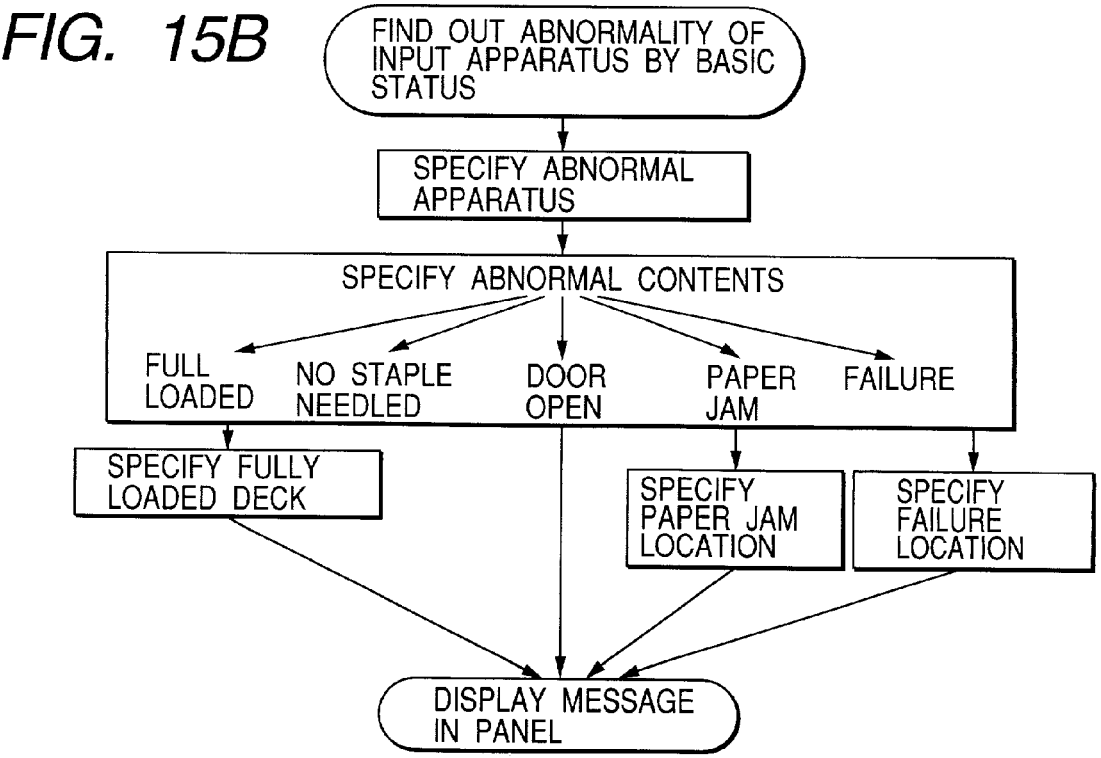

As shown in FIGS. 15A and 15B, these portions issue commands according to respective situations and receive statuses. Further, the option control such as a shift to a power energy saving mode, an emergency stop at the time of paper jam, a movement of the discharge bin, a reset execution or the like is performed also by using the command status portion.

In this way, the video controller 103 obtains the above described information and executes the printing in a status having no abnormality and, when an occurrence of the abnormality is detected from the basic status, a command status specifying an abnormal place is issued and, further, an abnormal contents are specified for that device and a collection of detailed information and a control corresponding to the abnormality are performed.

(Option Information Acquisition Process)

Figure 16:
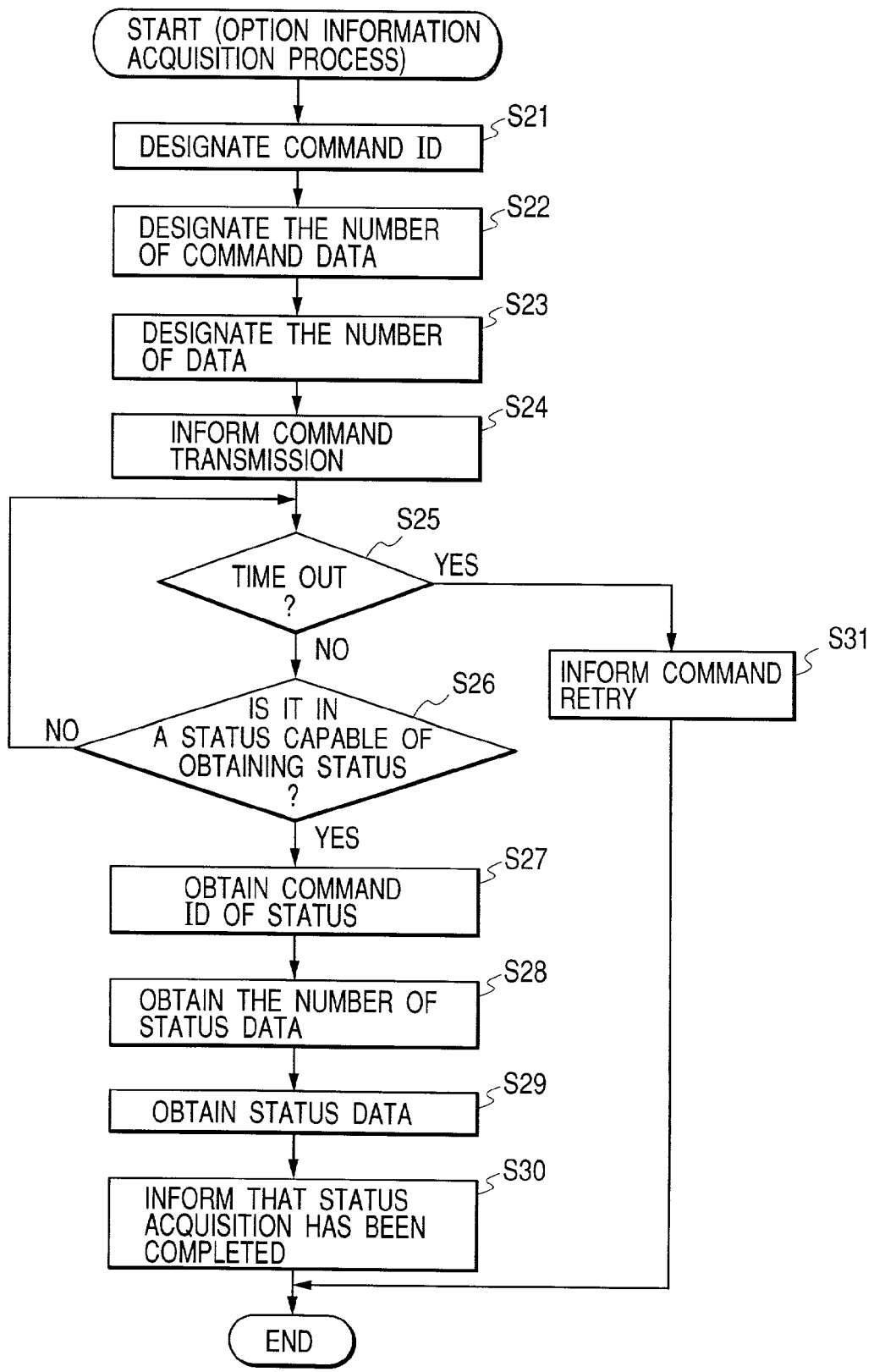
FIG. 16 is a flowchart of an embodiment of a method of obtaining option information through an option controller according to the first embodiment.

FIG. 16 is a flowchart showing a setup for performing an access with the common memory provided for the option controller 106, exchanges of the command statuses and exchanges of the information with each option.

In FIG. 16, when the video controller 103 obtains the option information, it performs a designation to the command status control area inside the memory provided for the option controller 106 and receives the information. The command designation area is notified that ID (S21) for identifying the type of necessary information, the number of data (S22) that designates to option controller 106 in execution command and the data (S23) displaying the designated contents was designated to a predetermined address and a command was transmitted, and the option controller 106 performs exchanges of the information with each option device and is subjected to a trigger (S24) for obtaining the information. Based on the trigger by S24 and the designated contents, the option controller 106 performs a serial communication with the required option device and obtains the designated information.

On the other hand, until the option controller 106 completely obtains the information, a timer is activated to watch whether the video controller 103 is in a status capable of obtaining the status information (S25, S26).

Even after a certain period of time elapses, when it does not move into the status capable of obtaining the status information, because the status information can not be obtained, a re-try notice is issued so that the command is executed once again (S31) and the process is completed.

In S26, when it moves into a status capable of obtaining the status information, an ID of the status is obtained and a confirmation is made as to whether it is the status information for the designated command (S27).

Next, the number of status data is obtained (S28) and the status data is obtained for the number of status data (S29) and a completion of acquisition of statuses is notified to the option controller 106 (S30).

(Data Process Flow)

FIG. 17 shows a data flow from the data processor 101 or the memory card 110 to the option controller portion 106 and the engine controller portion 105.

The control code for controlling the CPU 409 shall be constituted by an OS (an operating system) which performs a time sharing control by a load module unit referred to as a task by a system clock (not shown) and a plurality of load modules (tasks) which operates by a functional unit.

In FIG. 17, a translator process system (an analysis development task), a scheduling system (a page operation task), an engine I/F system (an engine I/F task) and an option I/F system (an option I/F task) are tasks with the CPU 490 as an entity and theoretically perform a parallel operation.

Figure 18A:
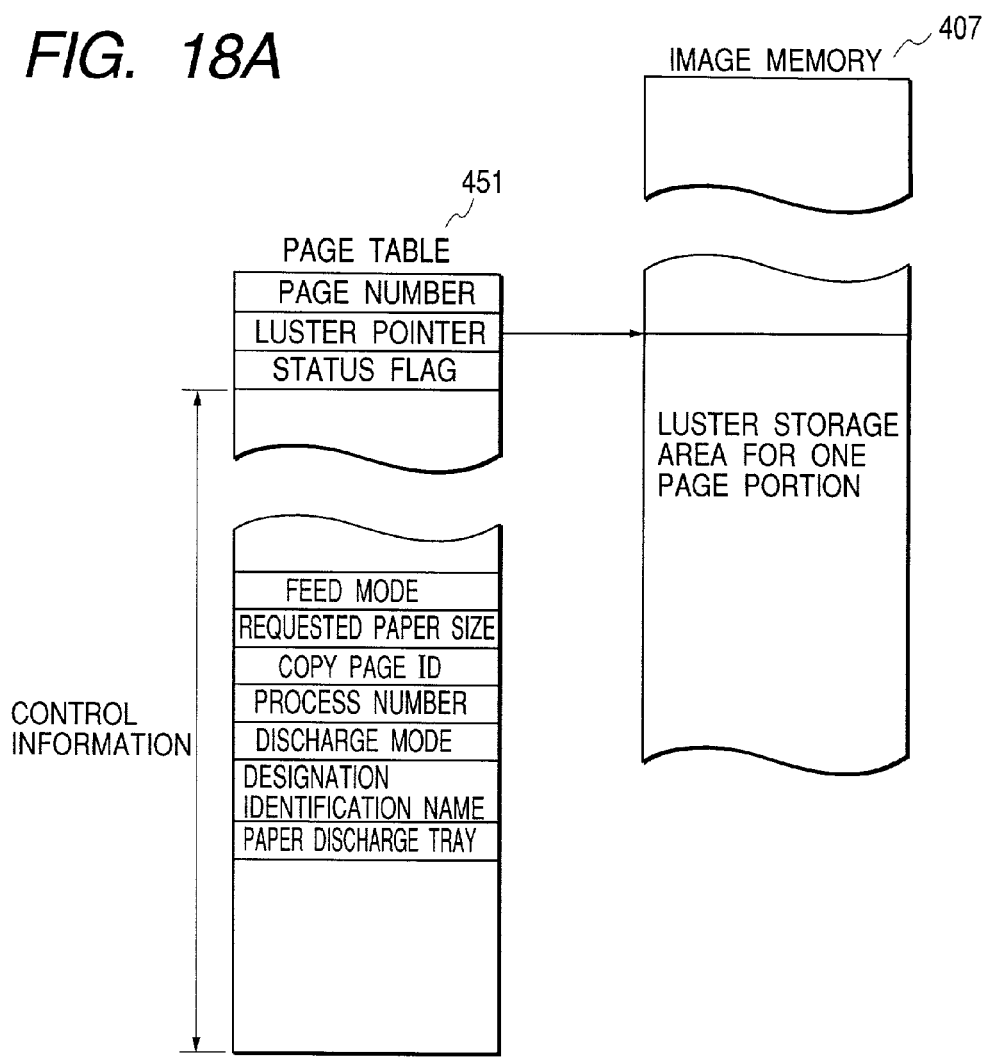
FIGS. 18A and 18B show a map relating to a page table in the RAM according to the first embodiment.
Figure 18B:
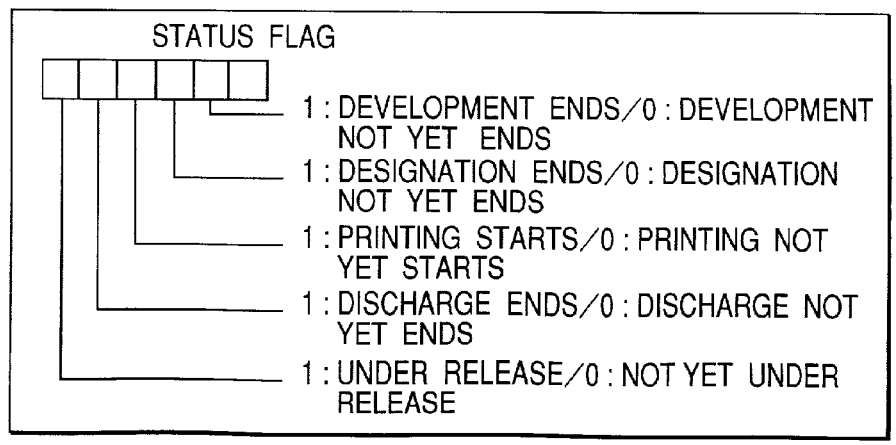

FIGS. 18A and 18B show a configuration of the page table which stores the page information in FIG. 17.

The page table is a table for theoretically recognizing each page in the CPU 409 and its entity exists as a continuous area in the control information storage area of the above described RAM 407, and acquisition and release are controlled by a page control function portion (not shown).

"Luster pointer" in FIGS. 18A and 18B are a top pointer for one page portion in the above described image memory 405, and the CPU 409 divides the corresponding areas (not shown) in the above described image memory 405 for every page and link them here at the initial stage of the power source input.

"Status flag" is an area in which a flag showing the status of a page is stored, wherein
 "Development end flag"
 "Page designation end flag"
 "Printing start flag"
 "Discharge end flag"
 "Release flag"
 "Release flag"
are available, and it is possible to judge in what status the page information prepared by this status flag is.

For example, "paper discharge mode" designates a method of deciding discharge means, of which
 "Automatic feed"
 "Cassette 1 (cassette 230) feed"
 "Paper deck (cassette 107) feed"
 "MP tray feed"

are available (not shown). The "automatic feed" is a mode in which a paper size agrees and, from feed means loaded with papers, a retrieval is made according to a predetermined priority order and a decision is made to feed.

"Requested paper size" stores a numerical expression of the size of paper to feed which is requested to the engine controller 105.

Figure 21:
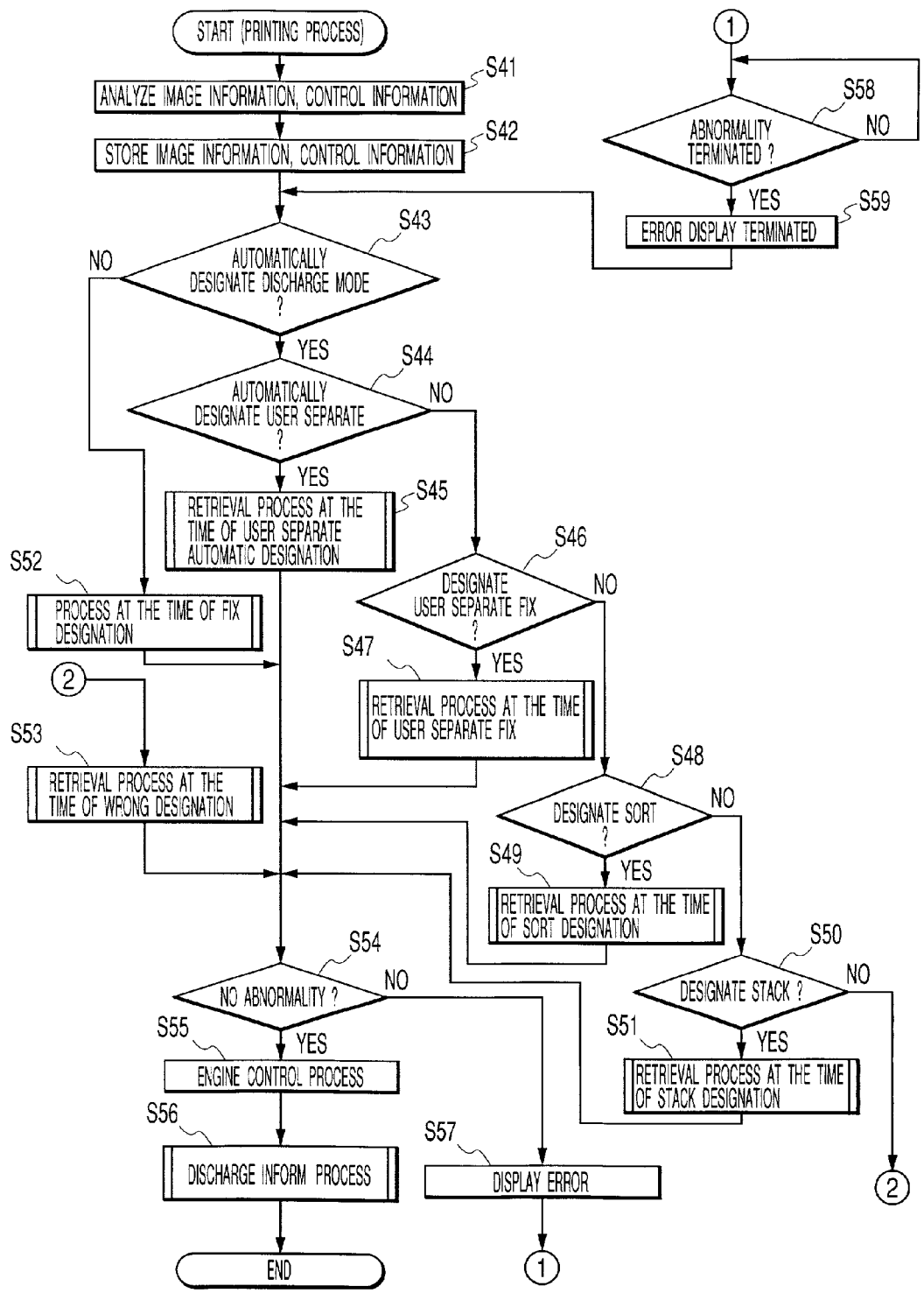
FIG. 21 is a flowchart of a process procedure of an image recording device receiving print data until the completion of the printing process according to the first embodiment.
Figure 22:
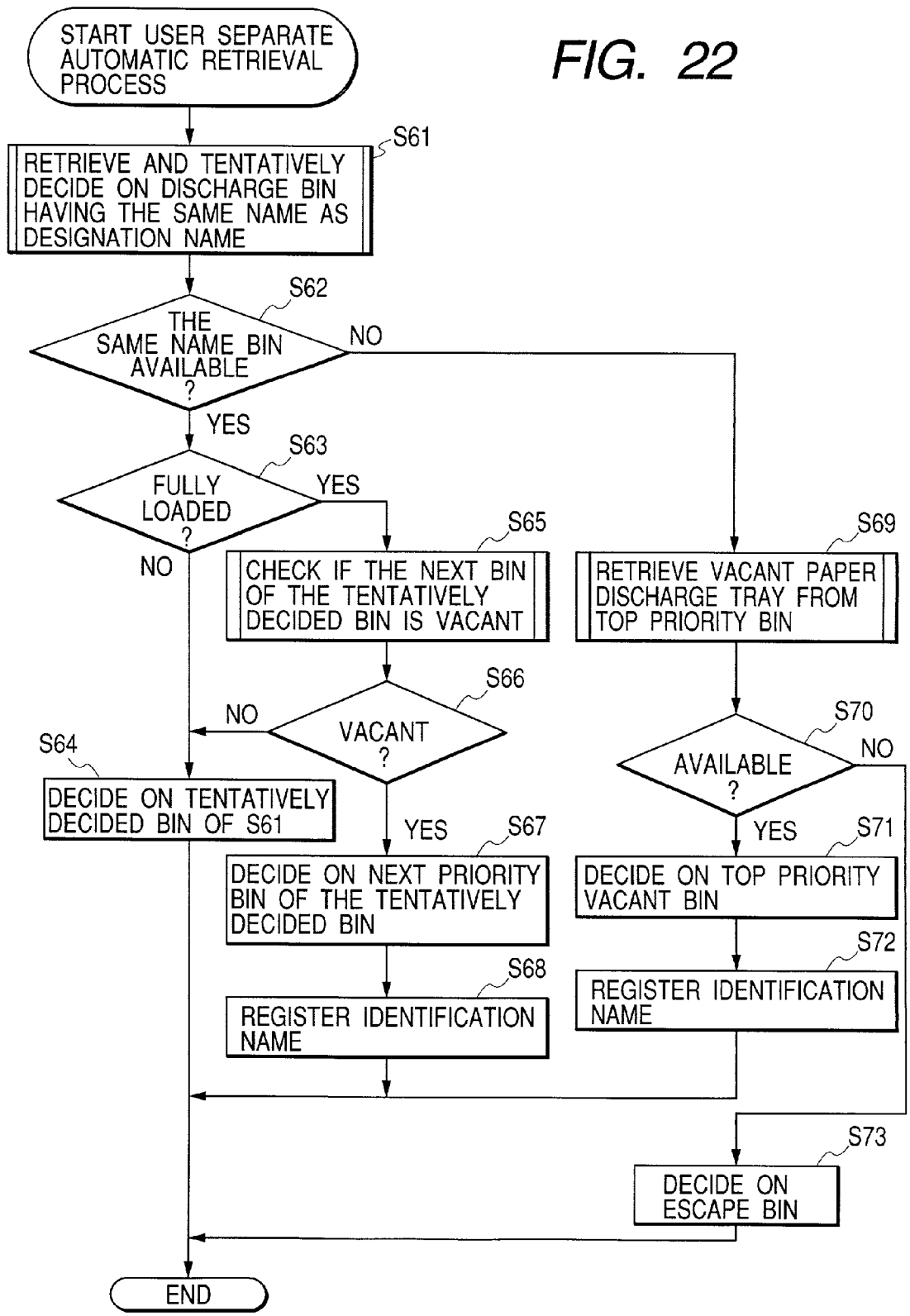
FIG. 22 is a flowchart of a procedure of retrieving a paper output port in a user separately automatic mode according to the first embodiment.

In addition, "paper discharge mode" instructs a method of deciding discharge means, and "user separate automatic mode" and "user separate fix mode" are designated by this "paper discharge mode". When "user separate automatic mode" and "user separate fix mode" are designated, the name which was designated as a discharge end is stored in "designated identification name", and the actual paper discharge tray decided by a paper discharge tray retrieval process to be described later in FIG. 21 and FIG. 22 is stored in the "paper discharge tray".

(Job Control Table)

Figure 19:
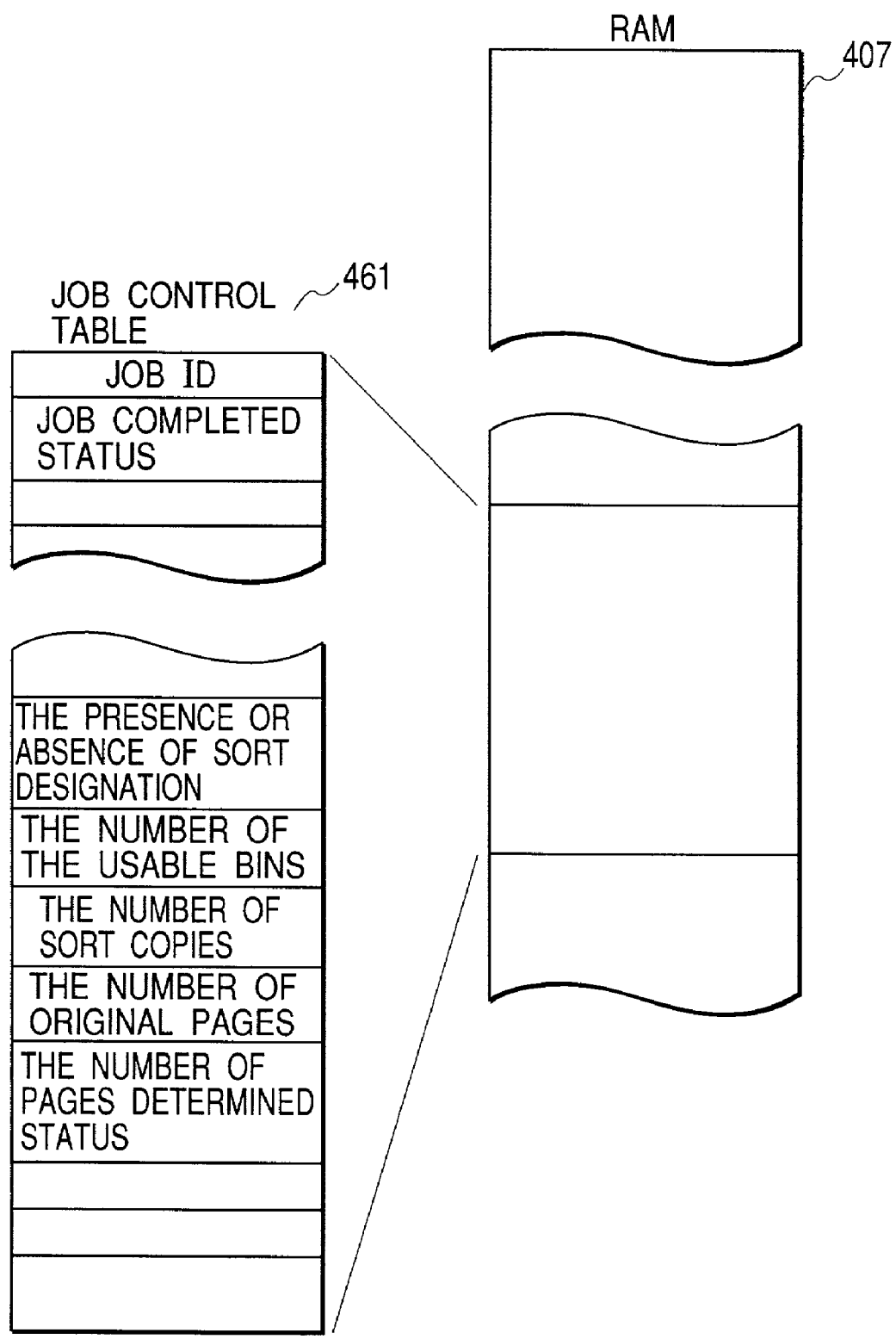
FIG. 19 shows the map relating to a job control table in the RAM according to the first embodiment.

FIG. 19 shows a configuration of the job control table 461 within the RAM 407.

The job control table 461 is a status and a content of the input job grasped in the video controller 103 and its entity exists as a continuous area in the control information storage area (not shown) of the above described RAM 407, and acquisition and release are controlled by a job control function portion (not shown).

Any of the above described tables are referred and renewed from the analysis development task, the page operation task, the engine I/F task and the option I/F task.

(Engine Status Table)

Figure 20:
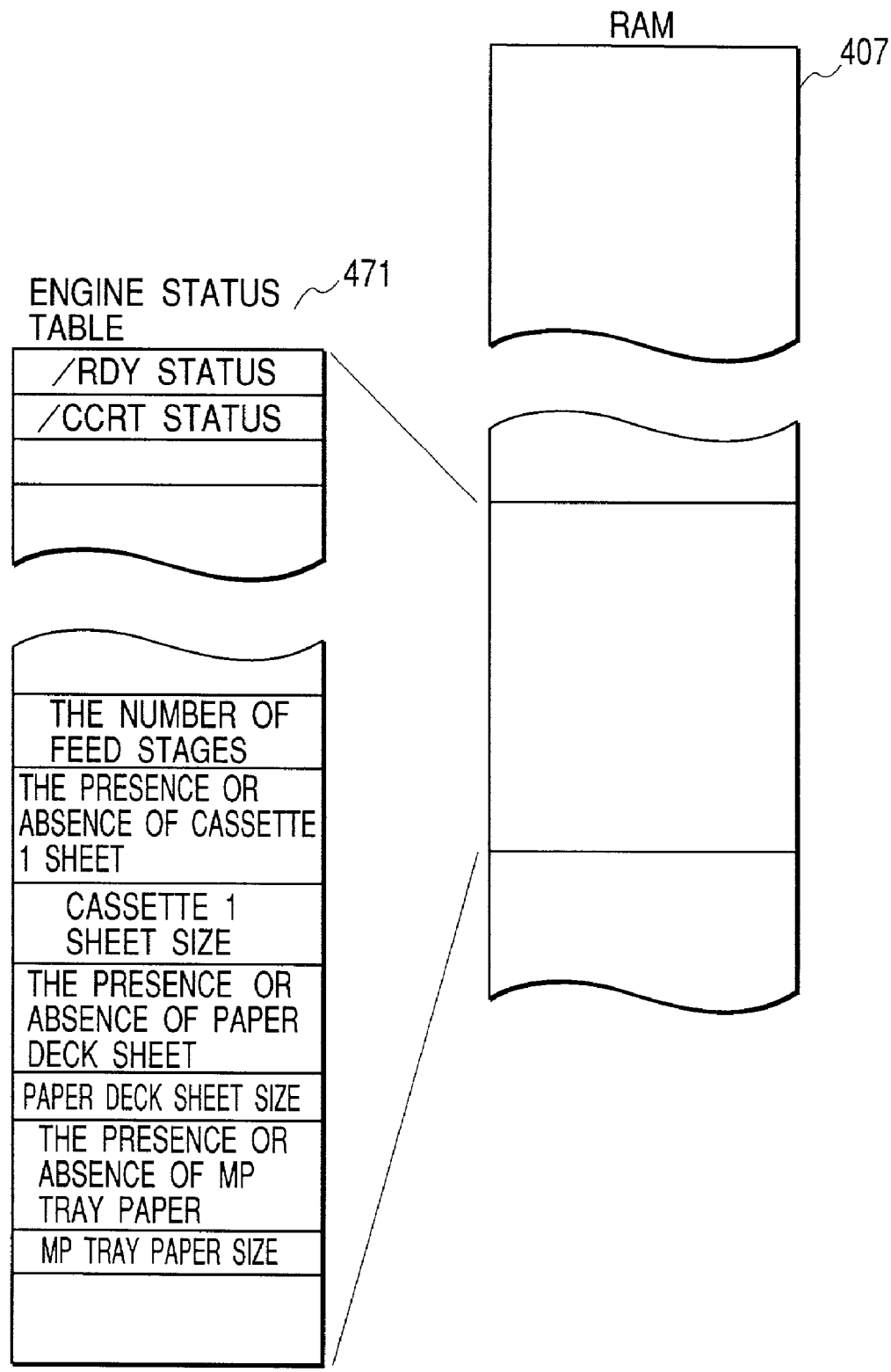
FIG. 20 shows a map relating to an engine status table in the RAM according to the first embodiment.

FIG. 20 shows a configuration of the engine status table 471 within the RAM407.

The engine status table 471 is a status of the engine controller 105 grasped in the video controller 103, which is not identical with the status of the actual engine controller 105, but the status of the engine controller 105 is reflected at a random timing by a predetermined communication and is renewed.

For example, the "/RDY status" is a flag which reflects a status of the /RDY signal and is set as "TRUE" during the engine I/F task detects the "FA1SE" of the /DFY signal.

The "/CCRT status" is a flag reflecting the status of the /CCRT signal, and the status of the actual /CCRT signal is reflected by the engine I/F task. When the engine I/F task detects the "TRUE" of the /CCRT signal and obtains a status of the engine controller 105 by a predetermined serial communication, the /CCRT signal becomes the "FALSE" as described above.

"The number of feed stages" reflects a installation of an option cassette unit or the like and is the selectable number of feed stages.

"Presence or absence of cassette 1 paper" is the presence or absence of the paper of cassette 230. The "cassette 1 paper size" is a paper size set up by a dial not shown of the cassette 230, and an operator, from the premise that the paper having the same dial value is loaded, recognizes the size as a paper size of the cassette 230.

"Presence or absence of paper deck paper" is the presence or absence of the paper of the cassette 107. The "paper deck paper size" is a paper size set up by a partition plate not shown of the feed option cassette 107, and an operator, from the premise that the same paper as the value of the partition plate is loaded, recognizes the size as a paper size of the feed option cassette 107.

Here, the data flow of FIG. 17 will be described.

As an inputting method of the printing data, there are the cases from the data processor 101 and from the memory card 110 and, in the case of printing from the data processor, the printing data (a control code, PDL or the like) to be inputted is stored in the host interface portion 402 by a predetermined block unit and, in the case of printing from the memory card 110, the data reading portion 413 reads the image forming instruction file 20 inside the memory card 110, the image file 10 or the like and forms the same printing data (a control code, PDL or the like) as the printing data to be formed in the data processor 101 in the job generation unit 440 inside the ROM 404 and stores it by a predetermined block unit.

Further, the host interface portion 402 can input the image forming instruction file 20 from the data process unit 101 and also the image file 10 and, when these file data are inputted, the data reading portion 413 reads the image forming instruction file 20 from the host interface portion 402 and also the image file 10 and forms the same printing data (a control code, PDL or the like) as the printing data to be formed in the data processor 101 in the job generation unit 440 inside the ROM 440 and stores it by a predetermined block unit.

When the analysis development task 450 detects a data in the host I/F portion 402 or the job generation unit 440, it obtains the page table 451 and analyzes the data by the above described 1 block unit. Regarding the image forming information (a graphic drawing command of the PDL, a character code or the like), an image development is performed by using the image data generation portion 403 (not shown in FIG. 17) or by the CPU 409 itself and it is stored in the area shown by "luster pointer" of the page table 451.

Further, regarding the control information (the number of copies, a feed paper selection or the like) for the printer 102, it is stored in the page table. After the analysis and development of a data of one page is completed, "development ends" is set as TRUE and enqueued in the page queue of FIFO structure.

The page operation task 460 simultaneously watches the "status flags" of all the pages in the above described page queue and changes a conveying procedure according to the status and realizes the printing. On that occasion, the printing indication such as feed means, discharge means, printing mode or the like is performed by the option I/F portion 412 and the setting such as feed means or the like is actually performed for the engine controller 105 by the engine I/F portion 406. The page table 451 in which "discharge end flag" became TRUE is dequeued from the page queue and returned to the above described page control function portion.

The engine I/F task 470 and the option I/F task 480 perform communications respectively with the engine controller 105 and the option controller 106 through the engine I/F portion 406 and the option I/F portion 412 and, when a factor to cause a change in the page status occurs, the above described "status flag" is renewed. Further, the change of the /RDY signal is watched and, for the change of TRUE→FA1SE, a printer status is indicated as an error under development and an release of the error is watched. Further, changes of the status such as the /RDY signal and the /CCRT signal or the like are watched and the above described "procedure 1" and "procedure 2" are executed and the above described "engine status table" is renewed.

The operation mode designation (the number of copies, a feed paper selection or the like) from operation panel 104 is stored once in the panel I/F portion 401. The printer control task (not shown) cyclically watches the panel I/F portion 401 by adequate intervals and, when a data exists, it is stored in the EEPROM 410 and at the same time stored in the control information storage area (not shown) of the RAM 407 as a control information. By being stored in the EEPROM 410, even after the power source of the printer 102 is once turned off, the printer 102 can be operated by the mode desired by the user.

(System Operation)

Figure 23:
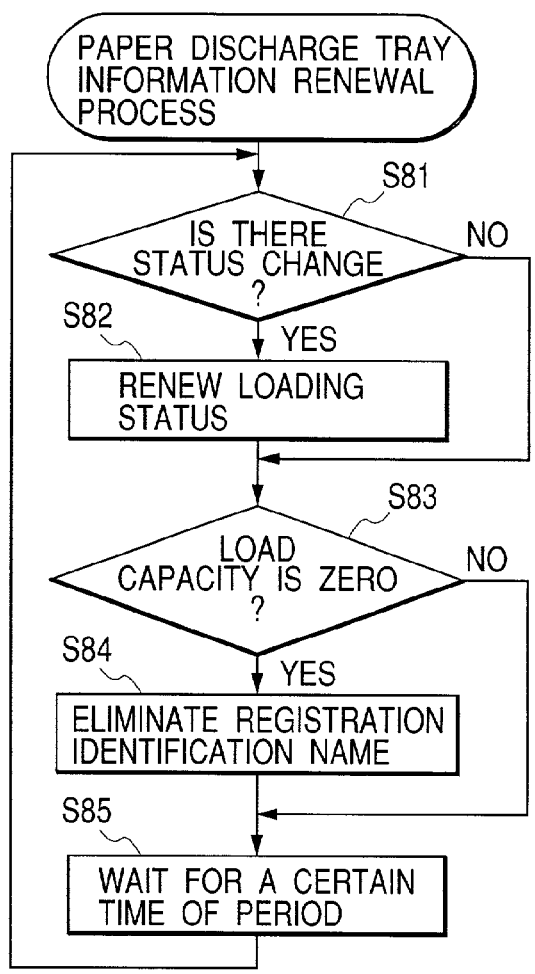
FIG. 23 is a flowchart of the procedure of updating information about each paper output port according to the first embodiment.
Figure 24:
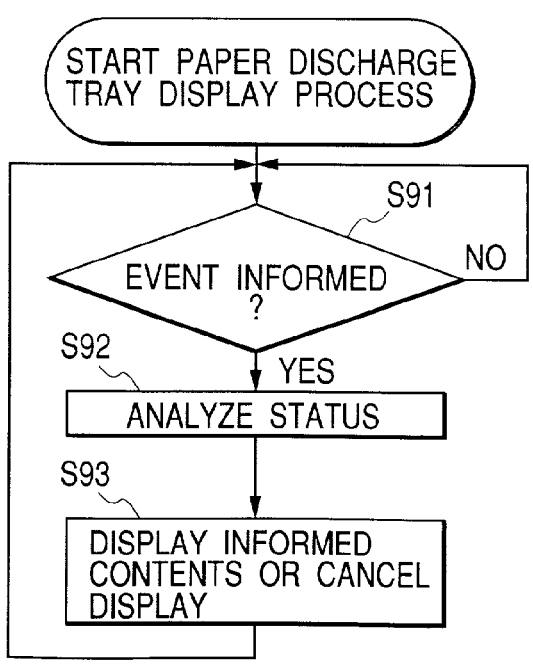
FIG. 24 is a flowchart of the procedure of updating information about each paper output port according to the first embodiment.

FIG. 21 is a flowchart explaining the process from receipt of the printing data to a completion of the printing, FIG. 22 is a flowchart explaining a paper discharge tray retrieval process at the time of the user separate automatic mode, FIG. 23 is a flowchart explaining the information renewal process of each paper discharge tray and FIG. 24 is a flowchart explaining the display process of each paper discharge tray and, based on these drawings, the process performed by the printer will be described.

(Printing Process)

In S41 of FIG. 21, the printing data transmitted from the data processor 101 is analyzed and, in S42, the control information and the image information are developed and stored in the memory.

In S43, from the control information, a judgment is made as to whether the paper discharge mode is an automatic designation and, if not automatic designation, based on the control information, a fixedly designated paper discharge tray is selected (S52) and a judgment is made as to whether there is the presence or absence of an abnormality (S54) and, if there is no abnormality, a printing is executed (S55).

In the case of the automatic designation, a judgment is made as to which one from a plurality of automatic modes is selected in S44, S46, S48 and S50 and, according to the designation, an retrieval process of any of the user separate automatic (S45), the user separate fixed mode (S47), the sorting (S49), the stack (S51) and the wrong designation process (S53) is executed.

In this case similarly to the fix designation time, a judgment is made as to whether there is the presence or absence of an abnormality (S54) and, if there is no abnormality, a printing is executed (S55). In S55, after the printing is executed, in S56, by waiting for the discharge of the printing paper, the discharge is completed or the completion of the job is notified to the data processor 101.

In S54, when the abnormality such as a full loading or the like was detected, an error display is made (S57) according to the contents of the abnormality and, by waiting for the release of the error by the operation of the user (S58), the error display is released (S59)and the process subsequent from S43 is performed again to enter into a recovery process.

When the above described process was repeated and all the discharges of the printing job have ended, a completion notice event of the printing job is transmitted to each data processor 101 and the user is notified which paper discharge tray the paper was now outputted on over the U1 of respective data processors 101 (S56).

(User Separate Automatic Retrieval Process)

Next, in FIG. 22, the process of S45 as shown in FIG. 21 will be described in detail. Note that the detailed description of S47, S49, S51 and S52 of FIG. 21 will be omitted in the present example.

When the retrieval process of the user separate automatic started, first in S61, a discharge bin having the same name as the identification name designated in the printing data is retrieved. As a result of the retrieval, a judgment is made (S62) as to whether there is any discharge bin having the same name available and, if the discharge bin having the same name available, a check is made as to whether the bin is fully loaded (S63).

In S63, if the bin is not fully loaded, the tentatively decided bin retrieved in S61 is selected as a regular bin (S64) and a discharge is made. In S63, if the bin is fully loaded, a bin having a priority next to the tentatively decided bin retrieved in S61 is checked to see if it is vacant (S65). If that bin is not vacant (S66), no new bin registration is made and in S61 the tentatively decided bin retrieved in S64 is decided as a regular bin.

In S66, when the tentatively decided bin retrieved in S61 is vacant, that bin is decided as a regular bin (S67) and an identification name as a bin name of that bin is registered (S68). In S62, if there is no bin having the same name available, in S69 a vacant bin is retrieved from the top priority bins and, if there is any bin having the same name available (S70), the top priority bin from the vacant bins is decided as a regular bin (S71) and an identification name is registered as the bin name of that bin (S72).

In S70, if there is no vacant bin available, another user is previously in use of all the bins and no bin is available to be newly allotted and therefore an escape bin for performing the discharge when a paper output can not be made according to a designation is decided as a regular bin (S73) and the retrieval process is completed.

(Paper Discharge Tray Information Renewal Process)

Next, in FIG. 23, the process for performing the renewal of the information of the discharge bin will be described.

The status of the discharge bin is renewed by obtaining the status information which changes at intervals of a certain cycle.

In S81, a judgment is made as to whether there is any change in the load capacity of the discharge bin. If there is any change, the load capacity is renewed (S82). In S83, when the load capacity was reduced to zero, the identification name of that bin registered at the retrieval time is deleted and taken as a vacant bin status (S84). A wait is made for a certain period of time (S85) and the process subsequent to S81 is repeated.

By the above method, based on the discharge bin name registration status, the printing process is performed by dynamically performing the deletion of the discharge bin registration and a classification is realized by the identification name.

(Paper Discharge Tray Display Renewal Process)

Next, in FIG. 24, the display process of the information showing the status of paper discharge tray of the printer 102 will be described.

Figure 25:
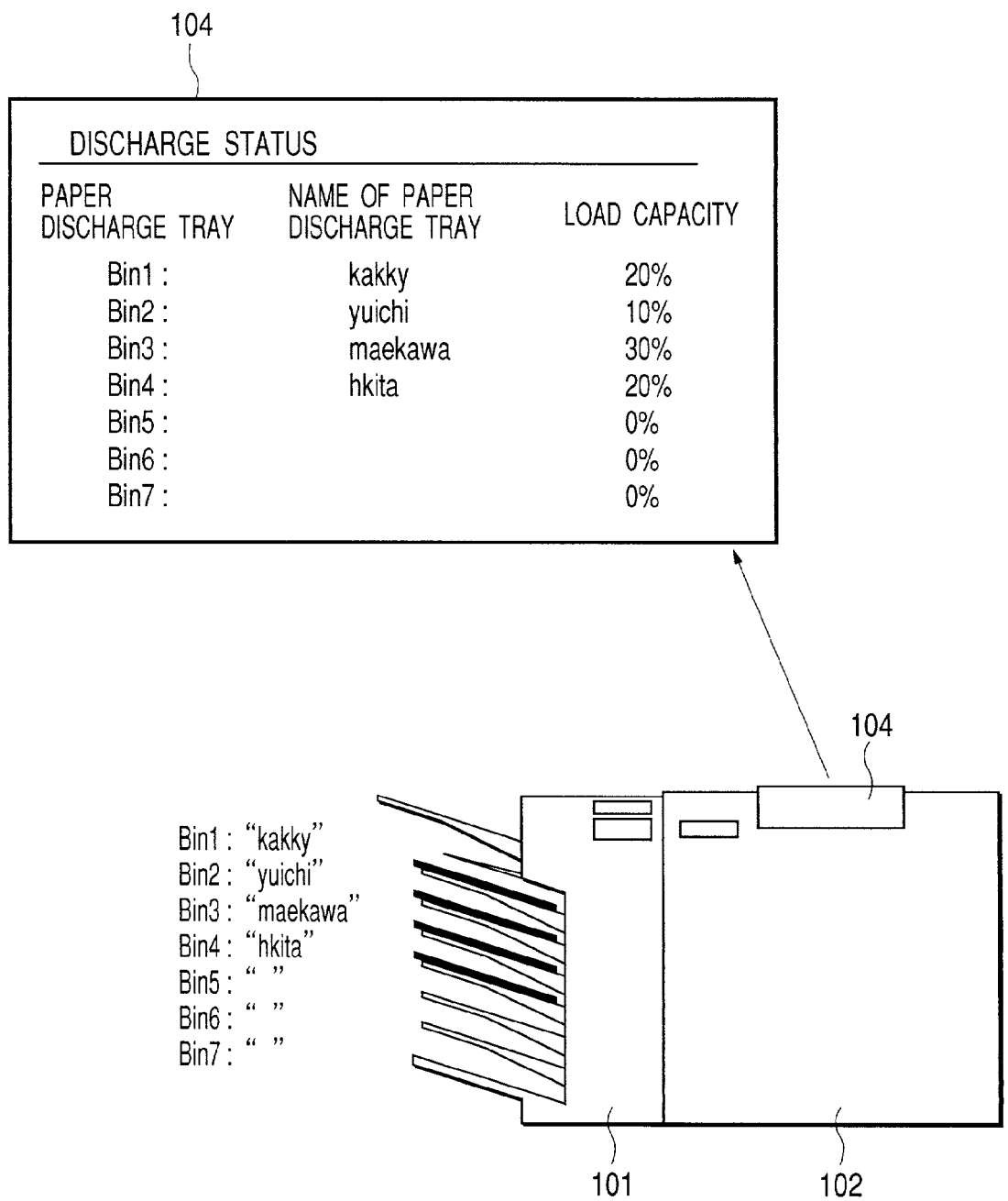
FIG. 25 shows an example of the panel unit of the image recording device displaying the state of outputting paper (load information) at each paper output port according to the first embodiment.

When the status of the printer 102 has changed, in S91, the event is received and its content is analyzed (S92). From the analyzed result, a display or a display release matched to its content is made and the status change of the printer is notified to the user. For example, in the case of the user separate automatic mode, the discharge bins are dynamically allotted such that the user does not know which bin the discharge has been made to until the printing is performed. For this reason, at the closing of the printing job, the information of the bin registered under the identification name designated by that job is displayed in the panel of the printer or the like and, as shown in FIG. 25, the discharge bin information such as a using status of the bin or the like is notified to the user so that the information such as the owner of the printed matters loaded on each bin, a load factor or the like can be recognized at a glance.

Figure 26:
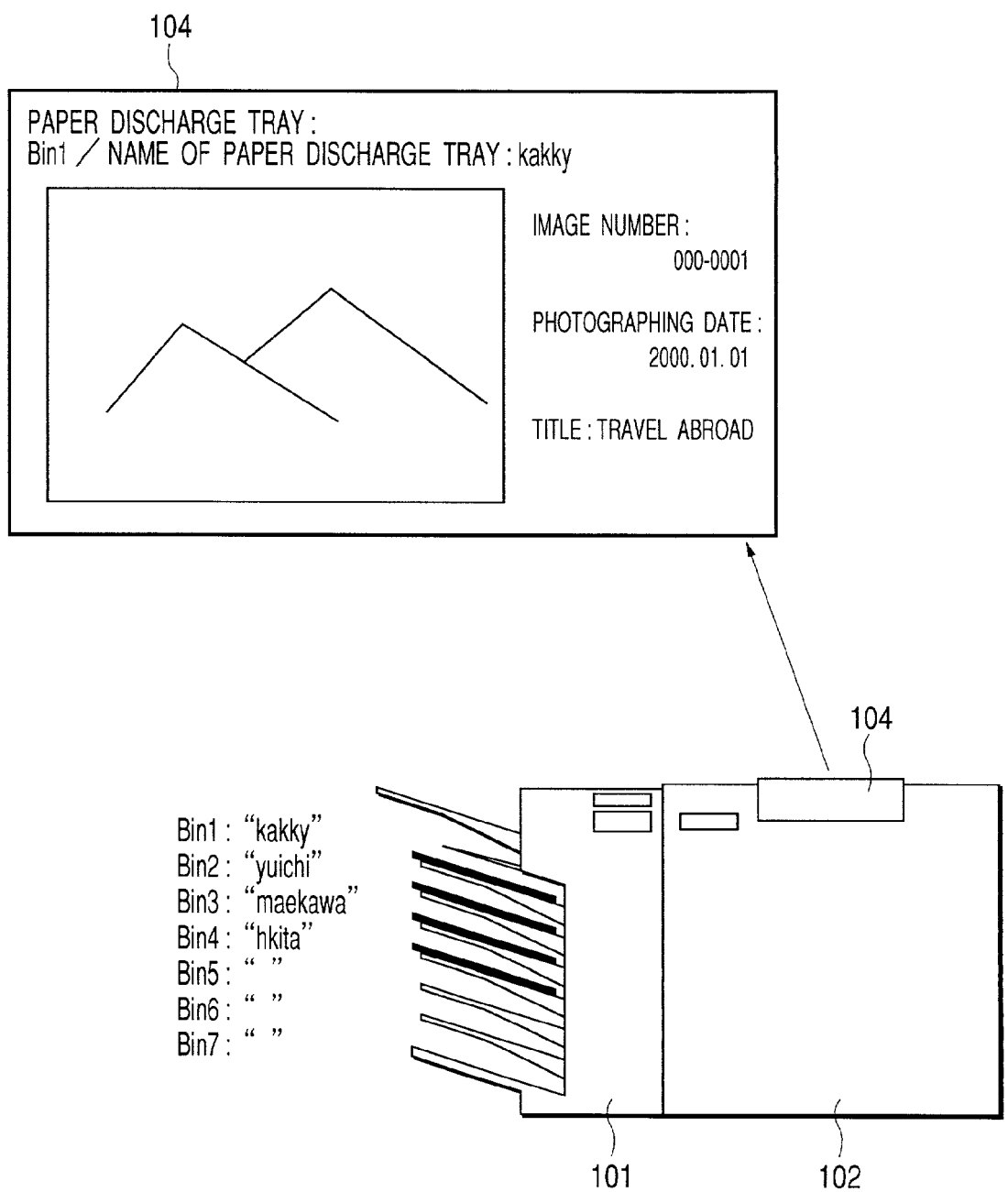
FIG. 26 shows an example of the panel unit of the image recording device displaying in detail an image loaded at a specific paper output port according to the first embodiment.

Further, as shown in FIG. 26, the information such as a paper discharge tray name, an image number, a photographing date, a title or the like may be displayed for a specified paper discharge tray and such information may be displayed by a panel of the printer, a digital camera, a display of the computer or the like and another display device also may be used.

As described above, in the present example, because a printing is started as soon as the printing is instructed, if the user comes to a laboratory to receive a print, it is ready for delivery and his time can be effectively used.

Further, if a home delivery service is designated, the receipt thereof can be made at home or at his company or the like and serviceableness can be enhanced much more.

Second Example

A second embodiment of the present invention will be described based on FIG. 27 to FIG. 35. Note that the same reference numerals will be attached to the same components as the first example and the description thereof will be omitted.

In the first example, the memory card 110 was installed to the image recording device 102 so as to perform a printing.

In the present example, the digital camera 1 and the image recording device 102 are connected by the interface cable which realizes various data transfer systems such as the interface regulated in RS, Centronics, Ethernet, SCSI, USB and IEEE1394, IRDA, BlueTooth or the like and are constituted such that a printing indication is made to perform a printing from the panel of the image recording device or the display device of the digital camera.

The different portion only (FIG. 27 to FIG. 35) from the example 1 of the embodiment of the present invention will be described.

Figure 27:
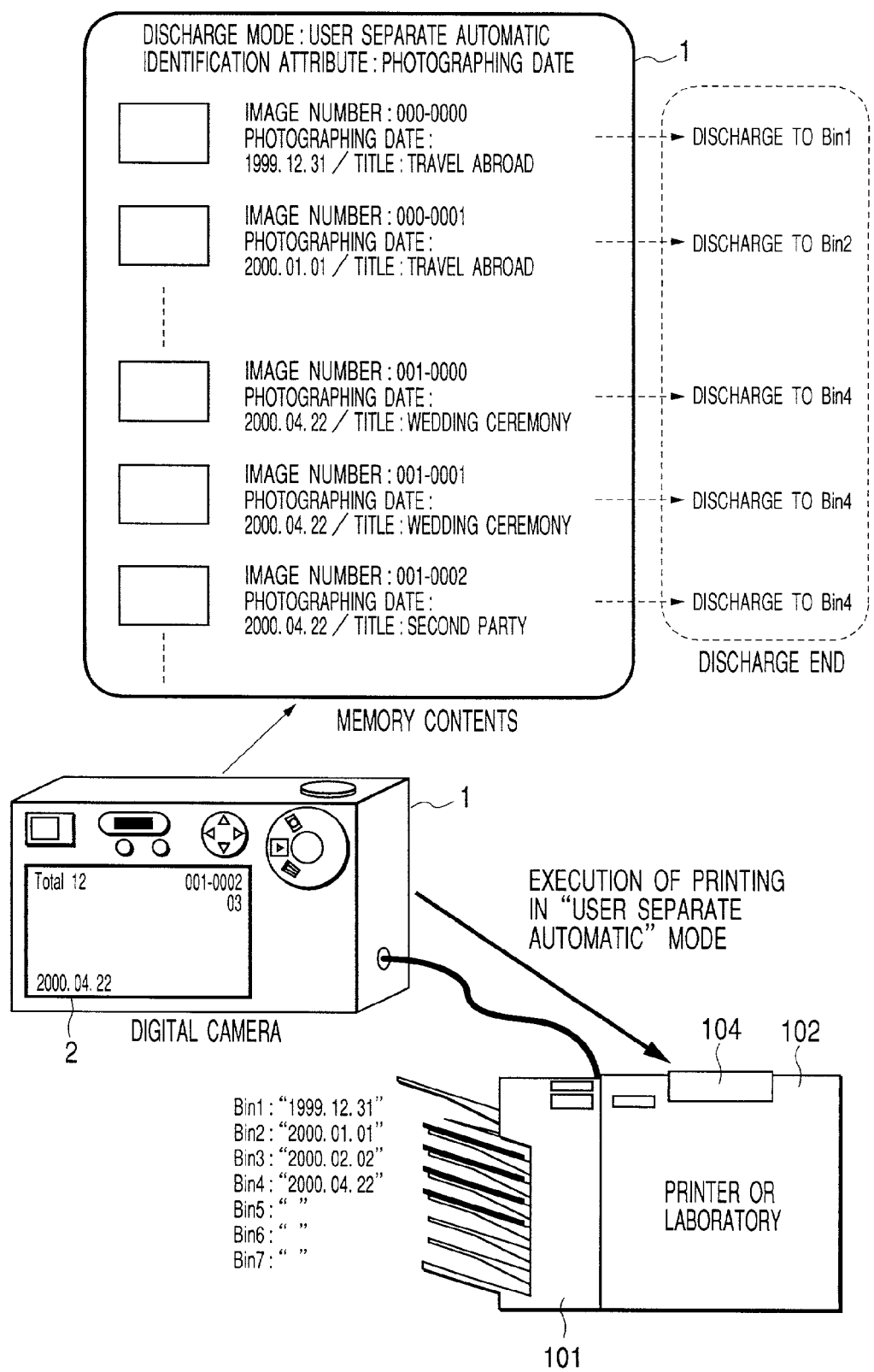
FIG. 27 shows an example of selecting an output image depending on the capture date, and shows the configuration of the system printing out in the user separately automatic mode an image read by a digital camera according to a second embodiment of the present invention.
Figure 28:
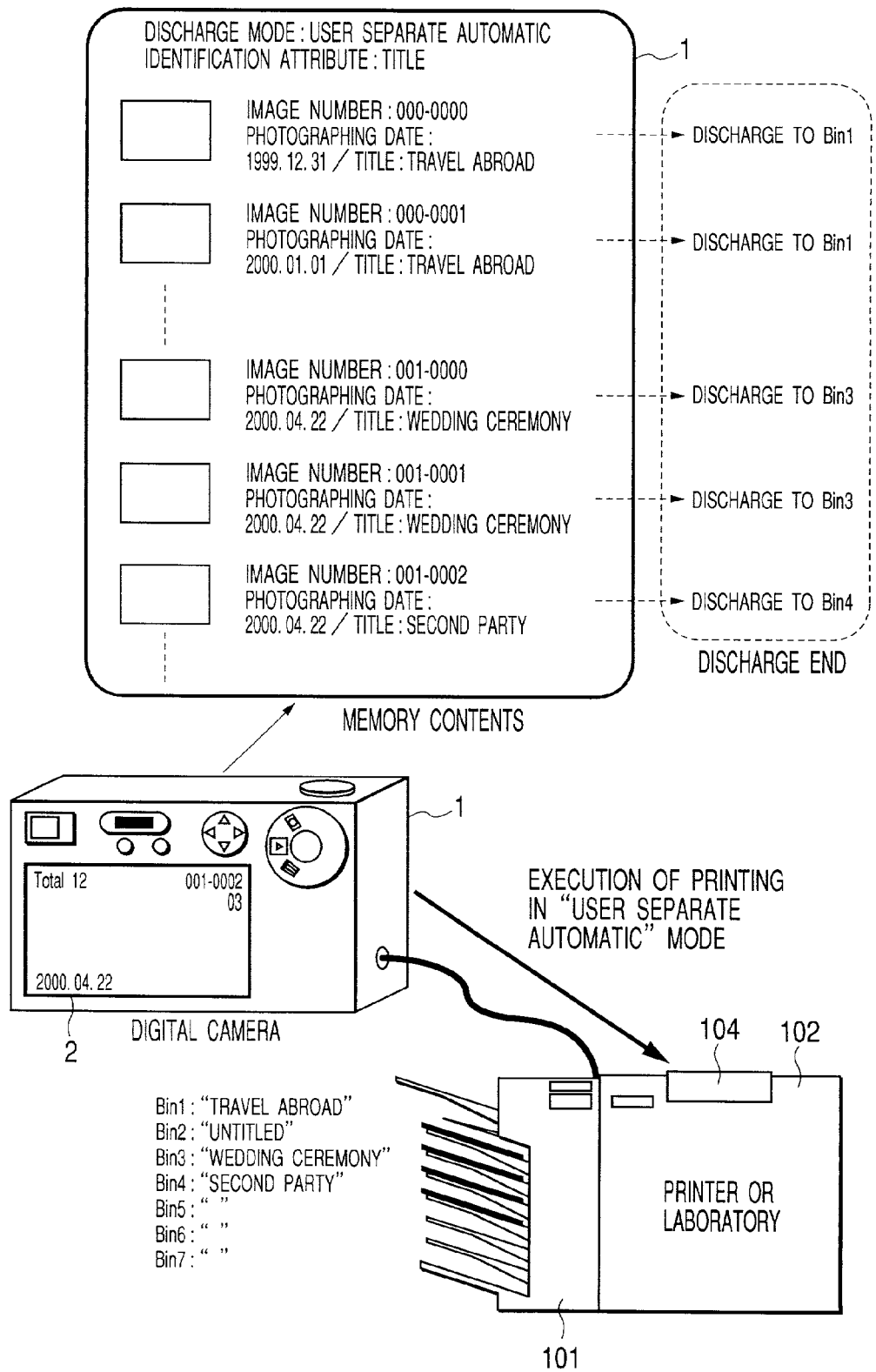
FIG. 28 shows an example of selecting an output image depending on the title, and shows a configuration of the system printing out in the user separately automatic mode an image read by a digital camera according to the second embodiment.
Figure 29:
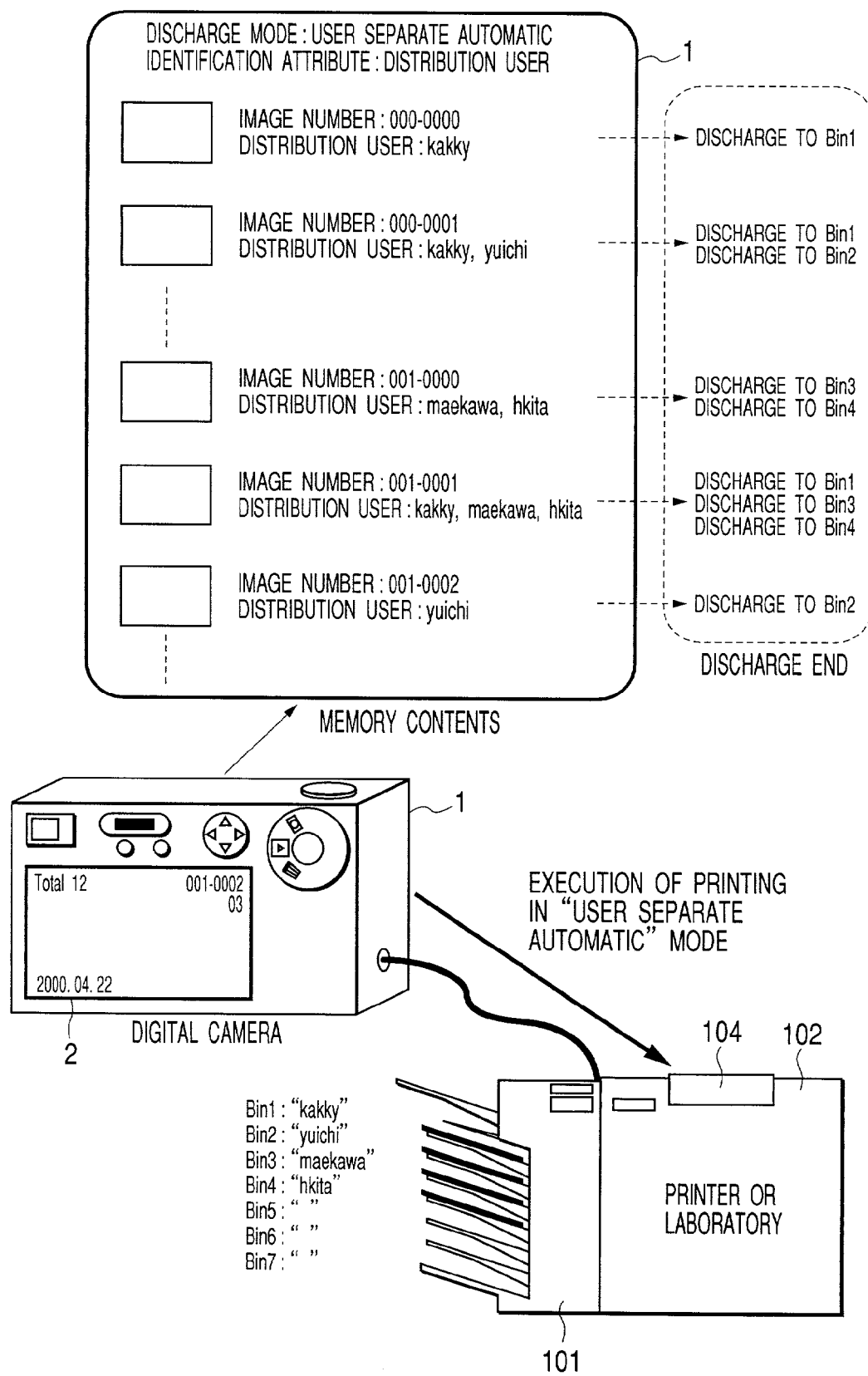
FIG. 29 shows an example of selecting an output image depending on the destination user, and shows the configuration of the system printing out in the user separately automatic mode an image read by a digital camera according to the second embodiment.

FIG. 27 to FIG. 29 show a configuration example of the system for printing out the image read by the digital camera 1 by the user separate automatic mode.

FIG. 27 is an example for performing a classification of the output image by a photographing date, FIG. 28 is an example for performing a classification of the output image by a title and FIG. 29 is an example for performing a classification of the output image which is inputted by the distribution user for delivery to a plurality of persons similarly to the case of an extra printing.

In each drawing of FIG. 27 to FIG. 29, the image data photographed by the digital camera 1 is stored in the information storage medium inside the digital camera 1. This information storage medium may by fixed and included in the digital camera 1, and may be a detachable flash memory such as, compact flash, smart media, memory stick or the like. Furthermore, what is called, the information storage medium comprises a kind of memory corresponding to the memory card 110 of the above described example.

In the information storage medium inside the digital camera 1, in addition to the image data of the image photographed, the attached informations in relation to the respective images are stored. In these pieces of the information, as the information automatically stored, there are an image number, a photographing date, a format form of the image file or the like and, as the information inputted by the user after photographing, there are a title, a trimming information, a rotational information, the number of print copies or the like. In addition, the information may be such that it can include a name, an assigned post or the like of the person who requires a distribution as a distribution user to deliver the same image to a plurality of persons similarly to the case of an extra printing.

Further, in the information storage medium, not only the above described image attached information, but also the information relating to a printing indication are stored. In the printing indication information, there are a printer information of an output end, a graphic mode which becomes a control information at the printing, a color mode, a paper discharge mode, the number of printing copies or the like, and respective detailed setting information or the like are also contained therein.

In FIG. 27 to FIG. 29, the "paper discharge mode" is designated by "user separate automatic", respectively. When "user separate automatic" is designated for "paper discharge mode", "identification attribute" is also required and, in FIG. 27 to FIG. 29, a different designation is performed, respectively.

What is meant by "identification attribute" is a designation as to which attribute from various attributes stored as respective image attached information with respect to the paper discharge name of "user separate automatic" should be taken as the identification name at a classification, and the descriptive content of the attribute which was designated as "identification attribute" from the attribute information of each image at the printing is automatically adapted as an identification name. "Identification attribute" may be whichever attribute it is if it is the attribute existing in the image attached information which is stored in the storage medium by an image unit. As the attribute which can be designated as "identification attribute", for example, a photographing date, a title, a distribution user, a directory of the image data, an output paper size or the like can be cited.

The printing processes executed from the digital camera will be described in order according to each example of FIG. 27 to FIG. 29.

First, the example of FIG. 27 will be described.

In FIG. 27, in the information storage medium inside the digital camera, "user separate automatic" as the paper discharge mode and "photographing date" as the identification attribute are stored by the input operation from the user. When a printing indication was received from the user, the data process portion inside the digital camera starts the preparation of a job based on "user separate automatic" mode which was designated as the paper discharge mode. When the printing job is prepared according to "user separate automatic" mode, "photographing date" which is designated as an identification attribute becomes a judgment material for performing a classification process for each image.

In the example of FIG. 27, "1999.12.31", "2000.02.01", "2000.02.02", "2000.04.22" or the like which are the "photographing dates" of each image are used for the classification process as the identification names. Accordingly, in the preparation process of the printing job, if "user separate automatic" mode is designated, the date information designated as "photographing date" is extracted from each image attached information and added to the printing indication information of each image as the identification name for classifying respective date information.

When the preparation of the printing job is completed, the data process portion of the digital camera 1 transmits the printing job to the image recording device of the printer or the like. Here, the image recording device comprises a plurality of paper discharge trays and is capable of classifying and discharging based on the identification name of the user separate automatic mode, the user separate fix mode or the like.

When the image recording device 102 receives the printing job from the digital camera through a predetermined communication medium, it analyzes the contents of the printing job and performs a predetermined printing process according to the contents. When the printing job such as the example of FIG. 27 was received, according to the identification name designated as "photographing date", the discharge end of each image is decided so that the image photographed on the same date is classified to the same paper discharge tray. The image for which a feed and discharge end was decided is subjected to a predetermined printing process and, similarly to the example of FIG. 27, an output result of the image for which the discharge end was designated under the identification name of "1999.12.31" is discharged to the paper discharge tray "Bin1", and an output result of the image for which the discharge end was designated under the identification name of "2000.01.01" is discharged to the paper discharge tray "Bin2", an output result of the image for which the discharge end was designated under the identification name of "2000.02.02" is discharged to the paper discharge tray "Bin3" and an output result of the image for which the discharge end was designated under the identification name of "2000.04.2 2" is discharged to the paper discharge tray "Bin4".

In this way, in the printing process by "user separate automatic" mode with "photographing date" taken as the identification attribute, it is realized that the identification name extracted by "photographing date" from the image attached information which is stored in the storage medium inside the digital camera is registered in each paper discharge tray of the image recording device and the image for which the discharge end was designated under the same identification name is classified and discharged to the paper discharge tray which is registered under the same identification name.

Next, the example of FIG. 28 will be described.

In FIG. 28, in the information storage medium inside the digital camera 1, "user separate automatic" as the paper discharge mode and "title" as the identification attribute are stored by the input operation from the user. When a printing indication was received from the user, the data process portion inside the digital camera 1 starts the preparation of a job based on "user separate automatic" mode which was designated as the paper discharge mode. When the printing job is prepared according to "user separate automatic" mode, "title" which is designated as an identification attribute becomes a judgment material for performing a classification process for each image.

In the example of FIG. 28, "title" of each image such as "travel abroad", "Untitled", "wedding ceremony", "a second party" or the like is used for classification process as the identification name. Here, "untitled" should be taken as a title name which is default-set in "title" attribute. After photographing, unless there is any particular input designation from the user, "title" attribute may remain as the "untitled". In the preparation process of the printing job, if "user separate automatic" mode is designated, the location information designated as "title" is extracted from each image attached information and added to the printing indication information of each image as the identification name for classifying respective location information.

When the preparation of the printing job is completed, the data process portion of the digital camera 1 transmits the printing job to the image recording device 102 such as the printer or the like.

When the image recording device 102 receives the printing job from the digital camera 1 through a predetermined communication medium, it analyzes the contents of the printing job and performs a predetermined printing process according to the content. When the printing job such as the example of FIG. 28 was received, according to the identification name designated as "title", the discharge end of each image is decided so that the image in which the same "title" was inputted is classified to the same paper discharge tray. The image for which a feed and discharge end was decided is subjected to a predetermined printing process and, similarly to the example of FIG. 28, an output result of the image for which the discharge end was designated under the identification name of "travel abroad" is discharged to the paper discharge tray "Bin1", an output result of the image for which the discharge end was designated under the identification name of "Untitled" is discharged to the paper discharge tray "Bin2", an output result of the image for which the discharge end was designated under the identification name of "wedding ceremony" is discharged to the paper discharge tray "Bin3" and an output result of the image for which the discharge end was designated under the identification name of "second party" is discharged to the paper discharge tray "Bin4".

In this way, in the printing process by "user separate automatic" mode with "title" taken as the identification attribute, it is realized that the identification name extracted by "title" from the image attached information which is stored in the storage medium inside the digital camera is registered in each paper discharge tray and the image for which the discharge end was designated under the same identification name is classified and discharged to the paper discharge tray which is registered under the same identification name.

Next, the example of FIG. 29 will be described.

In FIG. 29, in the information storage medium inside the digital camera 1, "user separate automatic" as the paper discharge mode and "distribution user" as the identification attribute are stored by the input operation from the user. The attribute referred to as "distribution user" has been prepared as the image attached information by assuming the case where the same image is distributed to a plurality of persons similarly to the case of an extra printing.

When the printing indication was received from the user, the data process portion inside the digital camera 1 starts the preparation of the printing job based on "user separate automatic" mode designated as the paper discharge mode. When the printing job by "user separate automatic" mode is prepared, "distribution user" designated as the identification attribute becomes a judgment material for performing a classification printing for each image. In the example of FIG. 29, there are those printing jobs in which a plurality of "distribution users" are inputted, and "kakky", "yuichi", "maekawa", "hkita" or the like which are "distribution users" are used for the classification process as the identification names. Accordingly, in the preparation process of the printing job, when "user separate automatic" mode is designated, from each image attached information, respective persons' names information designated as the identification attributes referred to as "distribution users" are extracted and added to the printing indication information of each image as the identification names for classification.

When the preparation of the printing job is completed, the data process portion inside the digital camera 1 transmits the printing job to the image recording device 102 such as a printer.

When the image recording device 102 receives the printing job from the digital camera 1 through a predetermined communication medium, it analyzes the contents of the printing job and performs a predetermined printing process according to the contents. When the printing job such as the example of FIG. 29 was received, according to the identification name designated as "distribution user", the discharge end of each image is decided so that the image requested by the same "distribution user" is classified to the same paper discharge tray.

When a plurality of "distribution users" is designated for one image, that image is copied to become the number of pages for "distribution users" portion, and one "distribution user" is allotted to each page as the discharge end.

The images for which the feed and discharge ends were decided are subjected in order to printing process and, similarly to the example of FIG. 29, an output result of the images such as "000-0000", "000-0001", "001-0001" or the like for which the discharge end was designated under the identification name of "kakky" is discharged to the paper discharge tray "Bin1", and the output result of the images such as "000-0001" "001-0002" or the like for which the discharge end was designated under the identification name of "yuichi" is discharged to the paper discharge tray "Bin2", an output result of the images such as "001-0000", "001-0001" or the like for which the discharge end was designated under the identification name of "maekawa" is discharged to the paper discharge tray "Bin3" and an output result of the images such as "001-0000", "001-0001" or the like for which the discharge end was designated under the identification name of "hkita" is discharged to the paper discharge tray "Bin4".

In this way, in the printing process by "user separate automatic" mode with "distribution user" taken as the identification attribute, it is realized that the identification name extracted by "distribution user" from the image attached information which is stored in the storage medium inside the digital camera is registered in each paper discharge tray of the image recording device and the image for which the discharge end was designated under the same identification name is classified and discharged to the paper discharge tray which is registered under the same identification name.

When a plurality of identification names are designated for one image, that image information is copied so as to be the number of pages for the identification names and the same image is discharged to the paper discharge tray which is registered under respective identification names.

As described above, the idea of the system configuration for printing out the image read by the digital camera 1 by the user separate automatic mode has been described.

Next, a print setting process in the digital camera will be described by using FIGS. 30A to 30C and FIG. 31.

(Print Setting Process)

Figure 30A:
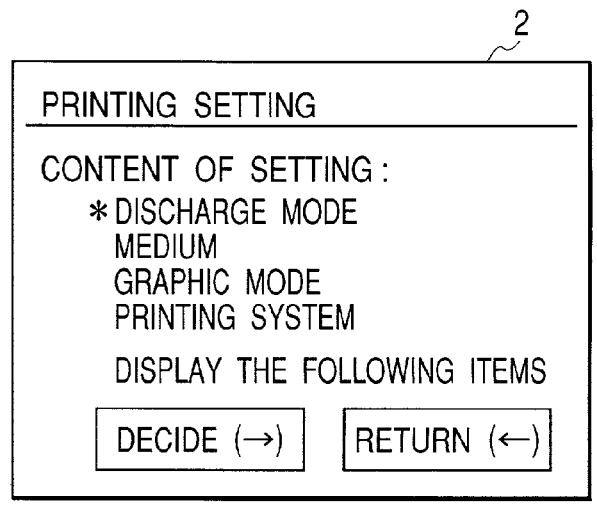
FIGS. 30A, 30B and 30C shows an example of a UI screen showing a procedure of setting a printing process by a user using a digital camera according to the second embodiment.
Figure 30B:
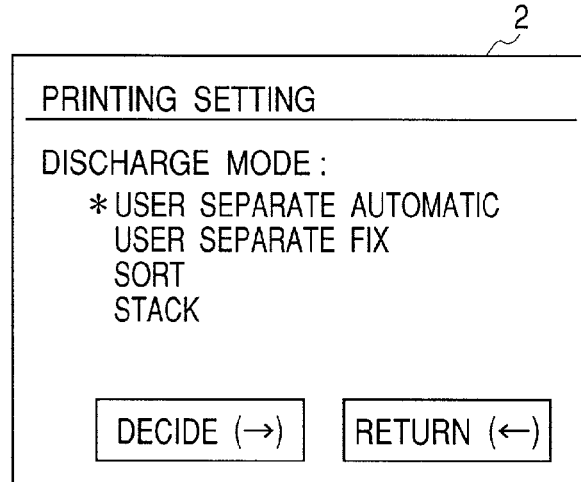
Figure 30C:
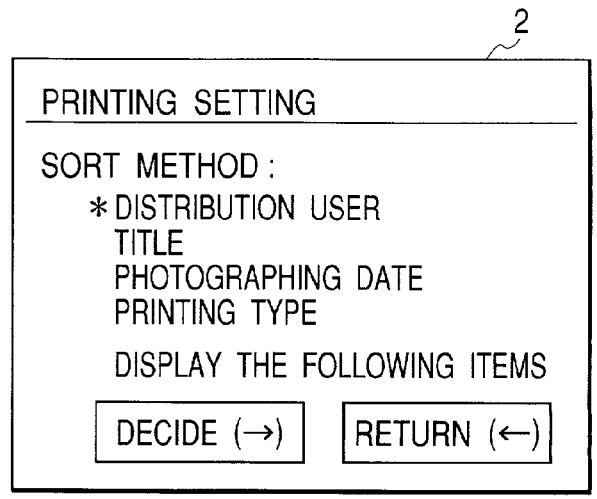
Figure 31:
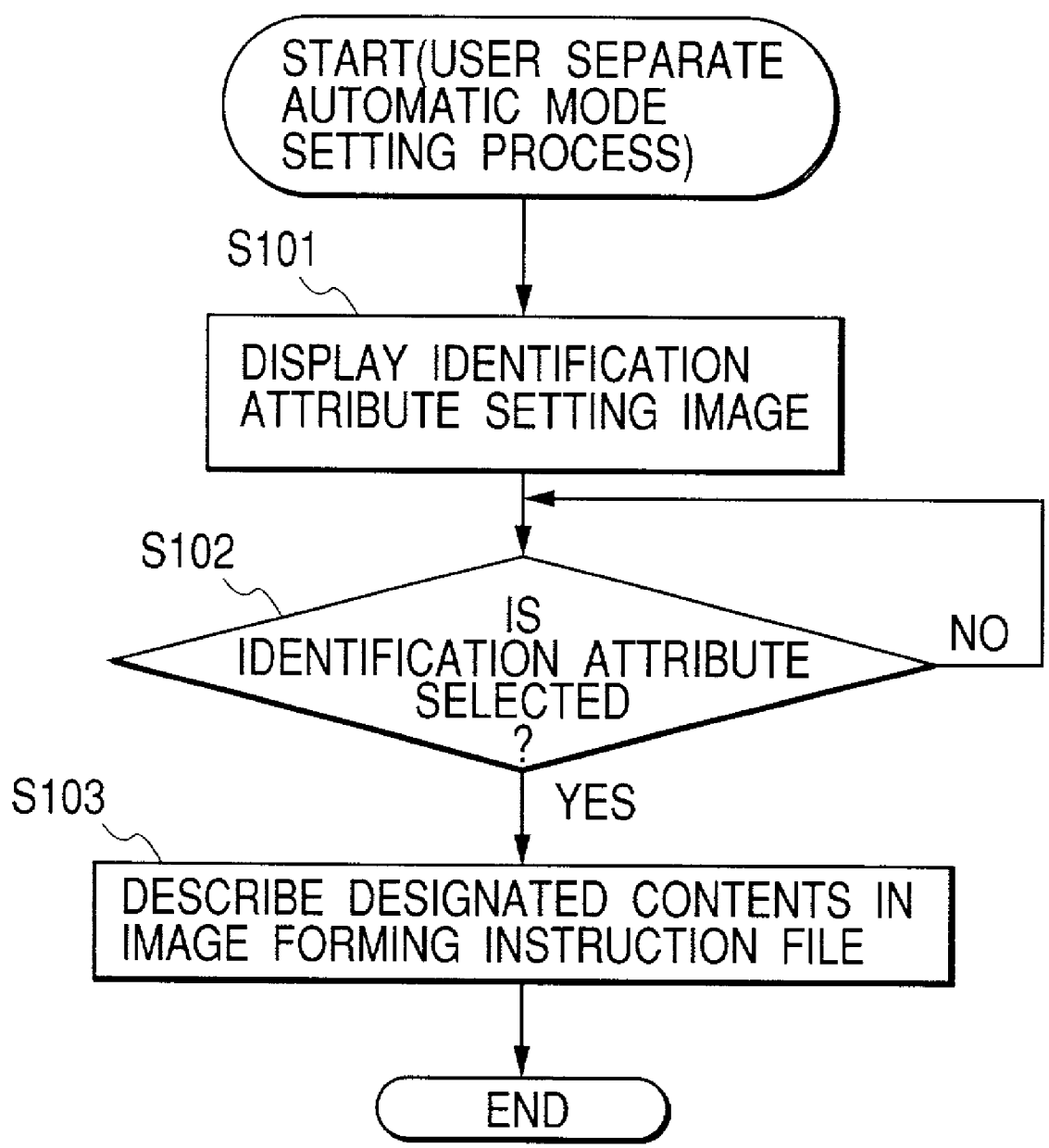
FIG. 31 is a flowchart of the procedure of the user separately automatic mode setting process in the data process unit of a digital camera according to the second embodiment.

FIGS. 30A, 30B and 30C are examples of the user interface screen for explaining the procedure for performing a print setting by the digital camera 1 by the user and FIG. 31 is a flow chart showing the user separate automatic mode setting procedure in the data processing portion of the digital camera 1.

First, FIGS. 30A to 30C will be described.

FIG. 30A is an example of the UI screen displayed when "print setting" was selected from the operation menu of the digital camera 1 in order to set up the print setting.

In FIG. 30A, in the print setting contents, there are such items as "discharge mode" for setting how the output images should be classified, "medium" for setting the medium such as a plain paper, an industry paper, a cardboard paper, OHP or the like, "graphic mode" for setting a drawing system and a drawing quality of the output image, "print system" for setting which print system should be used when there is a plurality of printing systems (LBP system, Ink Jet system or the like) in the outputting image recording device and "the number of copies" for setting the number of papers to be recopied for the whole of the printing job or the like.

The user puts a cursor indicated by "*" to an item from respective item by using an operation button or the like and selects it by "decide" operation. When the setting of the paper discharge mode is performed, the cursor "*" is put to "paper discharge mode" in this screen and it is realized by performing "decide" operation.

FIG. 30B is an example of the UI screen which is displayed when "paper discharge mode" was selected in FIG. 30A in order to perform the setting of the paper discharge mode.

In FIG. 30B, in the setting contents of the paper discharge mode, there are items such as "user separate automatic", "user separate fix", "sort", "stack" or the like which are respective paper discharge mode possible for the image recording device connected communication-wise. The user puts a cursor indicated by "*" to the item desired to be set up as the paper discharge mode from respective item by using the operation button or the like and selects it by "decide" operation. When the paper discharge mode is set as the user separate automatic mode, the cursor "*" is put to "user separate automatic" in this screen and it is realized by performing the "decide" operation.

FIG. 30C is an example of the user interface screen which is displayed when "user separate automatic" was selected as the paper discharge mode in FIG. 30B in order to set up a detailed-classification method.

In FIG. 30C, in a classification method at the time of the user separate automatic mode, there are such items as "distribution user", "title", "photographing date", "print class" or the like. These items are the information inputted or automatically registered for each image and, in the user separate automatic mode, the items (attributes) selected here are used for the classification of the output images as the identification attributes.

The user puts a cursor indicated by "*" to an item to be set as classification method (the identification attribute) from within respective item by using an operation button or the like and selects it by "decide" operation. When the identification attribute (classification method)is set as the distribution user, the cursor "*" is put to "distribution user" in this screen and it is realized by performing "decide" operation.

(User Separate Automatic Mode Setting Process)

FIG. 31 will be described.

FIG. 31 is a flow chart showing the user separate automatic mode setting process procedure which the digital camera 1 performs in relation to FIG. 30C.

In FIG. 31, when the setting of the user separate automatic mode is designated from the user, the data process portion inside the digital camera 1 displays a screen for the user to set up an identification attribute (S101).

The item displayed in the identification attribute setting screen is an attribute which exists in each image inherent information of the image forming instruction file. The user can select the identification attribute from the displayed attributes according to his own classification purpose.

In S102, while waiting for an input to the display screen from the user, if any identification attribute is selected, the step moves to S103 and, if no input is made from the user, S102 is repeated.

In S103, the identification attribute selected in S102 is stored in a predetermined location of the image forming instruction file 20 and the user separate automatic mode setting process is completed.

Next, the printing execution indication process in the digital camera 1 will be described by using FIGS. 32A, 32B and FIG. 33.

(Printing Execution Indication Procedure)

Figure 33:
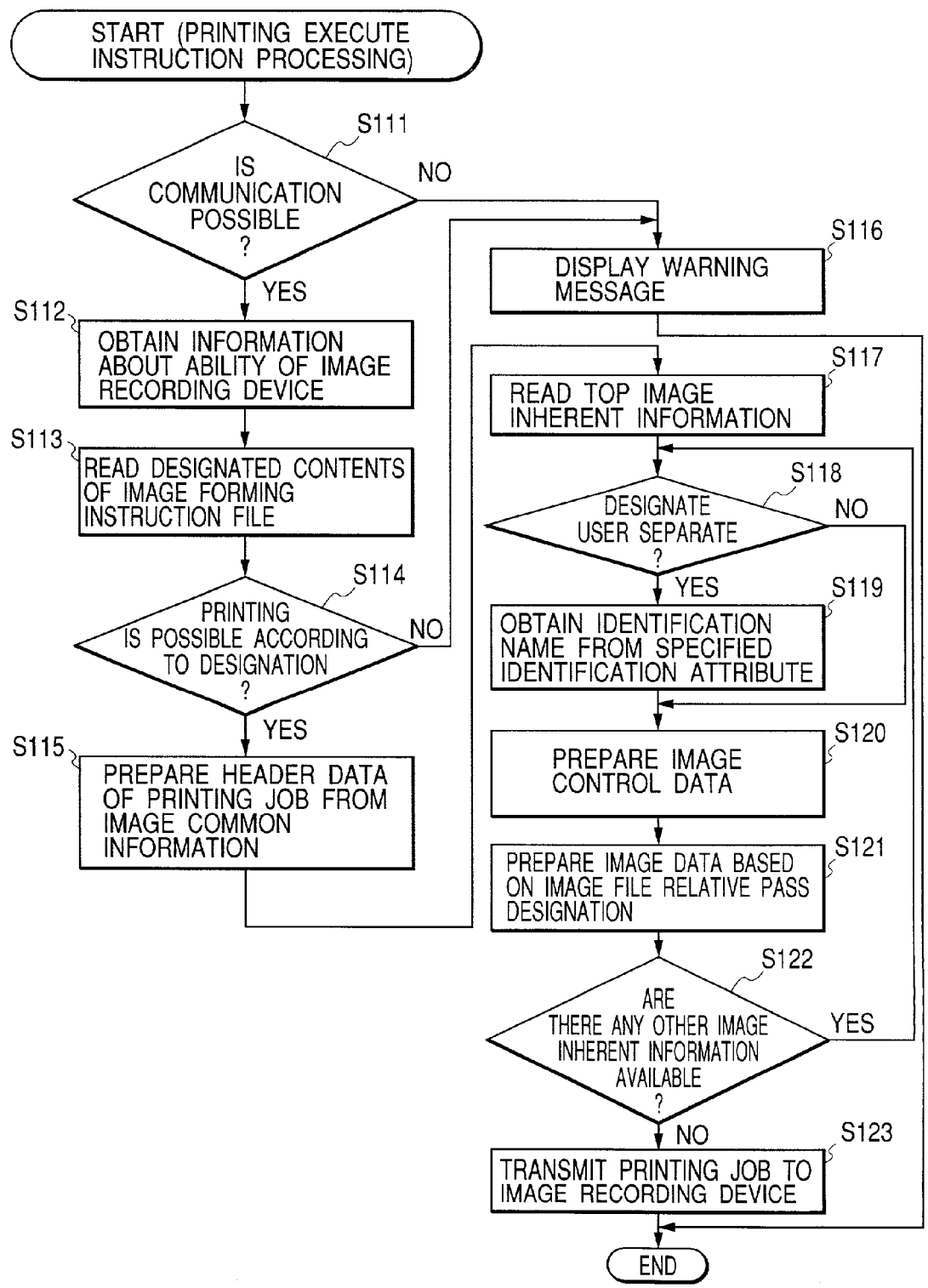
FIG. 33 is a flowchart of a procedure of a print execution instructing process in the data process unit of a digital camera.

FIGS. 32A and 32B are examples of the user interface screen explaining the procedure in which the user performs the printing execution indication by the digital camera 1, and FIG. 33 is a flow chart showing the printing execution indication process in the data process portion of the digital camera 1.

First, FIGS. 32A and 32B will be described.

FIG. 32A is an example of the user interface screen which displayed the operation menu of the digital camera 1.

In FIG. 32A, in the menu items, there are "photography mode" for photographing an image, "playback mode" for displaying the photographed image in LCD of the digital camera, "editing mode" for performing an editing for the photographed image, "printing setting" for performing a setting in relation to the printing described in FIGS. 30A to 30C, "printing execution" for performing the printing execution indication of the photographed image based on the above described "printing setting" or the like. The user puts the cursor indicated by "*" to the item to be executed from respective items by using the operation button and selects it by "decide" operation. When the printing execution is instructed, this cursor "*" is put to "printing execution" and selects it by performing "decide" operation.

FIG. 32B is an example of the user interface screen which is displayed when "printing execution indication" was selected in the menu image of FIG. 32A in order to perform the printing execution indication.

(Printing Execution Indication Process)

FIG. 33 is a flow chart showing the process procedure when the printing execution was instructed from the user in relation to FIGS. 32A and 32B.

In FIG. 33, when the printing execution indication process was performed, for example, it is displayed that the printing is under process, together with a progress status of the printing process such as "printing under execution . . . 50%". Further, the selection items such as "printing interrupted" for interrupting the printing, "job contents displayed" for displaying the contents of the printing job which were transmitted to the image recording device, "discharge status of printer displayed" for displaying the discharge status of the image recording device, "return to menu screen" for returning to the menu screen of FIG. 32A or the like are also displayed.

In FIG. 33, when the printing execution was instructed from the user, a negotiation is made between the digital camera 1 and the image recording device 102 and a check is made to see if a communication is possible(S111).

In S111, if it is decided that the communication with the information recording medium is impossible, a warning message such as "please install the memory card" or the like is displayed and the user is notified that the communication connection from the recording medium is not made (S116), and the printing execution indication process is completed.

In S111, if the communication with the information recording medium is possible, the capacity information of the image recording device 102 (the number of paper discharge trays, the number of paper feeding trays, a feeding paper size, a type or the like) is obtained (S112) and the data reading portion of the image recording device 102 starts reading the data from the information recording medium inside the digital camera 1 and starts a communication with the digital camera 1 installed.

In S113, the image forming instruction file 20 is detected from the image storage medium and its contents are read and the image data, the image attached data, the printing setting data or the like are referred to.

From the referred contents, in S114, a judgment is made as to whether the printing can be executed according to the designation.

In S114, if the printing execution is impossible, a warning such as "user separate paper discharge not possible" or the like is displayed and the display which is matched to the contents is made and the user is notified that the printing according to the designation is not executable (S116), and the printing execution indication process is completed.

In S114, if the printing execution is possible, the step moves to the process subsequent to S115. In S115, a header for the printing image is added based on the image common information which is described in the image forming instruction file 20 read in S113 and the printing job is formed.

Furthermore, each image inherent information described in the image forming instruction file 20 is read first of all, and the image inherent information at the top of S117 is read in order, and the other inherent information is read to form a printing job.

In S118, a judgment is made as to whether "paper discharge mode" of the printing setting is the user separate mode designation and, if it is the user separate mode, in order to add the identification name for a classification matched to the setting contents, in S119, the identification name is obtained from the image common information or the image inherent information under reference based on the attribute described in "identification attribute" of the printing setting, and it is taken as the paper discharge end of that image.

These identification names may be either from the image common information or from the image inherent information or its combination and are prepared based on the designated contents of the classification method previously set up in the user interface of FIG. 30C.

In S118, if it is not the user separate mode designation, there is no need to add the identification name and the step moves to S120.

In S120, the control data of that image is prepared based on the image inherent information under reference.

Further, in S121, the image data of the printing job is prepared from the image file stored in the location which the relative path of the image file indicates, and the process for the image inherent information is completed.

Next, in S122, a judgment is made as to whether there is any other image inherent information available and, if available, the processes of S118 to S122 are repeated with the next image inherent information as reference.

Here, the image date used for the job forming is selected based on the image designation previously set up (not shown), and all the image data or a part of the image data matched to the designated contents are selected.

If there is no other image inherent information available, the step moves to the process of S123 and, in S123, the printing job prepared in the above described process is transmitted to the image recording device 102, and the printing execution indication process is completed.

(Example of a Display of a Paper Discharge Status)

Figure 34:
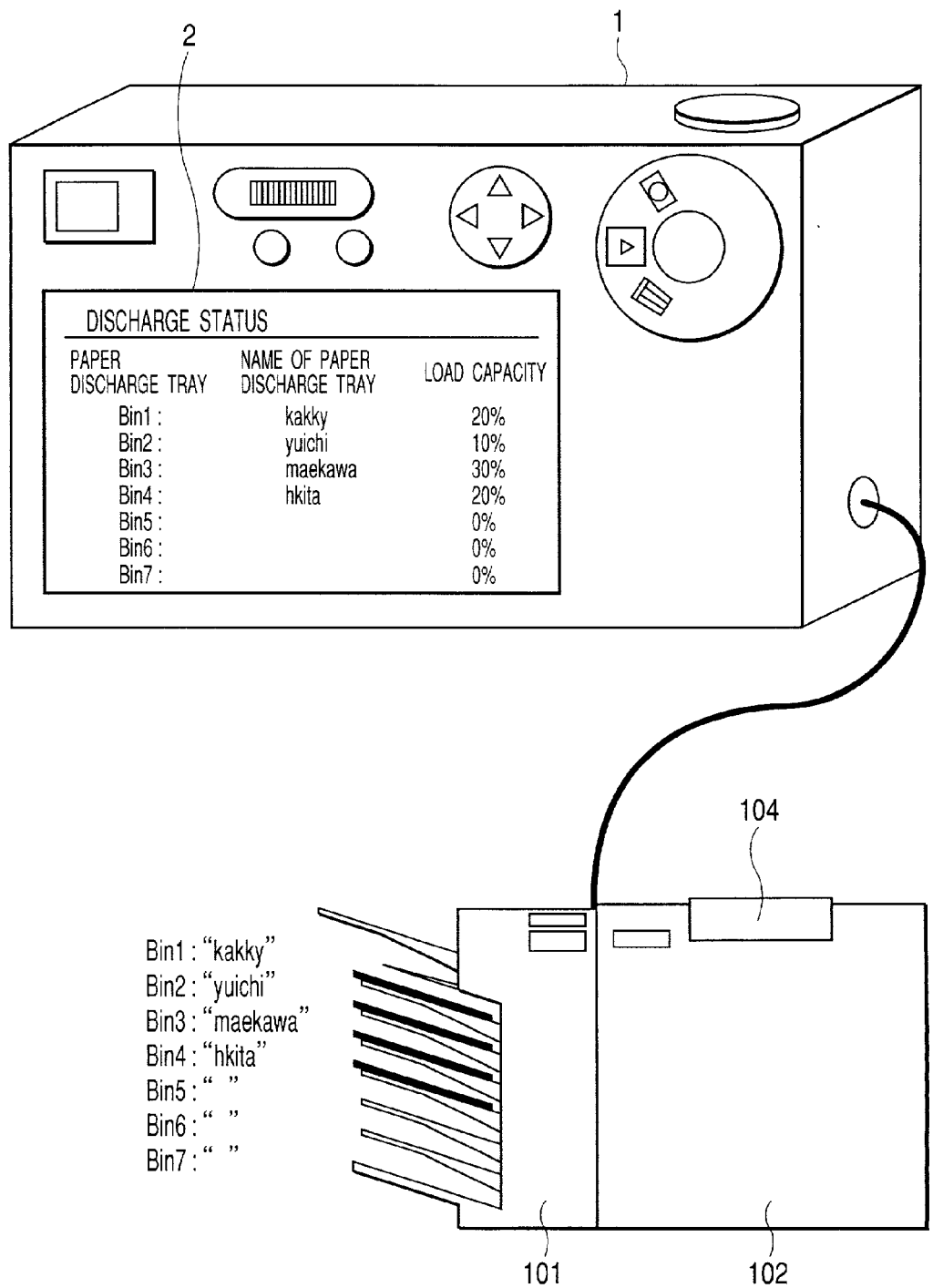
FIG. 34 shows the digital camera showing the paper output status (load information) of each paper output port of the image recording device to which the camera is attached according to the second embodiment.

FIG. 34 is a conceptual diagram explaining an example where a digital camera 1 displays a discharge status of each paper discharge tray (loading information) of an image recording device 102 to which it is connected on a display screen 2.

In FIG. 34, the digital camera 1 shows the information about the paper discharge status of each paper discharge tray from the image recording device 102 to which it is connected. The contents of the display are information registered to each paper discharge tray, such as a paper discharge tray name and a load capacity, for every paper discharge tray, and as a result the paper discharge status of all the paper discharge tray is displayed. By this display, a user can easily realize to which paper discharge tray each output image was discharged.

Although the contents displayed in FIG. 34 were contents which display the status of all the paper discharge trays, it is further possible that a detailed information on an output picture discharged to each paper discharge tray is displayed within the digital camera.

FIG. 35 is a conceptual diagram explaining an example where a digital camera 1 displays a detailed information of an image loaded into a specific paper discharge tray of an image recording device 102 to which it is connected.

In FIG. 35, the digital camera 1 displays the detailed information about the image outputted to the specific paper discharge tray, for example, "Bin1" of the image recording device 102 to which it is connected. This display can be performed, when a user operates "*" cursor displayed at the head of the "paper discharge tray" of FIG. 34 and selects the paper discharge tray which is going to be referred to.

The contents displayed are the paper discharge tray name of "Bin1", the image outputted to the paper discharge tray, its image number, a photographed date, a title of the image, etc. A user can refer to the image outputted to the paper discharge tray in order by button grabbing etc.

The Third Example

The third embodiment of this invention will be described on the basis of FIG. 36. In addition, the same symbol is attached for the same function as each above described example, and the description is omitted.

In the first example mentioned above, the image recording device 102 was equipped with the memory card 110, the memory contents were taken in, and then printing was executed.

Figure 36:
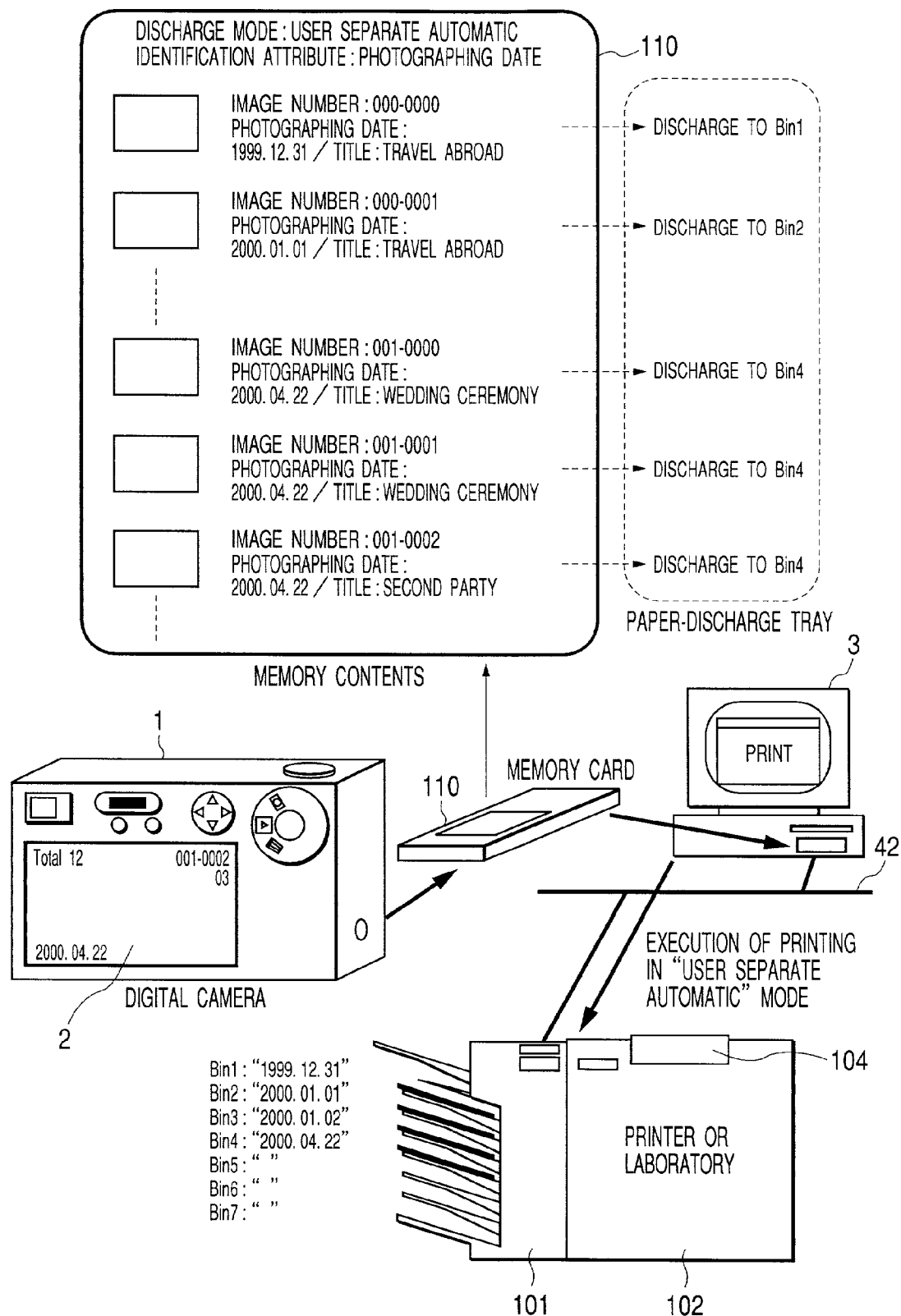
FIG. 36 shows the configuration of the system printing out in the user separately automatic mode an image read by the hose computer in the memory mode according to the second embodiment.

In this example, as shown in FIG. 36, it is the example of the case in which data processors, such as a personal computer 3, are equipped with information storage media, such as a memory card 110, a printing instruction is issued from the display, and printing is executed.

The Fourth Example

The fourth embodiment of this invention will be described. In addition, the same symbol is attached for the same function as each above described example, and the description is omitted.

In the first example mentioned above, description was carried out in which a classification printing was carried out using an simple pattern in the image forming instruction file 20, on the basis of information such as for every photographed date, for every title and for every distribution user.

In this example, without being limited to the first example, a classification may be performed based on the other information, on the information of directories etc., on the combination of those information, or on a part of the information within the image forming instruction file 20 in an information storage medium.

Moreover, these information may be inputted by the user or may be inputted automatically based on the contents set up beforehand.

For example, the case as follows is assumed.

(1) In print service business, such as a printing laboratory or the like, when there is a print request from a customer, the automatic transfer of the information on date+time is carried out to a storage medium, as time of reception based on the information from the register, and then classification is performed in time series using the information as an identification name, based on the information from a register.

(2) The user information on a customer's name+address+ telephone number is inputted by the customer (may be inputted beforehand, or inputted by receptionist), and then classification for every customer is performed using the information inputted as identification name. The above described information may be a part of those information.

(3) A meaning is given to the directory shown in FIG. 4 mentioned above, and classification for every directory is performed by the method of hierarchical management.

(4) A paper discharge tray is switched based on the information of every paper size and media, and a classification is performed so that calculation of charge may be easier.

The Fifth Example

The fifth embodiment of this invention will be described. In addition, the same symbol is attached for the same function as each above described example, and the description is omitted.

In the second example mentioned above, description was performed about the processing steps in which data is read out in an information storage medium within a digital camera 1, means is provided wherein an identification information, such as classification, is extracted, a printing job is generated, then the generated printing job is transmitted to the printer 102 as an image recording device from a digital camera 1, and printing is executed.

This example describes the case where data is read from an information storage medium in external devices, such as a digital camera 1, by a printer 102, and an identification information, such as a classification, is extracted within the printer 102 so that a printing job may be generated.

Furthermore, a menu for selecting these process may be provided, and a method may be provided where a user may select an optimal processing even if there is a difference in performance of a digital camera 1 and in performance of an image recording device 102. Moreover, in the above described selection, a performance is compared between the digital camera and the image recording device to adopt a method where an automatic selection may be performed so that high definition (for resolution, gradation, etc.) and high-speed printing (for CPU specification etc.) may be executed.

(As an Example Corresponding to the Second Subject)

The Sixth Example

The sixth embodiment of this invention will be described on the basis of FIG. 37 to FIG. 40. In addition, the same symbol is attached for the same function as each above described example, and the description is omitted.

Figure 37:
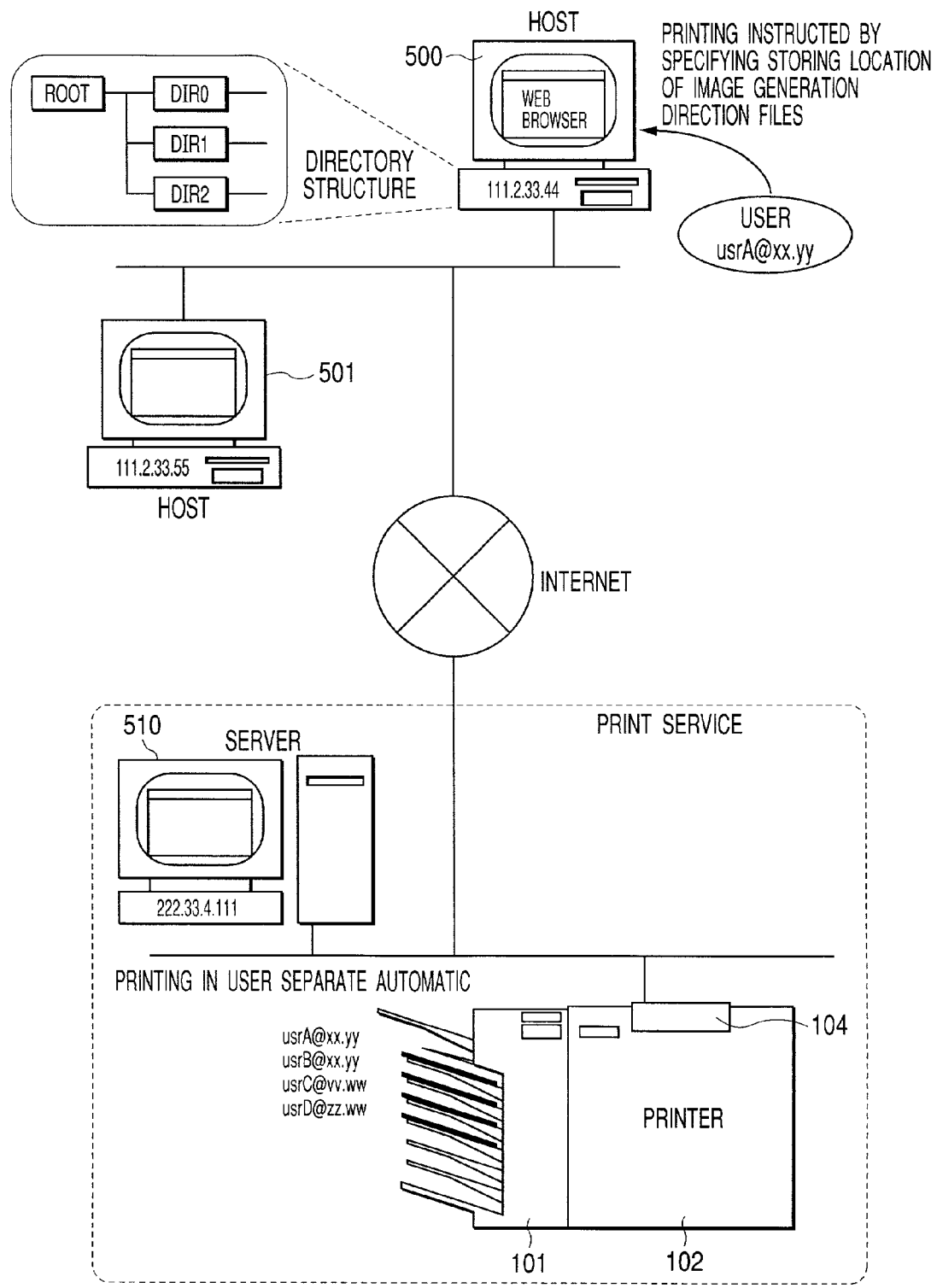
FIG. 37 shows an example of the configuration of the system in which a user issues an instruction to perform a printing process on the image data stored in a host computer to a remote printer connected through Internet, and the printer prints out the image data in the user separately automatic mode at the instruction according to the sixth embodiment.

FIG. 37 is a conceptual diagram showing the example of a system configuration in which a user instructs a remote printer connected via Internet to print an image data stored within the host, and the printer executes a printout in "user separate automatic" mode according to the instructions.

This system comprises host computers 500, 501 (hereinafter, referred to as host), a printer 102 as an image recording device connected via the Internet, a data processor 101 connected with this printer 102 which can carry out classification, control and output of printing paper, and a server 510 connected in the print service of the same network.

FIG. 38 shows a flow of process of a system in which a user instructs the remote printer 102 connected via Internet to print an image data stored within the host 500, and the printer 102 executes a printout in "user separate automatic" mode according to the instructions.

Detailed description will be made in the following paragraph.

(System Configuration)

First, in FIG. 37, a host 500 with an IP (Internet Protocol) address of "111.2.33.44" and a host 501 with an IP address of "111.2.33.55" are configured in the same LAN.

Moreover, a server 510 with an IP address "222.33.4.111" and the printer 102 of an IP address which is not specified are configured in a print service LAN. Furthermore, the LANs are connected with each other via the Internet.

(Printing Procedure)

FIG. 38 shows a procedure in which a user issues printing instructions for the image data stored to the host 500 to the remote printer 102 connected via the Internet, and the printer 102 executes printout in "user separate automatic" mode according to the instructions.

In FIG. 38, the user accesses to a print service server "222.33.4.111" via a Web browser on the host 500 (S201).

A file in an HTML format for issuing a printing request to the printer 102 managed by the print service is downloaded (S202). On the host's 500 Web browser, the HTML file transmitted from the print service server is displayed, as shown in FIG. 39 described below for example.

The user describes information required for outputting an image file 10 (refer to FIG. 4) stored in the host 500 to the remote printer 102 on the Web browser, according to the contents of the HTML file downloaded from the print service server.

The contents of description are the storing location (directory) of the image forming instruction file 20 (refer to FIG. 4) where the information on the image to be printed, user information, etc. are stored, the outputting printer 102 or a trustee print service company name, reception method of output images, etc.

In the case where the image forming instruction file 20 does not exist in the host 500, it is necessary to be created according to a predetermined format. The file 20 may be created by being described on a screen of the Web browser displayed, as shown in FIG. 40 described below.

The user notifies the storing location of the image forming instruction file 20 to the print service server via the host's 500 Web browser, and issues a printing request on the basis of the contents of the image forming instruction file 20 (S203).

Thereby, the print server accesses the printer 102 specified by the host 500, and issues a printing request by notifying the storing location of the image forming instruction file 20 and a host information (IP address etc.) which were notified from the host 500 (S204).

Upon receiving a printing request from the printer service server the printer 102 will access the storing location of a remote host's image forming instruction file 20 according to the received host information and the storing location information of the image forming instruction file 20 via the Internet (S205). The image forming instruction file 20 stored by the predetermined format in the directory is retrieved, and the image forming instruction file 20 found is downloaded (S206).

When the predetermined image forming instruction file 20 is not found by retrieving, in order to notify the user of an occurrence of injustice, an error message may be displayed by the print service server on the Web browser of the host 500.

After downloading of the predetermined image forming instruction file 20, the printer 102 analyzes the image information, the user information, etc. which are described in the image forming instruction file 20 (S207).

After analysis, all the required image files 10 described in the image forming instruction file 20 are downloaded from the stored location (S208, S209), and a printing job is created from the contents of analysis of the image forming instruction file 20, and the downloaded image file 10 (S210). If paper discharge mode of the printer 102 is set as "user separate automatic" when the printer job is created, the "user separate automatic" mode is added to a paper discharge specification of the printing job.

After the creation of printing job is completed, the printer 102 starts printing, and outputs with classification process in "user separate automatic mode" as shown in FIG. 37 (S211).

After the completion of printing process, the printer 102 notifies the print service server that printing ended (S212).

In that case, information, such as number of printing sheets, used for the information for paying a charge of a print service, is also combined and notified. When the notice of printing end from the printer 102 is received, the print service server, if required, will inform the user of a printing end and will issue a guidance of charge settlement of accounts and of how to receive an output image etc. by e-mail, based on an e-mail address information of a printing request at the suitable time according to a predetermined setup of print service business (S213). Notifying of the printing end and the guidance may be performed via the display on the host's 500 Web browser.

(Example of a Web Browser)

FIG. 39 shows an example of a Web browser 400 (UI) in which a user issues a printing request from a host 500 to a printer 102 connected via the Internet. FIG. 40 shows an example of a Web browser 401 (UI) for editing an image forming instruction file 20 required in order to issue a printing request via the Internet.

First, description will be made about the example of the Web browser 400 of FIG. 39.

In FIG. 39, a user selects first a contractor to whom a print service is ordered or a convenience store name as an output place of an image file 10 in a combo box of a "trustee service company". In specification of a storing location of an image forming instruction file 20, a host information is directly described in a text field of "host information (IP address)" and a directory information may be directly described in a text field of "directory information", or it may be specified in the way that a directory is referred to by pushing an "edit of image forming instruction file" button.

As long as the host 500 from which the user is issuing the printing request is able to detect host information (IP address) automatically, a "host information (IP address)" may be automatically displayed as a default value. Moreover, in the case where the image forming instruction file 20 is not created, it may be created on the display screen of FIG. 40, described below, which can be opened by pushing "edit of image forming instruction file" button.

In specification of the reception method, when an output image is to be received at a service window, the check box of "personal delivery at the service window" is checked, and when an output image is to be delivered to the house by home delivery, the check box of "home delivery" is checked. When an output image is to be received at the service window, a desired service window is selected from the combo box of a "specified service window" and specified. When all inputs are finished and a printing request is issued, a "printing start" button is pushed. Thereby, a printing request is notified to the printer 102, and download process is performed by the printer 102 and then printing process is started. When a "printing start" button is pushed and a defect is found, such as a defect in the description for each item or an absence of specified image instruction file, a warning message may be displayed.

Next, description will be made about the example of the Web browser 401 of FIG. 40.

In FIG. 40, a user specifies the store location of the image forming instruction file 20 first. A storing location may be directly described into the text field of "the storing location (directory) of the image forming instruction file 20", or may be specified in the way that a directory is referred to by pushing the "reference" button.

The image file 10 outputted can be displayed in the list of "specification of an image file", and each image file 10 in each directory can be specified with a "reference" button.

Moreover, when each image file 10 is to be edited, image-file 10 to be edited is selected and then editing becomes possible by pushing "edit of image file" button. And when the image attached information about each image file 10 (a photographed date, a picture signal, a title trimming information, a rotation information, etc.) is to be edited, the image file to be edited is selected and then editing becomes possible by pushing "edit of image attached information" button. In specification of a user information, the user inputs required information into each text field such as "name", "e-mail address", "address" and "telephone number."

In addition, editing of the image forming instruction file 20 performed in the display screen shown in FIG. 40 is not necessarily carried out along with a printing request, and may be carried out when an image attached information such as a title for each image file 10 or an image edit information is recorded.

Moreover, in the display screen of FIG. 40, when the store location of the image forming instruction file 20 is specified, an information which is already recorded and can be displayed may be displayed and the user may be notified that it is already recorded. The image instruction file 20 may be edited in predetermined application software not on the Web browser 401 if the file is in the same format as in the application software.

(Image Forming Instruction File)

Here, the contents of data described in the image forming instruction file 20 will be described using FIG. 5 mentioned above.

If the image forming instruction file 20 is described in a predetermined format, it can be created even from image reading apparatus, such as a digital camera. Apparatus or application softwares except the above described Web browser may be used for creating or editing if they support the same format.

As shown in FIG. 5 mentioned above, there are described, in the image forming instruction file 20, an information (hereinafter referred to as image common information) 21 common to an image data stored in the information storage apparatus, and an information (hereinafter referred to as image inherent information) 22 inherent to each image data.

In the image common information 21 there are described a version of the image forming instruction file 20, a model name (or software name) to which the image forming instruction file 20 was stored, a date and time when the image forming instruction file 20 was stored, user information (user name, address, telephone number, etc.), printing-output forms (a graphic mode, a color mode, a paper discharge mode, etc.), an identification attribute (classification attribute) in "user separate automatic" mode, etc.

In each image inherent information 22, there are described a product ID, a print class, printed number of sheets, a format of an image file 10, a relative path of an image file 10, image attached information (a date, a panel serial number, a title, a trimming information, a rotation information, etc.)

These are the information that are automatically described according to a setup at the time of image input, or are described by being explicitly instructed by the user after image input. Moreover, whether the image file 10 is in a form of an image or a text does not matter.

An "identification attribute" means the specification which attribute should be used in various attributes stored as each image attached information as an identification name at the time of classification for the name of paper discharge tray in "user separate automatic" mode. At the time of printing, the contents of a description of the attribute specified as an "identification attribute" are automatically adopted as an identification name from the attached information on each image. As long as an "identification attribute" is an attribute in the image attached information memorized in the storage medium for each image, whatever attribute will be acceptable. As examples of these attributes which can be specified as an "identification attribute", a photographed date, a title, a distribution user, a format of an image file, an image serial number, a directory of image data, an output paper size, etc. are mentioned.

In the conceptual diagram of FIG. 37, a user's e-mail address is set in the printer 102 as an identification attribute. The printer 102 specifies a user's e-mail address as an identification name in job generation, and controls the process so that the images with the same user's e-mail address are outputted into the same paper discharge bin at the time of printing.

The Seventh Example

The seventh embodiment of this invention will be described on the basis of FIG. 41 to FIG. 47. In addition, the same symbol is attached for the same function as each above described example, and the description is omitted.

In the sixth example mentioned above, an example of a system configuration was described where the image forming instruction file 20 and an image file 10 were downloaded from the host 500 by the printer 102 when a printing request was issued from the host 500 by the user, and printing is started simultaneously with the completion of downloading.

In this example, an example of the structure of a system is described where only downloading of an image forming instruction file 20 and an image file 10 is performed by a printer 102 from a host 500 when a printing request is issued from a host 500 by a user, and when there is an explicit printing execution instruction from the user by a panel operation etc., then printing is started. In addition, only different function (refer to FIG. 41 to FIG. 47) from the sixth example will be described here.

Figure 41:
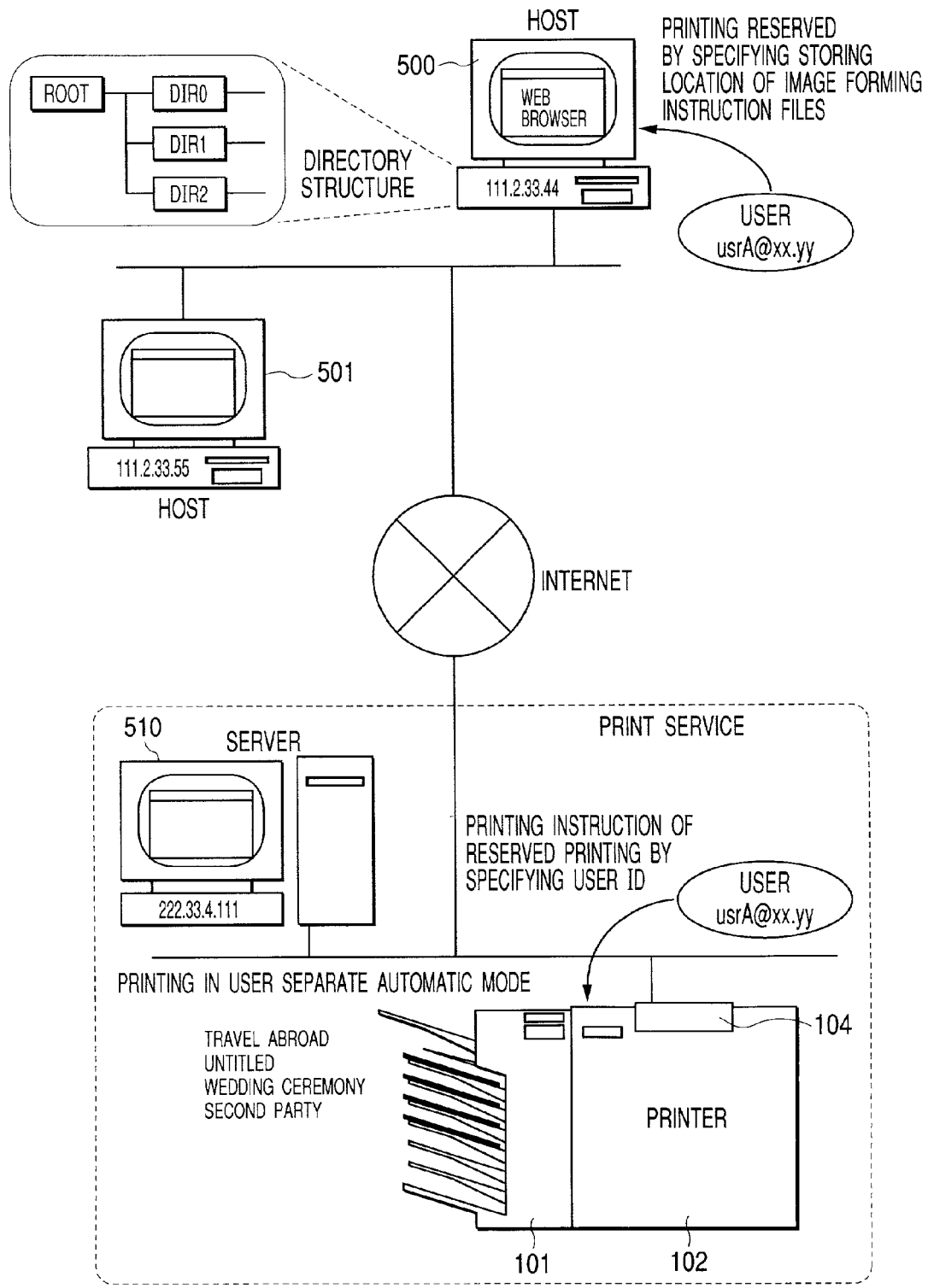
FIG. 41 shows a system in which a user issues an instruction to reserve a printing process on the image data stored in a host computer to a remote printer connected through Internet, and issues an explicit instruction to perform the printing process in a panel operation to the printer when the user visits a place where the printer is installed, and the printer prints out the image data in the user separately automatic mode at the instruction according to a seventh embodiment of the present invention.

FIG. 41 shows a conceptual diagram where a user makes a reservation to print the image data stored in the host 500 at the remote printer 102 connected via the Internet, and where the user gives an explicit printing execution instruction by panel operation to the printer 102 when the user goes to a location where the printer is installed, and then printing is executed in "user separate automatic" mode.

Figure 42:
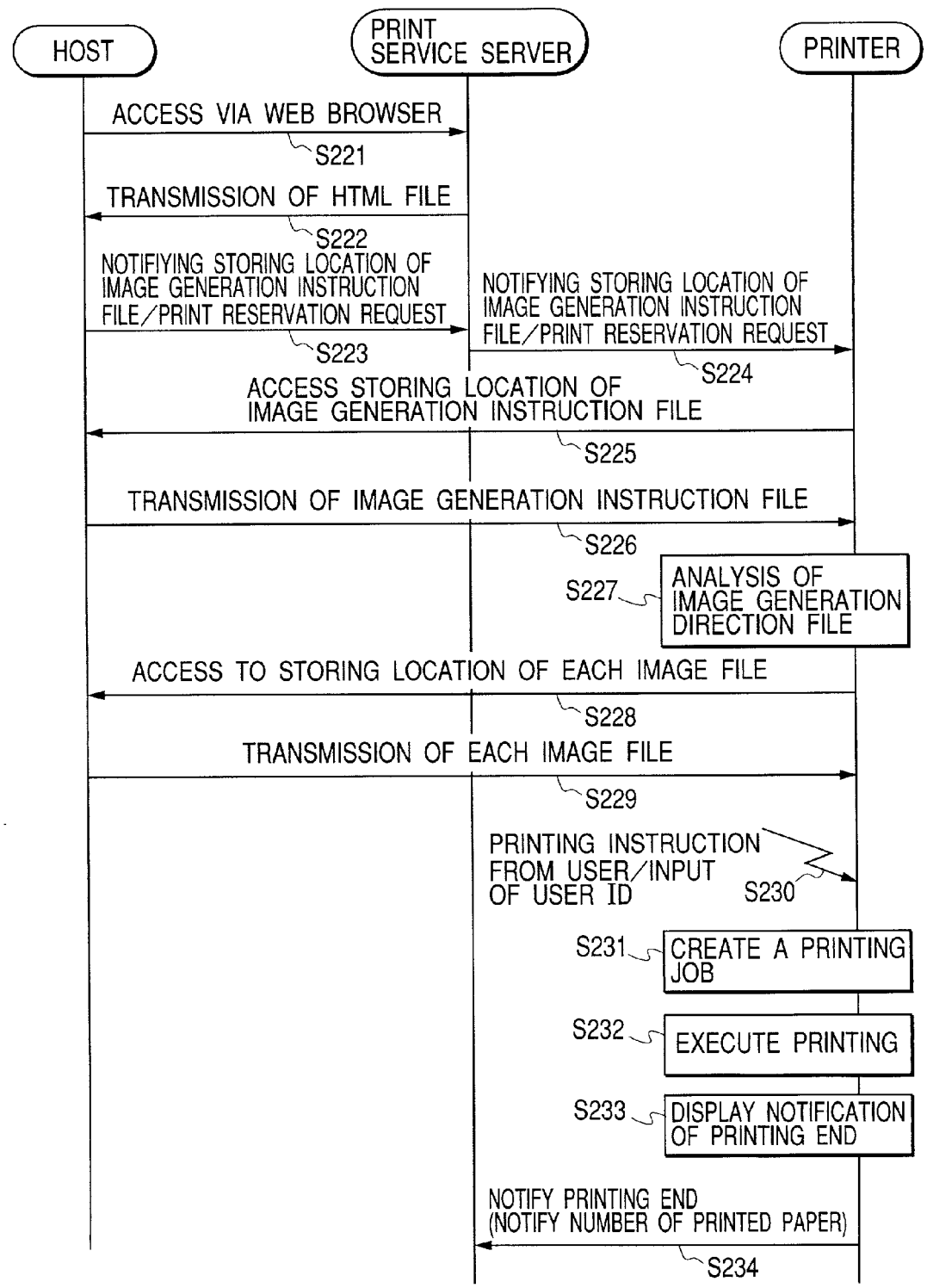
FIG. 42 shows a system in which a user issues an instruction to reserve a printing process on the image data stored in a host computer to a remote printer connected through Internet, and issues an explicit instruction to perform the printing process in a panel operation to the printer when the user visits a place where the printer is installed, and the printer prints out the image data in the user separately automatic mode at the instruction according to the seventh embodiment of the present invention.

FIG. 42 shows a process flow where a user makes a reservation to print the image data stored in the host 500 at the remote printer 102 connected via the Internet, and where the user issues an explicit printing execution instruction by panel operation to the printer 102 when the user goes to a location where the printer is installed, and then printing is carried out in "user separate automatic" mode.

The illustrative description will be made below.

(System Configuration)

First, in FIG. 41, a host 500 with IP (Internet Protocol) address of "111.2.33.44" and a host 501 with IP address of "111.2.33.55" are configured in the same LAN.

Moreover, a server 510 with IP address of "222.33.4.111" and a printer 102 with IP address which is not specified are configured in a print service LAN. Furthermore, the LANs are connected with each other via the Internet.

A procedure in such a system is described on the basis of FIG. 42 where a user makes a reservation to print an image data stored in a host 500 at a remote printer 102 connected via the Internet, and the user issues an explicit printing execution instruction by a panel operation when the user goes to a location where the printer is installed, and then printing is executed at the printer 102 in "user separate automatic" mode.

In FIG. 42, the user accesses the server 510 with IP address of "222.33.4.111" of a print service via the Web browser on the host 500 (S221).

A file in HTML format for making a printing reservation instruction is downloaded to the printer 102 managed by the print service (S222). The HTML file transmitted from the print service server is displayed on the host's 500 Web browser, as shown in FIG. 39 mentioned above in the sixth example mentioned above.

The user describes an information required in order to output an image file 10 stored in the host 500 at the remote printer 102 on the Web browser according to contents of the HTML file downloaded from the print service server 510. The contents of the description are a storing location (directory) of an image forming instruction file 20 in which an information on the image to be printed and user information, etc. are stored, the outputting printer 102 or a trustee print service company name, a reception method of output images, etc.

In the case where the image forming instruction file 20 does not exist in the host 500, it is necessary to be created according to a predetermined format. It may be created by being described on a screen of the Web browser displayed, as shown in FIG. 40 described in the sixth example mentioned above.

When the user notifies the storing station of the image forming instruction file 20 to the server 510 of the print service via the host's 500 Web browser and issues a print reservation request on the basis of the contents of the image forming instruction file 20 (S223), the server 510 of the print service issues a print reservation request by accessing the outputting printer 102 specified by the host 500, and by notifying the storing location of the image forming instruction file 20 and the host information (IP address etc.) notified by the host 500 (S224).

When the print reservation request is received from the server 510 of printer service, the printer 102 accesses the storing location of the image forming instruction file 20 in the remote host's 500 via the Internet according to the host information and the storing location information on the image forming instruction file 20 which were received.

The image forming instruction file 20 stored in a predetermined format in a directory is retrieved, and the discovered image forming instruction file 20 is downloaded (S226).

When the predetermined image forming instruction file 20 is not found in retrieving, in order to notify the user of an occurrence of injustice, an error message may be displayed on the host's 500 Web browser via the server 510 of the print service.

After downloading of the predetermined image forming instruction file 20, the printer 102 analyzes the image information, the user information etc. which are described in the image forming instruction file 20 (S227).

After analysis, all the required image files 10 described in the image forming instruction file 20 are downloaded from the storing location (S228, S229), and the image forming instruction file 20 and the image file 10 which were downloaded are stored in a predetermined storage unit assigned for every user.

When an image file 10 is stored, the directory hierarchy specified for the image forming instruction file 20 is taken into consideration, the image file 10 is stored with structure in which the relative path of the image forming instruction file 20 to the relative path of each image file 10 has the same hierarchical structure as the path in a download place.

However, when the same structure is impossible, the host 500 is notified the information that the same structure is impossible, or the file may be stored in a possible form of structure and then the changed new structure may be reflected into the image forming instruction file 20.

When specified by printing reservation from the user, the printer 102 stands by until the user goes to the location where the printer 102 is installed and explicitly issues a printing execution instruction by a panel operation of the printer 102.

When the user issues a printing instruction to the printer 102, a user ID is first inputted from the panel of the printer 102 (S230). The user ID to be inputted may be an ID and a password specified by the user himself, an e-mail address and a password, or a reservation serial number given from the server 510 of a print service at the time of printing reservation.

When the user ID is inputted, the printer 102 displays the contents of the image forming instruction file 20 downloaded from the host 500 specified by the user, and if required, receives a setup of a printing setup etc. from a user, and then waits for a printing instruction. When the printing execution instruction from the user is received the printer 102 creates a printing job based on the contents of the image forming instruction file 20 and an image file 10 (S231).

If a paper discharge mode of the printer 102 in a printing setup from the user is set as "user separate automatic" mode, the "user separate automatic" mode is added to a paper discharge specification of the printing job when the printing job is created.

When creation of the printing job is completed, the printer 102 starts printing, and output is carried out with classification in "user separate automatic" mode as shown in FIG. 41 (S232).

When printing process is completed, the printer 102 displays a printing end message on a panel, in order to notify the user of printing having been completed, or sends a sign of a printing end (S233), and also notifies it to the server 510 of the print service (S234). In that case, information, such as number of sheets printed which is used as the information for paying a charge of the print service, is also notified together.

In a system like this example, since the printer 102 can be occupied and used by the user who issues a printing instruction, all of paper discharge bins can be used according to the user's purpose.

Hereinafter, a description will be made using examples about a printing setup for each classification purpose and about a classification process by a printer 102 on the basis of the setup.

Figure 44:
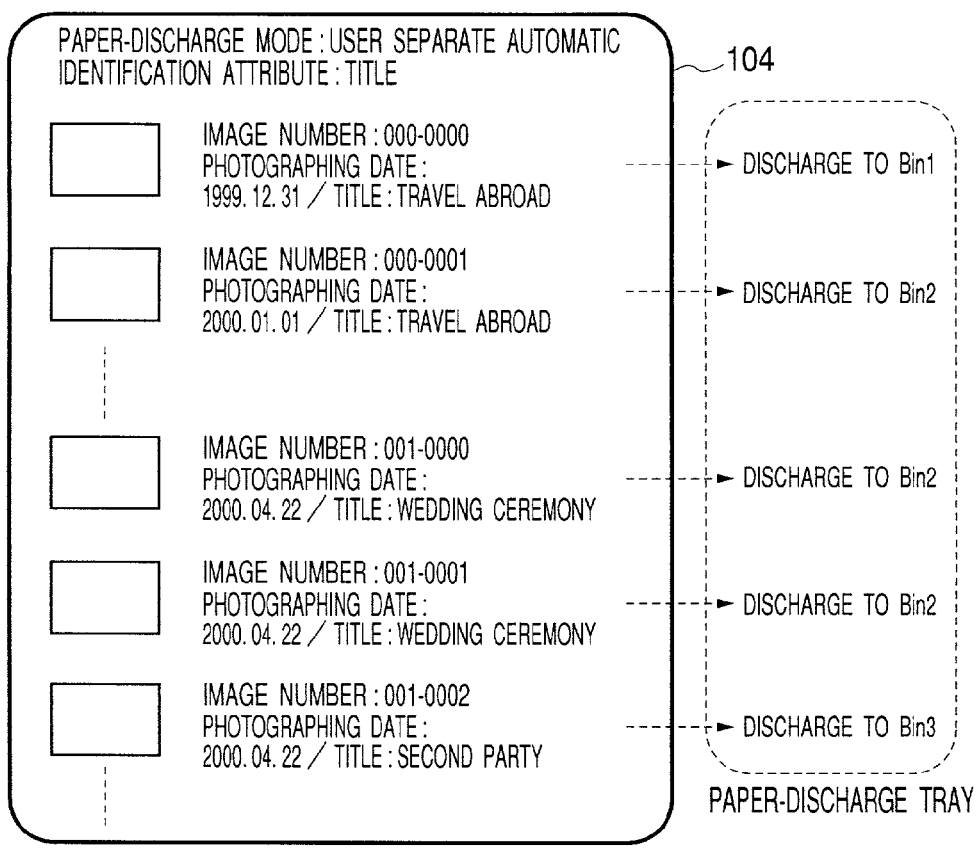
FIG. 44 shows an example of selecting an output image depending on the title, and shows the paper output control by a printer when a user designates the user separately automatic mode to the printer according to the seventh embodiment.
Figure 45:
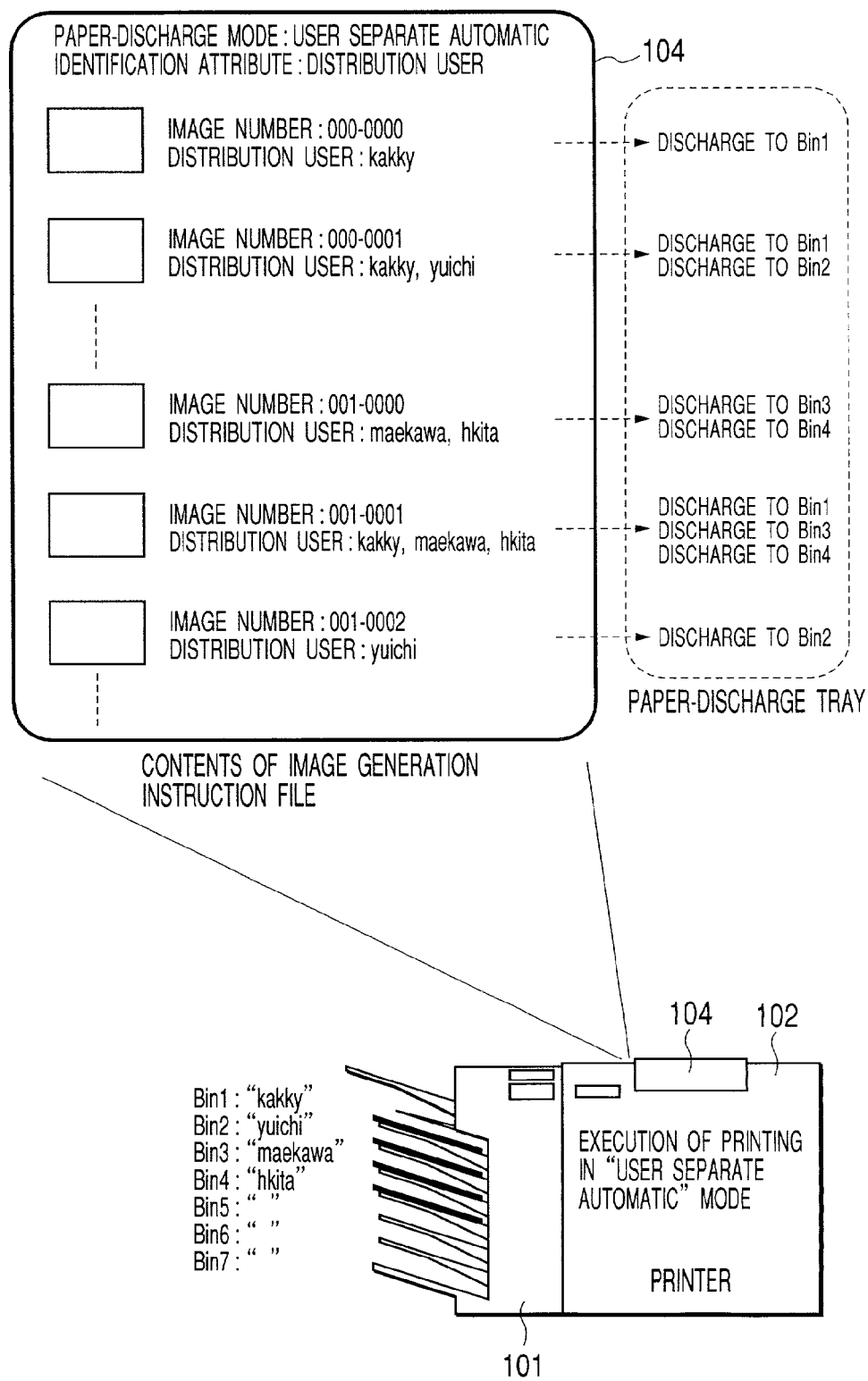
FIG. 45 shows an example of selecting an output image depending on the input destination user to deliver the same image to a plurality of users as in the case where plural prints of image data are made, and shows the paper output control by a printer when a user designates the user separately automatic mode to the printer according to the seventh embodiment.

FIG. 43 to FIG. 45 are conceptual figures explaining a paper discharge control of the printer 102 when a user specifies "user separate automatic" mode to the printer 102.

FIG. 43 shows an example where a classification of output images is carried out according to a photographed date. FIG. 44 shows an example where a classification of an output images is carried out according to a title. FIG. 45 shows an example where a classification of output images is carried out according to the inputted distribution user in the case of the same image to be distributed to a plurality of customers similarly as the time of making an additional print.

The information about a printing instruction may be stored in the image formation instruction file 20 which a printer 102 downloads from the host 500, and the information can also be specified in the case where a panel operation issues a printing execution instructions. In an information about a printing instruction, there are included an outputting printer information, a graphic mode, a color mode, a paper discharge mode, a number of copies, etc. which are used as the control information at the time of printing and each detailed setting information etc.

In FIG. 43 to FIG. 45, all the instructions for "paper discharge mode" are made in "user separate automatic." When a "user separate automatic" is specified to "paper discharge mode", a specification of an "identification attribute" is also required and so different specifications are made in FIG. 43 to FIG. 45 respectively.

An "identification attribute" means the specification which attribute stored as each image attached information should be used in various attributes as an identification name of classification for the name of paper discharge tray in user separate automatic mode. At the time of printing, the contents of a description of the attribute specified as an "identification attribute" are automatically adopted as an identification name from the attached information on each image. As long as an "identification attribute" is an attribute in the image attached information memorized in the storage medium for each image, whatever attribute is acceptable. As examples of these attributes which can be specified as an "identification attribute", a photographed date, a title, a distribution user, a format of an image file, an image serial number, a directory of image data, an output paper size, etc. are mentioned.

Hereinafter, according to each examples of FIG. 43 to FIG. 45, a printing process by a printing job created based on the contents of an image forming instruction file 20 will be sequentially described.

(Printing Process)

First, the example of FIG. 43 will be described.

In FIG. 43, "user separate automatic" is specified as paper discharge mode, and "photographed date" is specified as identification attribute in an image forming instruction file 20. When a printing instruction is received from a user, a job generation unit 440 in an image recording device 102 starts generation of a job on the basis of "user separate automatic" mode specified within a paper discharge mode. When a printing job is created in "user separate automatic" mode, a "photographed date" specified as an identification attribute serves as a determination standard for a classification process for each image.

In the example of FIG. 43, the "photographed date" of each image "1999. 12.31", "2000.01.01", "2000.02.02", "2000.04.22", etc. are used in the classification process as an identification name. Therefore, in a printing job generation, when a "user separate automatic" mode is specified, a date information of a "photographed date" specified in an identification attribute is extracted from each image attached information, and each date information is added as an identification name used for classification to a printing instruction information of each image.

The job generation unit 440 passes a printing job to a data analysis process unit, when a generation of the printing job is completed. Here, it is assumed that the image recording device 102 has two or more paper discharge trays, and that paper can be classified and discharged on the basis of identification names, such as "user separate automatic" mode and "user separate fixed" mode.

The image recording device 102 analyzes the contents of a printing job based on the generated printing job, and executes a predetermined printing according to the contents. In the case of a printing job in the example of FIG. 43, according to the identification name specified by the "photographed date", the paper discharge tray of each image is determined so that the image photographed on the same "photographed date" may be classified into the same paper discharge tray. The image for which a feeding-and-discharging paper tray is determined is printed out in a predetermined manner, and as shown in an example in FIG. 43; the output result of the image for which the paper discharge tray was specified according to the identification name of "1999.12.31" is discharged into a paper discharge tray "Bin1"; the output result of the image for which the paper discharge tray was specified according to the identification name of "2000.01.01" is discharged into a paper discharge tray "Bin2"; the output result of the image for which the paper discharge tray was specified according to the identification name of "2000.02.02" is discharged into a paper discharge tray "Bin3", and the output result of the image for which the paper discharge tray was specified according to the identification name of "2000.04.22" is discharged into a paper discharge tray "Bin4".

Thus, in the printing process in the "user separate automatic" mode where the "photographed date" is determined as the identification attribute, the method is realized that the identification name extracted out of the image attached information specified within the image forming instruction file 20, based on an identification attribute "photographed date", is registered into each paper discharge tray of the image recording device 102. And then the image for which the paper discharge tray was specified based on the same identification name is classified and discharged into the paper discharge tray registered by the same identification name.

Next, a description will be made about the example of FIG. 44.

In the image forming instruction file 20 in FIG. 44, a "user separate automatic" is specified as paper discharge mode, and a "title" is specified as an identification attribute based on an input operation from the user.

When a printing instruction is received from the user, a job generation unit 440 starts generation of a printing job on the basis of the "user separate automatic" mode specified in the paper discharge mode. When the printing job is created in the "user separate automatic" mode, the "title" specified as the identification attribute serves as a determination standard for a classification process for each image.

In the example of FIG. 44, "travel abroad", "Untitled", "wedding ceremony", "second party", etc. which are the "title" of each image are used for the classification process as an identification name. Here, "Untitled" is a default title name set in a "title" attribute. After photographed, when there is no input specification from the user especially, a "title" attribution may still be "Untitled".

In generation of the printing job, when the "user separate automatic" mode is specified, a location information specified as the identification attribute of the "title" is extracted from each image attached information, and it is added to a printing instruction information on each image as the identification name for the classification of each location information.

A job generation unit 440 passes the printing job to a data analysis unit, when a generation of the printing job is completed. Based on the generated printing job, the printer 102 as an image recording device analyzes contents of the printing job, and executes a predetermined printing process according to the contents.

In the case of a printing job as the example of FIG. 44, according to the identification name specified by the "title", a paper discharge tray of each image is determined so that the image of the same "title" may be classified into the same paper discharge tray.

The image for which a feeding-and-discharging paper tray is determined is printed out in a predetermined manner, and as shown in an example in FIG. 44; the output result of the image for which the paper discharge tray was specified according to the identification name of "travel abroad" is discharged into a paper discharge tray "Bin1"; the output result of the image for which the paper discharge tray was specified according to the identification name of "Untitled" is discharged into a paper discharge tray "Bin2"; the output result of the image for which the paper discharge tray was specified according to the identification name of "wedding ceremony" is discharged into a paper discharge tray "Bin3"; and the output result of the image for which the paper discharge tray was specified according to the identification name of "second party" is discharged into a paper discharge tray "Bin4".

Thus, in the printing process in the "user separate automatic" mode where the "title" is determined as the identification attribute, the method is realized that the identification name extracted out of the image attached information specified within the image forming instruction file 20, based on an identification attribute "title", is registered into each paper discharge tray of the image recording device 102. And then the image for which the paper discharge tray is specified based on the same identification name is classified and discharged into the paper discharge tray registered by the same identification name.

Next, a description will be made about the example of FIG. 45.

In the image forming instruction file 20 in FIG. 45, a "user separate automatic" is specified as a paper discharge mode, and a "distribution user" is specified as an identification attribute based on an input operation from a user. The case is assumed where the same image is copied and distributed to two or more customers as in a case of an extra copy, and an attribute of a "distribution user" has been prepared as image attached information for this assumed case.

When a printing instruction is received from a user, a job generation unit 440 starts a generation of a printing job on the basis of the "user separate automatic" mode specified in a paper discharge mode. When a printing job is created in the "user separate automatic" mode, the "distribution user" specified as the identification attribute serves as a determination standard for a classification process for each image.

In the example of FIG. 45, some images have two or more "distribution users" inputted for themselves, and "kakky", "yuichi", "maekawa" and "hkita", etc. which are "distribution users" are used for classification as an identification name. Therefore, in a generation of a printing job, when the "user separate automatic" mode is specified, the name information specified as the identification attribute of the "distribution user" is extracted from each image attached information, and it is added to a printing instruction information on each image as the identification name for a classification of each name information.

A job generation unit 440 passes the printing job to a data analysis unit, when a generation of the printing job is completed. Based on the generated printing job, a printer 102 analyzes the contents of the printing job, and executes a predetermined printing process according to the contents.

In the case of the printing job as the example of FIG. 45, according to the identification name specified by the "distribution user", a paper discharge tray of each image is determined so that an image of the same "distribution user" may be classified into the same paper discharge tray. When two or more "distribution users" are specified for one image, it is copied so that the number of image may become equal to the number of pages of the "distribution users", and one "distribution user" is assigned to a paper discharge tray for each page respectively.

The image for which a feeding-and-discharging paper tray is determined is printed out in a predetermined manner, and as shown in an example in FIG. 45; the output result of the images "000-0000", "000-0001", "001-0001" etc. for which the paper discharge tray was specified according to the identification name of "kakky" are discharged into a paper discharge tray "Bin1"; the output result of the images "000-0001", "001-0002" etc. for which the paper discharge tray was specified according to the identification name of "yuichi" are discharged into a paper discharge tray "Bin2";

the output result of the images "001-0000", "001-0001", etc. for which the paper discharge tray was specified according to the identification name of "maekawa" are discharged into a paper discharge tray "Bin3"; and the output result of the images "001-0000", "001-0001" etc. for which the paper discharge tray was specified according to the identification name of "hkita" are discharged into a paper discharge tray "Bin4".

Thus, in the printing process in the "user separate automatic" mode where the "distribution user" is determined as the identification attribute, the method is realized that the identification name extracted out of the image attached information specified within the image forming instruction file, based on an identification attribute "distribution user", is registered into each paper discharge tray of the image recording device 102. And then the image for which the paper discharge tray is specified based on the same identification name is classified and discharged into the paper discharge tray registered by the same identification name.

Moreover, when two or more identification names are specified to one image, the image information is copied so that the number of the image may become equal to the number of the identification names, and the same image is discharged into the paper discharge tray registered by each identification name.

(Printing Instruction by a Control Panel)

FIG. 46 is an example of UI (user interface) for a printing instruction executed by a panel operation in a printer 102 as an image recording device, based on a image forming instruction file 20 and an image file 10 which were downloaded from a host 500.

As shown in FIG. 46, "image designation", "media", and "classification method" are displayed and can be selected on the display of a printer 102. In "image designation", there can be selected whether, for example, all the images specified by the image forming instruction files 20 are printed, a part of them are printed or a page of index print showing the selected list of an image is also to be printed.

Besides index print, the contents of the printed matter in all the paper discharge trays, the contents of the printed matter in a specified paper discharge tray, etc. may be printed out and the paper discharge tray used for it (not shown) may be specified.

These information images may be printed together with a printing job in printing of an image file 10, and may be outputted in a form like the cover page for each printed matter, or only an information image may be printed so that the contents of the printed matter with which the paper discharge has already been carried out may be checked.

In "media", there may be selected on what kind of media the image is printed. Although there is a printing machine only for photographs as a printer 102, it is assumed, in this example, that the printer may print on two or more media, and the selection from a plain paper, a postcard, a photograph, a glossy print paper, an OHP sheet, etc. is possible. A photograph is selected in FIG. 46.

In "classification method", there can be selected by what information in the image forming instruction file 20 the image is classified and the selection of an owner, a date, a title, a distribution user, a directory, etc. is possible. A date is selected in FIG. 46. If "O.K." button is pushed after the selection is done, the information on the image forming instruction file 20 will be read, and printing will be started by the above described setup.

(Printing Processing by the Printing Execution Instruction)

Figure 47:
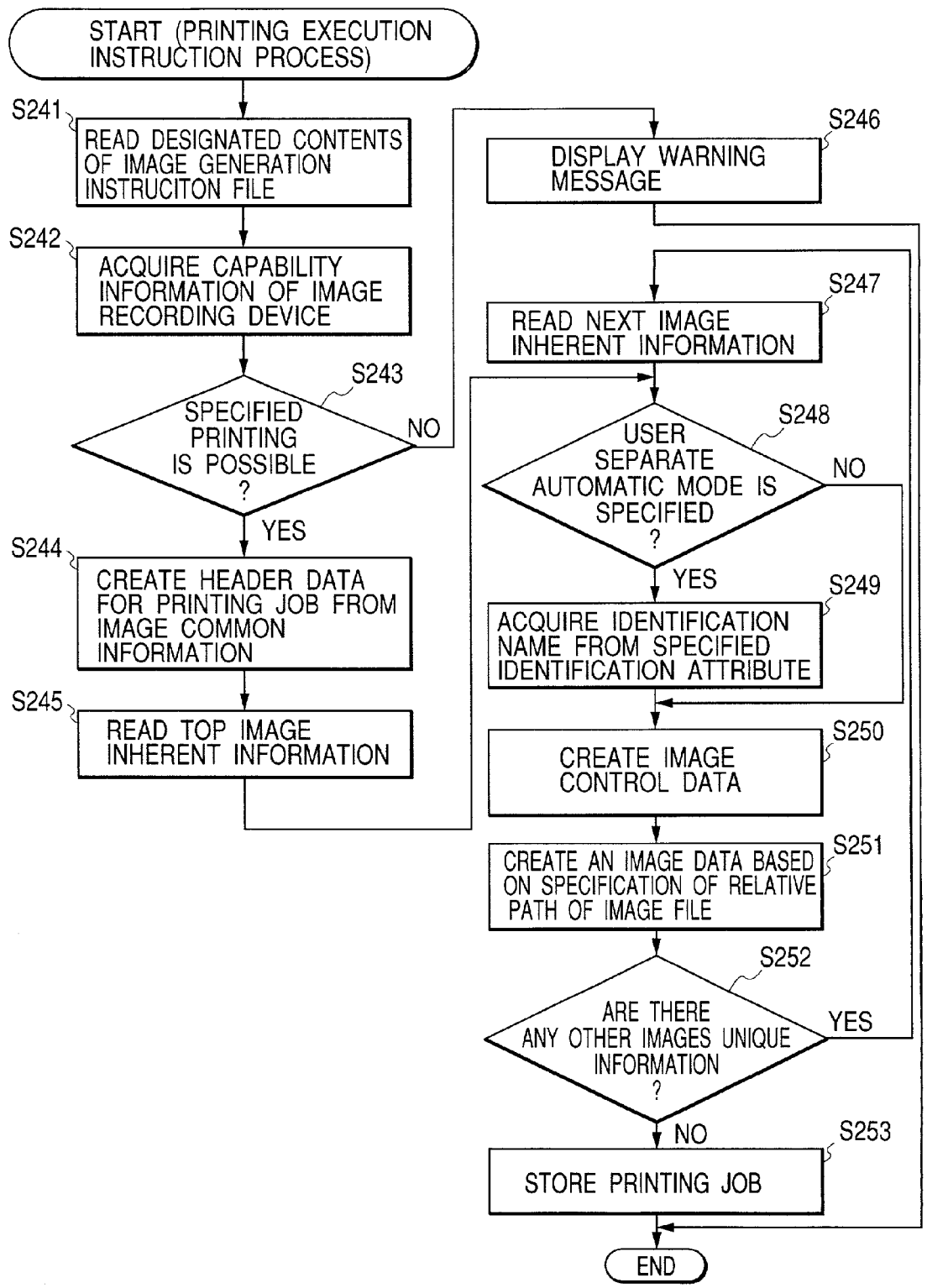
FIG. 47 is a flowchart of the procedure of the process performed when a user issues an instruction to perform a printing process by operating the panel of a printer according to the seventh embodiment.

FIG. 47 is a flow chart which shows a procedure in the case where a printing execution is instructed from a user by a panel operation of a printer 102.

In FIG. 47, if printing execution is instructed from a user, the contents of a predetermined image forming instruction file 20 are read by a data reading unit, and an image data, an image attached data, a printing setting data, etc. are referenced (S241).

Then, the capability information on a printer 102 as an image recording device (a number of paper discharge trays, a paper feed trays, a feeding paper size, type, etc.) is acquired (S242), and it is determined in step S243 whether specified printing can be executed.

In S243, if printing execution is impossible, the warning message of "unable to carry out a user separate paper discharge" is displayed, the display corresponding to the contents is given and the user is notified that a printing based on the specification is not carried out (S246), and a processing of the printing execution instruction is ended. In S243, if a printing execution is possible, the step proceeds to the steps after S244.

In S244, a printing job is generated by adding header data to a printing image based on an image common information described within the image forming instruction file 20 read in S241.

Furthermore, in S245, a printing job is generated first by reading an image inherent information in the head described in the image forming instruction file 20, then by reading other image inherent information in order, and finally by reading all image inherent information.

In S248, it is judged whether the "paper discharge mode" of a printing setup is specified to be "user separate automatic" mode. And when specified as "user separate automatic" mode, an identification name for a classification corresponding to the contents of a setting is necessary to be added, and so the identification name is acquired from an image common information or the image inherent information currently referred to in S249 based on the attribute described in the "identification attribute" of a printing setup, and then the acquired name is determined as the paper discharge tray name for the image.

These identification name may be created based on the designated contents of the classification set up by user interface of FIG. 46 from any information of the image common information or the image inherent information, or of the combination thereof.

In S248, if the "user separate automatic" mode is not specified, since an identification name is not necessary to be added, the step proceeds to S250. In S250, the control data of the image is created based on the image inherent information under reference.

In S251, an image data part of a printing job is created from an image file 10 stored in a location shown by the relative path of the image file 10, and a processing for the image inherent information under reference is ended.

Next, in S252, it is judged whether there is any other image inherent information. If there is other information, the processing of S248 to S252 is repeated by using the following image inherent information as a reference target (S247).

Here, image data used for a job creation is selected in FIG. 46 based on an image designation set up beforehand, and all image data or a part of the image data corresponding to the contents of specification are selected. If there are no more image inherent information left, a step proceeds to S253. Then the printing job created by the above described processing is stored in a predetermined storing region in step 253, and a printing execution instruction process is ended.

As mentioned above, in this example the data have been downloaded beforehand and when a user issues a printing instruction, a printing is actually executed. Thus in this case, since a user ID, a password, etc. are to be inputted, a management with high security is realized.

Furthermore, a preservation term of data is set up for every downloaded data, and when a printing instruction is not given within a certain period, the data is deleted automatically. Thus, vacant memory can be reserved, and as a result it becomes possible that the case can be avoided where registration of reservation is impossible because of insufficient vacant memory left.

The Eighth Example

The eighth embodiment of this invention will be described based on FIG. 48 to FIG. 49. In addition, the same symbol is attached for the same function as each above described example, and the description is omitted.

The sixth example mentioned above was a system where an image forming instruction file 20 and an image file 10 are downloaded out of a host 500 by a printer 102 in the case of user's request of printing from a host 500, and a printing processing is started simultaneously with the completion of download. The seventh example mentioned above was a system where an image forming instruction file 20 and an image file 10 are only downloaded out of a host 500 by a printer 102 in the case of user's request of printing from a host 500, and a printing processing is started only in the case of user's explicit instruction of printing by a panel operation etc.

In this example, an example of a system is configured where a storing location of an image forming instruction file 20 to be downloaded is specified and a printing request and a printing instruction are issued by a user from a printer 102 side, and where a down load processing and a printing processing are executed from the printer 102 according to the instruction. In addition, only a different part (refer to FIG. 48 and FIG. 49) from the sixth and the seventh examples mentioned above is described here.

Figure 48:
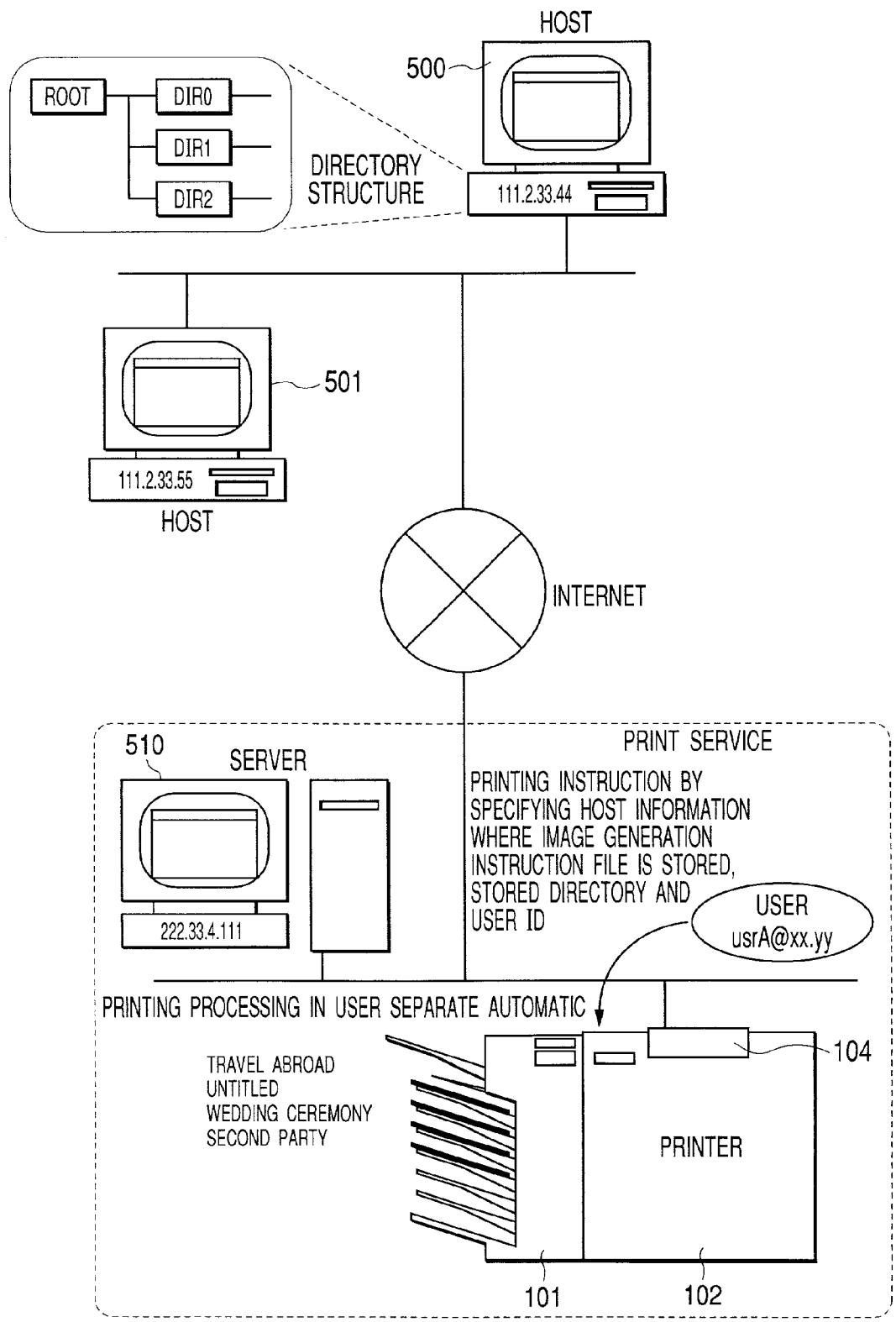
FIG. 48 shows an example of the configuration of the system in which a user issues an instruction to perform a printing process by designating a storage position of image data stored in a remote host computer using the operation panel of a printer, and the printer prints out the image data in the user separately automatic mode at the instruction according to an eighth embodiment.

FIG. 48 is a conceptual diagram showing the configuration of a system where a storing location of an image data in a remote host 500 is specified by a user from a control panel 104 of a printer 102 and a printing instruction is issued, and where a printout is executed in "user separate automatic" mode by the printer 102 according to the instruction.

Figure 49:
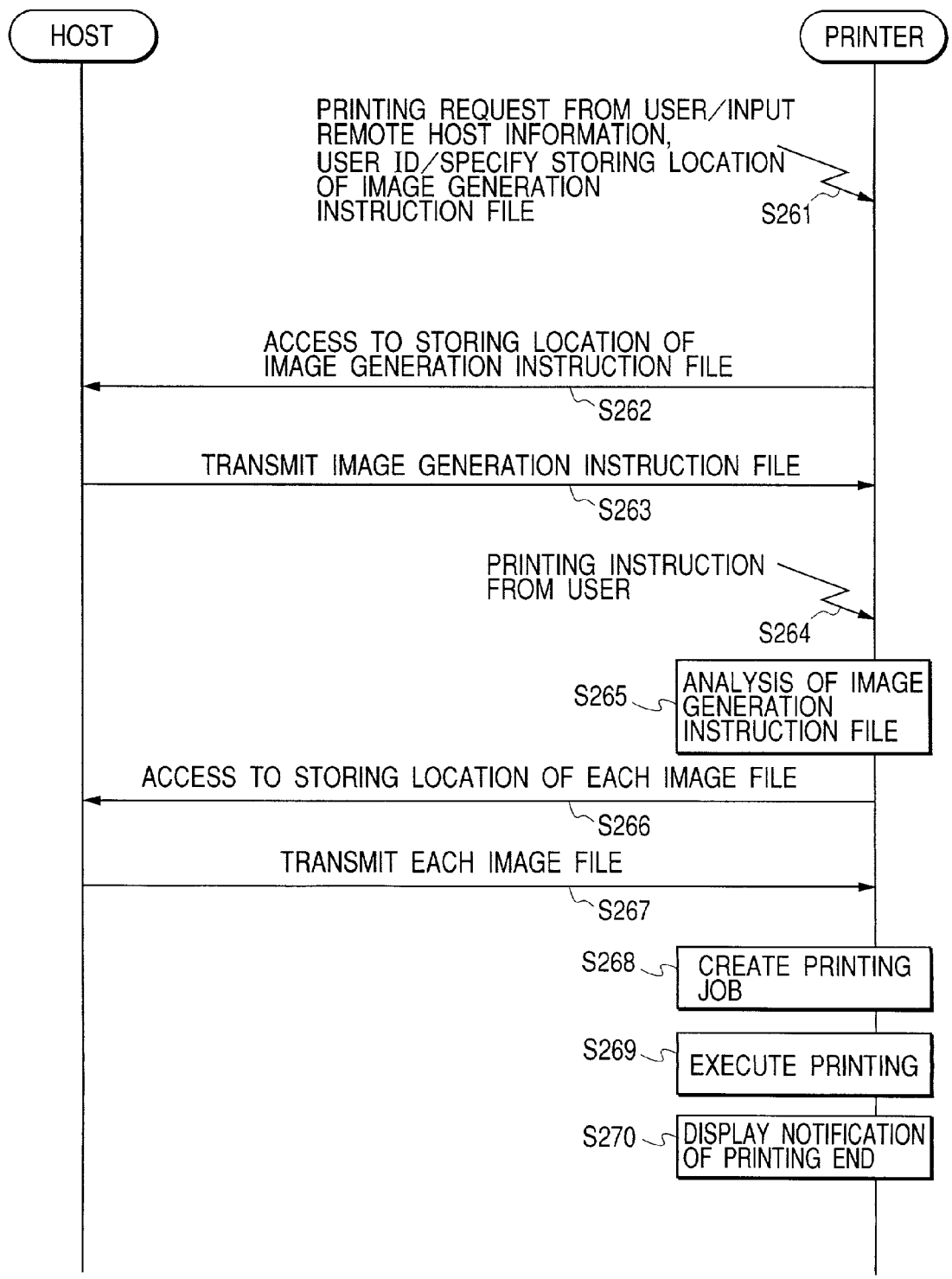
FIG. 49 shows an example of a configuration of the system in which a user issues an instruction to perform a printing process by designating a storage position of image data stored in a remote host computer using the operation panel of a printer, and the printer prints out the image data in the user separately automatic mode at the instruction according to the eighth embodiment.

FIG. 49 shows a flow of a processing of the system where the storing location of the image data in the remote host 500 is specified by the user from the control panel 104 of the printer 102 and the printing instruction is issued, and where the printout is carried out in "user separate automatic" mode by the printer 102 according to the instruction.

An illustrative description will be made below.

(System Configuration)

First, in FIG. 48, a host 500 with IP (Internet Protocol) address of "111.2.33.44" and a host 501 with IP address of "111.2.33.55" are configured in the same LAN.

Moreover, a server 510 of an IP address "222.33.4.111" and a printer 102 of an IP address, which is not specified, are configured in a print service LAN. Furthermore, the both LANs are connected with each other via the Internet.

(Printing Processing by Printing Instruction)

In such a system, a procedure is described using FIG. 49 where a storing location of an image data in a remote host 102 is specified from a control panel 104 in a printer 102 by a user and a printing instruction is issued, and then a printout is executed by the printer 102 in a "user separate automatic" mode according to the instruction.

In FIG. 49, a panel operation etc. is carried out by the user to the printer 102, and a host information (IP address etc.) is specified where an image data to be outputted is saved. Furthermore, user IDs (an account name, a password, etc.) for accessing the host 500 are inputted, the storing location (directory) of an image forming instruction file 20 is specified, and a printing request is issued to the printer 102 (S261).

In the example of FIG. 48, "111.2.33.44" is specified as a host information. Upon receiving the printing request from the user, the printer 102 accesses to the remote host 500 specified by the user via the Internet (S262).

According to the information on the storing location of the specified image forming instruction file 20, the image forming instruction file 20 stored in a predetermined format is retrieved. When the image forming instruction file 20 is found it is downloaded (S263).

When the predetermined image forming instruction file 20 is not found by retrieving, in order to notify the user of an occurrence of injustice, an error message may be displayed on an control panel 104. When download of the predetermined image forming instruction file 20 is completed, the printer 102 displays the completion message of download on the control panel 104 in order to notify that download is completed.

After the completion of download of the image forming instruction file 20, a detailed printing setup is carried out and a printing instruction is issued (S264) by the user on user interface of the printer 102 as shown in FIG. 46 of the seventh example mentioned above.

Then, the downloaded image forming instruction file 20 is analyzed by the printer 102 (S265), and sometimes an information required when a printing setup is done by the user is supplied, and sometimes a printing setup changed by the user is reflected into the image forming instruction file 20.

When a printing execution instruction from a user is received, the printer 102 accesses the storing location of each required image file 10 (S266), and downloads each image file 10 (S267) according to the analyzed result of the image forming instruction file 20 of S265. The downloaded image forming instruction file 20 and image file 10 are stored at the predetermined storage unit assigned for each user.

When an image file 10 is stored, the directory hierarchy specified for the image forming instruction file 20 is taken into consideration, the image file 10 is stored with structure in which the relative path of the image forming instruction file 20 to the relative path of each image file 10 has the same hierarchical structure as the path in a download place.

However, when the same structure is impossible, the user is notified the information that the same structure is impossible, or the path may be stored in a possible form of structure and the changed new structure may be reflected into the image forming instruction file 20.

When a download of all the image files 10 is completed, the printer 102 creates a printing job (S268). If the paper discharge mode of the printer 102 in a printing setup from the user is set as "user separate automatic" in creation of a printing job, the "user separate automatic" mode is added to a paper discharge specification of the printing job.

When a creation of a printing job is completed, a printing processing will be started by the printer 102, and output is carried out with classification in the "user separate automatic" mode as shown in FIG. 48 (S269).

When printing process is completed, the printer 102 displays a printing end message on a panel 104, in order to notify the user of printing having been completed (S270). In that case, information, such as number of sheets printed which is used as the information for paying a charge of the print service, is also notified together.

In addition, as long as there is no change in the printing setup of the image file 10, the printing instruction of S264 may be carried out after S261 or after S267.

As mentioned above, in this example all operations can be carried out on the printer 102 as an image recording device, and so the system has an operable form even for users without a personal computer or a mobile terminal.

Furthermore, since a setup to be carried on a personal computer corresponding to input within the Web browser can also be carried from the control panel 104 on the printer 102, resulting cost reduction is realized avoiding installation of a server.

The Ninth Example

The ninth embodiment of this invention will be described on the basis of FIG. 50. In addition, the same symbol is attached for the same function as each above described example, and the description is omitted.

In the sixth to the eighth examples mentioned above, although the printing execution instruction or the printing reservation instruction was issued from the host computer 500 or the printer 102, the printing execution instruction or the printing reservation instruction may be issued from an external instrument, such as a mobile terminal that is able to communicate with the Internet.

Figure 50:
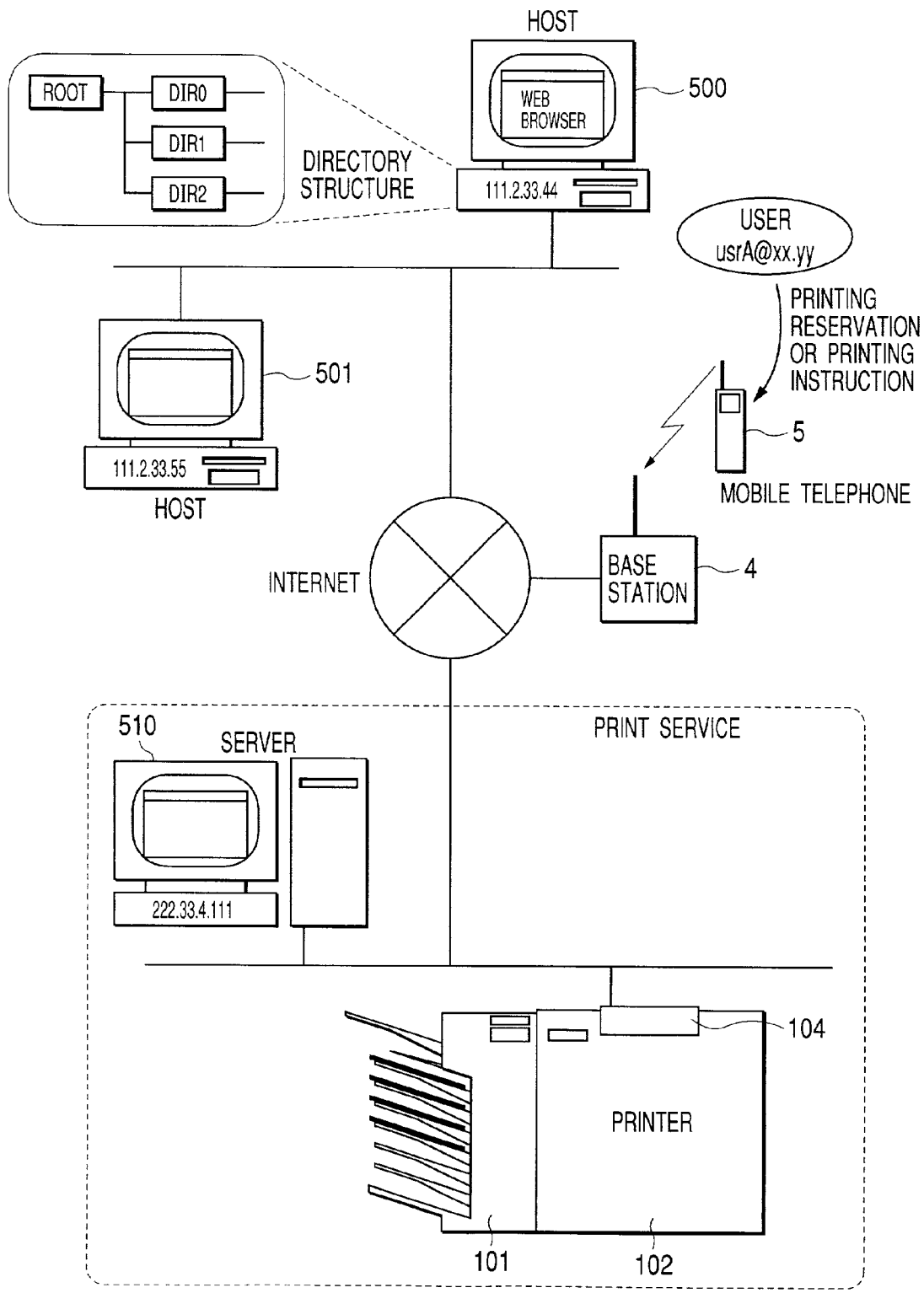
FIG. 50 shows a configuration of the system in which a user issues an instruction to perform or reserve a printing process from a portable terminal, and a printer performs a predetermined printing process at the instruction according to a ninth embodiment.

FIG. 50 is a conceptual diagram which describes a system configuration where a printing execution instruction or a printing reservation instruction is executed from a mobile terminal by a user, and a printer 102 executes a predetermined printing processing according to the instruction.

In FIG. 50, a printing execution instruction and a printing reservation instruction of a predetermined printing processing are issued by a user from a cellular phone 5 based on an image forming instruction file 20 and an image file 10 which are stored in a host 500 with "111.2.33.44." From the mobile phone 5, the instruction is notified to a printer 102 via a base station 4 and the Internet, and the printer 102 carries out a predetermined download processing or a printing processing as in each above-mentioned example.

In addition, as long as a mobile terminal is an apparatus that is possible to communicate with the base station 4, it may not necessarily be the mobile phone 5, and any means for communication may be used. Moreover, it goes without saying that a system where another external instrument is connected to the mobile terminal, and where a printing execution instruction or a printing reservation instruction is issued from the external instrument.

As mentioned above, in this example, a printing execution instruction or a printing reservation instruction may be issued without host 500, and it may also be issued from the mobile terminal. This means that the printing execution instruction or the printing reservation instruction may be issued from any location.

The Tenth Example

The tenth embodiment of this invention will be described on the basis of FIG. 51. In addition, the same symbol is attached for the same function as each above described example, and the description is omitted.

In the sixth example to the ninth example mentioned above, the server 510 configured in the same LAN as a printer 102 carried out a function as a server which manages a setup of a printer 102 etc. and provides a user with a print service by a Web browser etc.

In this example, a server which provides a user with a print service by a Web browser etc., or a server which manages a setup of a printer 102 etc. is configured in a different LAN from a printer 102.

Moreover, a server which provides each function may not be the same server. Furthermore, this system may be a system wherein the server providing a user with a print service via the Web browser etc. has functions as a relay server relaying a communications processing between a host 500 and a printer 102. And also in this system an image forming instruction file 20 and an image file 10 for which printing reservation was issued from a user by the host 500 may be downloaded into a storage area managed by the relay server, and the image forming instruction file 20 and the image file 10 may be downloaded from the relay server, and then a printing processing is executed by the printer 102 when a printing instruction is issued from the printer 102.

Figure 51:
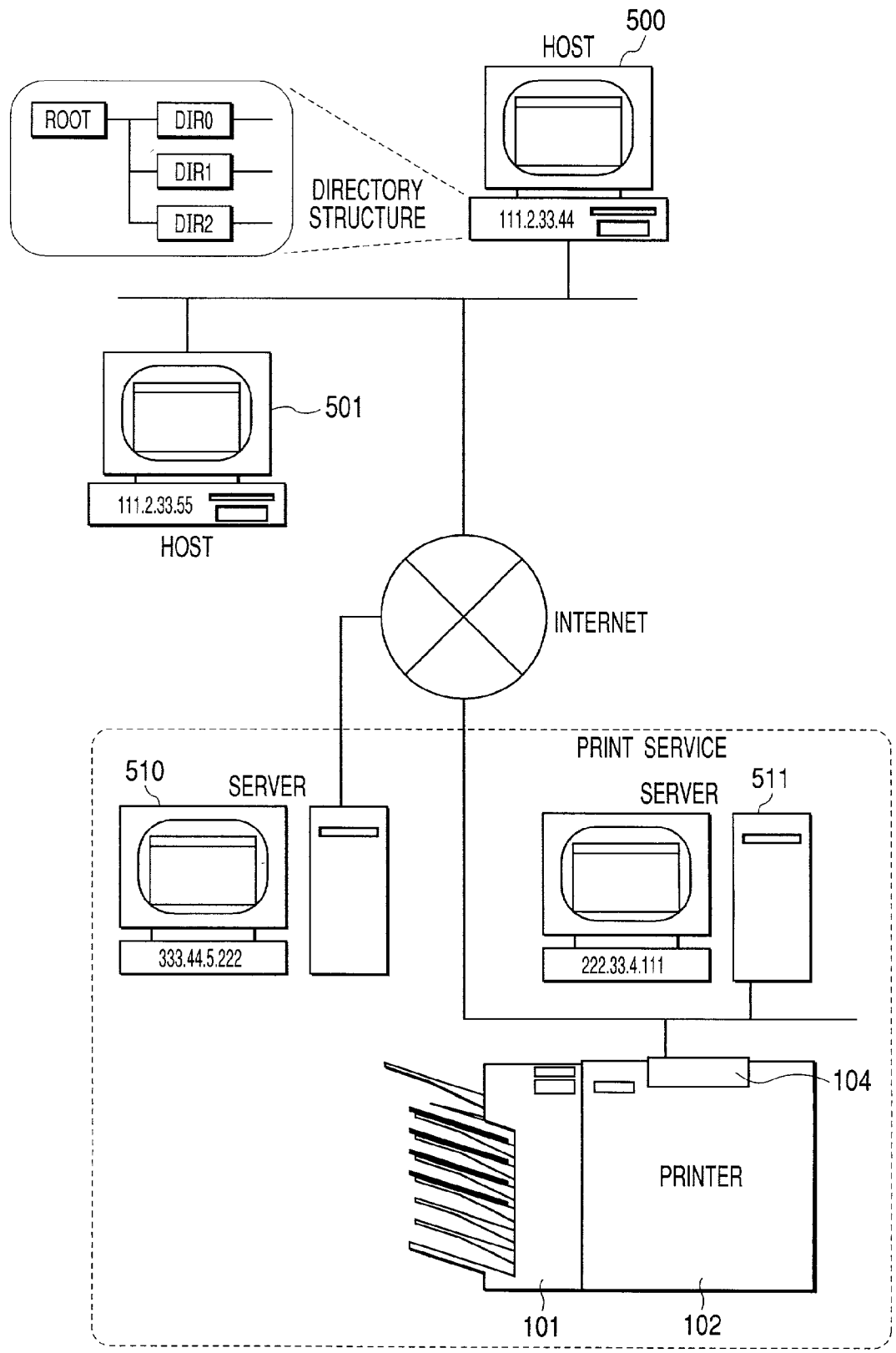
FIG. 51 shows a configuration of the system in which a server providing a print service is not configured in the same LAN as a printer according to a tenth embodiment.

FIG. 51 shows an example of a system configuration where a server offering a print service is not configured in the same LAN as a printer 102.

In FIG. 51, a server 510 with an IP address "333.44.5.222" which provides a user with a print service by the Web browser etc. is connected by communication with a printer 102 or a host 500 via the Internet, and has a function as a relay server which relays a communications processing between the host 500 and the printer 102.

In such a system, when the server 510 with "333.44.5.222" receives a printing reservation instruction from a user in the host 500 with "111.2.33.44", the server 510 downloads an image forming instruction file 20 and an image file 10 from the host 500 with "111.2.33.44", and stores them in a storage area which the server 510 manages.

When the user issues a printing instruction from the printer 102, the printer 102 downloads the user's image forming instruction file 20, and the user's image file 10 from the server 510 of "333.44.5.222", and executes a printing processing.

On the other hand, the server 511 with "222.33.4.111" which is configured in the same LAN as a printer 102, and manages a setup of the printer 102 etc. carries out a setup about an access to the relay server 510 with "333.44.5.222" and a setup of the paper discharge means at the time of printing, etc. for the printer 102.

As mentioned above when printing reservation is issued from the host 500 in this example, because the downloaded image forming instruction file 20 and the image file 10 are saved into a storage area managed by the server 510 for relay, a printing instruction may be issued by the user from another printer and an image output can also be carried out from the another printer even if a receiving location specified at the time of printing reservation is changed and a printing instruction is issued from the another printer.

The Eleventh Example

The eleventh embodiment of this invention will be described on the basis of FIG. 52. In addition, the same symbol is attached for the same function as each above described example, and the description is omitted.

In the sixth example to the tenth examples mentioned above, a printer 102 was configured to receive a printing request and a printing reservation request from a host 500 via a server or was managed by the server for printing setup etc.

Figure 52:
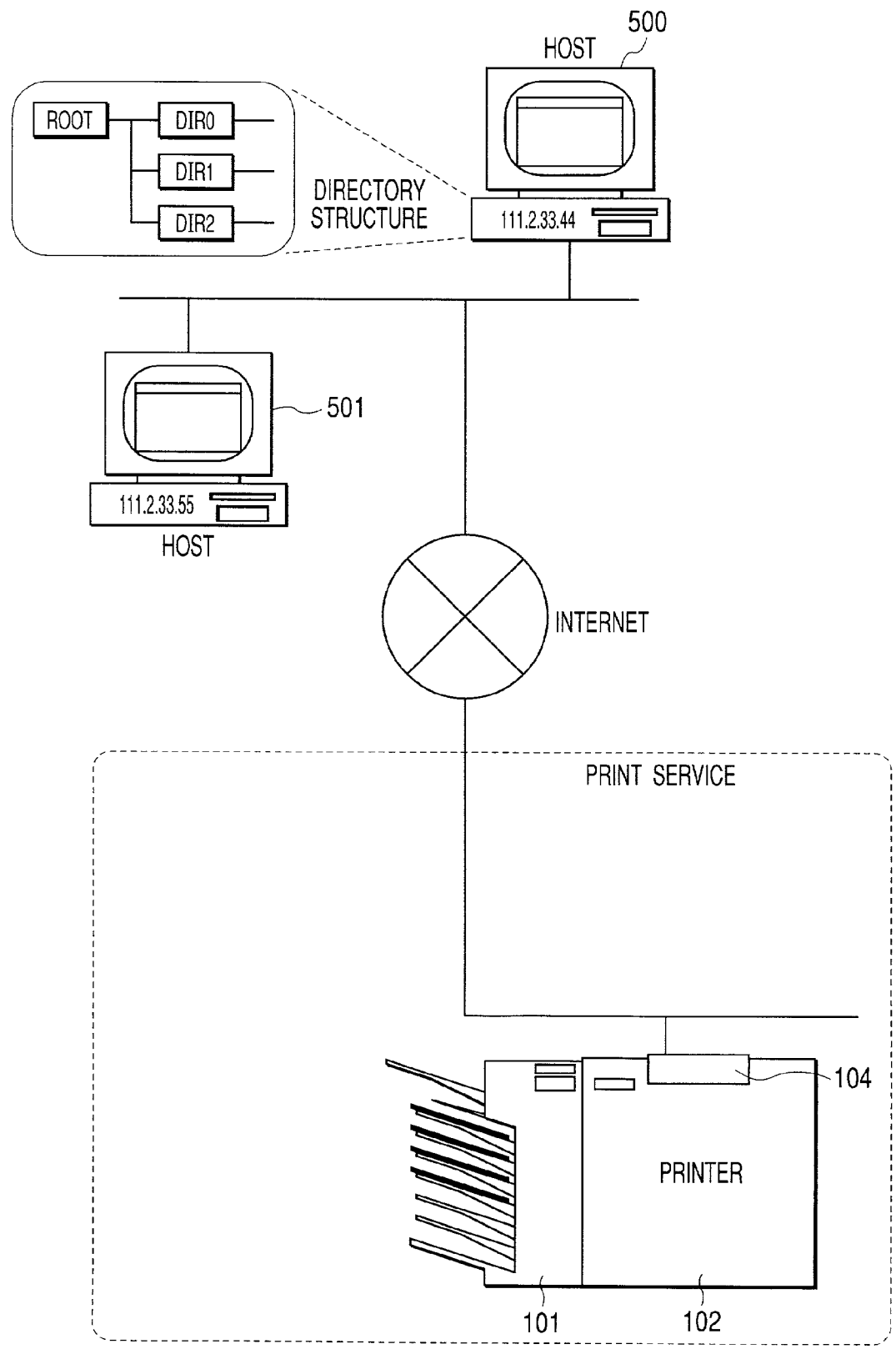
FIG. 52 shows the configuration of the system in which a printer has the function of receiving a print request and a print reservation request from a host computer, or managing a print setting process, etc. according to an eleventh embodiment of the present invention.

Here an example of a system is described wherein a printer itself has functions, such as a printing request from a host 500, and reception of a print reservation request or a management of a printing setup etc., and the system is configured not to have a server, as shown in FIG. 52.

As mentioned above, in this example, as it is unnecessary to install any server the cost of a system in a print service etc. may be reduced.

The Twelfth Example

The twelfth embodiment of this invention will be described. In addition, the same symbol is attached for the same portion as each above described example, and the description is omitted.

In the seventh and eighth examples mentioned above, when inputting a user ID, the account name and the e-mail address were used.

In this example, a system is configured where first an information storage medium, such as an ID card in which a predetermined ID information is memorized is inserted into a printer 102, and then user's identification is carried out according to contents being read out of the information storage medium inserted into the printer 102.

Moreover, not only a user ID but the information on host information, the storing directory of a image forming instruction file 20, etc. may be stored in the above described information storage medium, and a predetermined host and a predetermined directory may be accessed based on the information read by the printer 102.

Furthermore, in the above described storage medium, an image forming instruction file 20 itself may be stored. After the printer 102 reads the information stored in the medium, and accesses a predetermined host and a predetermined directory, it may automatically start a download processing of an image file 10 and a printing processing, according to the contents of the read out image creation file 20.

As mentioned above, since an ID card should just be inserted instead of a user ID or a password input, in this example, an operation by the user becomes simpler. Moreover, only a password input may always be required in order to be more secured.

The Thirteenth Example

The thirteenth embodiment of this invention will be described. In addition, the same symbol is attached for the same portion as each above described example, and the description is omitted.

In the sixth to the eighth examples mentioned above, a host information (ID account etc.) was to be specified at the time of a printing request by a user.

In this example, a system is shown where if a host information and a user information are able to be registered in a printer 102, the host information and the user information will be specified and registered only at the first time, and then in the case of a printing request from the second times or later, a host 500 can be accessed by the user who was registered beforehand automatically only by the user information, such as a user ID, being specified.

Thereby, when only a restricted printer is used in a print service, a printing instruction can be issued easily and conveniently.

Moreover, a system may be configured so that not only specified host information but information such as a storing location of the image generation instruction file 20 in the specified host, can be registered as contents of registration in a printer 102. According to this configuration, the increase in efficiency of a printing instruction is expectable for the user who saves an image generation instruction file 20 only into a restricted directory.

As mentioned above, in this example, it becomes possible by enabling registration of a user information to save time and effort of the user for the second use or later.

The Fourteenth Example

The fourteenth embodiment of this invention will be described. In addition, the same symbol is attached for the same function as each above described example, and the description is omitted.

In the eighth example mentioned above, when a storing location (directory) of an image generation instruction file 20 stored in a remote host 500 was specified by a user in a printer 102, all the paths from a specified host's root directory had to be inputted and specified.

In this example, a printer 102 is configured to have a function by which the specified host is accessed and a directory hierarchy can be displayed on a screen so that a user can retrieve a desired image forming instruction file 20 from the displayed root directory.

As mentioned above, in this example, since the host 500 with the image forming instruction file 20 is only to be specified, it becomes possible to save time and effort of input by the user at the time of a print request.

In addition, although each example mentioned above may be applied to an image pick-up apparatus such as a digital camera, it may also be applied to the system which comprises two or more apparatus (for example, a host computer, an interface apparatus, a reader, a printer, etc.), and moreover may be further applied to apparatus which consists of one apparatus (for example, a small image processing apparatus like a PDA (personal information management) apparatus, a copying machine, a facsimile apparatus).

Moreover, this invention cannot be overemphasized by the fact that the purpose of this invention is achieved by supplying a program to a system or an apparatus. And it becomes possible to enjoy the advantage of this invention even by the method in which a storage medium storing a program written by a software for achieving this invention is supplied to a system or an apparatus, and in which the program code stored in the storage medium by a computer (or CPU and MPU) of the system or an apparatus is read out and executed.

In this case, the function of embodiments mentioned above is to be realized by the program code itself read out from the storage medium, and the storage medium in which the program code is stored constitutes this invention.

As examples of storage medium for supplying a program code, a floppy disk, a hard disk, an optical disk, a magneto-optic disk, CD-ROM, CD-R, a magnetic tape, a nonvolatile memory card (IC memory card), ROMs (a mask ROM, flash EEPROM, etc.), etc. can be mentioned.

Moreover, the function of embodiments mentioned above is realized by way of the program code read out being executed by a computer. Furthermore, it goes without saying that in the invention a case is included where a part or all of actual processing is executed based on the instruction of the program code by OS (operating system) working on a computer and the function of embodiments mentioned above is realized by the processing.

Furthermore, it goes without saying that in the invention a case is included in which a part or all of actual processing is executed based on the instruction of the program code by CPU etc. equipped in an expansion board and an expansion unit, and the function of embodiments mentioned above is realized by the processing, after program codes read out from a storage medium is written into a memory equipped in the expansion board inserted into a computer and into the expansion unit connected to the computer.

As described above, according to this invention the following steps are adopted;

an image storage medium is used which has an image data, an image related attached information corresponding to the image data, and the printing instruction information that executes the printing instruction of this image data;

a desired classification identification information for classifying to two or more above described paper discharge trays is extracted out of the above described image related attached information stored in the above described image storage medium;

the extracted classification identification information is added to the image data along with printing instruction information, and then a printing job is generated;

then the contents of the classification identification information added to each generated printing job are analyzed;

classification of the image data is carried out based on the analyzed classification identification information; and the image data judged to be in the same classification by this classification is discharged to the same paper discharge tray.

Because the above described methods are adopted, the following advantages are realized;

whether or not a host computer exists, a printing instructions, such as paper discharge selection, can be carried out from the existing apparatus, such as a digital camera and a printing device, when a printing is executed from the information storage medium in external devices, such as the digital camera or from information storage media, such as a memory card; and an automatic paper discharge processing suitable for a user's needs can be realized, and it becomes possible that an increase is expectable in efficiency of various classification work, such as classification of the printed matter in individual exploitation, and classification for every client in print service activities.

As described above, according to this invention the following steps are adopted;

a specific attached information is added to data exchanged between a host apparatus and an image recording device;

the data of an image storage medium are read out by the host apparatus in an image recording system which executes an output control of an image;

an access is executed to the storing location of image related attached information based on a predetermined printing request;

an image related attached information is transmitted to an image recording device;

the transmitted image related attached information is analyzed based on a predetermined printing instruction;

an access is executed to the storing location of the desired image data based on the analyzed image related attached information;

the image data is transmitted to the image recording device;

a printing job is generated based on the transmitted image data; and a printing processing corresponding to the generated printing job is executed.

Because the above described steps are adopted, the following advantages are realized; for example, in the case of an extra copy request in a print service, information, such as an image data storing location, a print place, printing number of sheets, the paper discharge means, a reception method, and how to pay a charge, can be added, to an electronic information exchanged between an image recording device such as a printer and external devices, such as a personal computer, a mobile terminal and a digital camera, and then the information may be interpreted by the image recording device; and as a result any desired number of printing request may be issued even from user's own home or from anywhere.

Moreover, in the system in which the above described print service is possible, when a reception location is specified, the print may be received in the neighboring location in which the image recording device is installed, and in the neighborhood of the user's current location (a convenience store, a processing laboratory, personal computer shop, etc.), or may be requested for delivering by home delivery etc. Thus, reception can become possible in the location and by the means with sufficient convenience for a user, and time and effort of the client requesting a print service can be saved, and the service arrangement meeting a user's needs can be offered.

Furthermore, in the system in which the above described print service is possible, since all print instructions are stored in the form of an electronic information, the assistant who prints does not need to perform selection of an image etc. using a memorandum, as a result, time and effort of print work is saved, and it becomes possible to expect an increase in efficiency of a print service.

Furthermore, in the system in which the above described print service is possible, a printing instructions for paper discharge selection etc. can be carried out from the existing apparatus, such as a digital camera and a printer, even if an instruction is not issued from a host computer, in direct printing from the host computer on a network and from the storage unit on external devices, such as a digital camera, and in direct printing from storage media, such as a memory card. Therefore, a automatic paper discharge system suitable for a user's needs can be realized and an increase in efficiency can be expected in classification activities, such as in classification of the printed matter in individual use, and in classification for every client in print service activities.

What is claimed is:

1. An image recording apparatus, comprising:
   a recording unit adapted to record an image on a recording paper based on image data;
   a plurality of bins to which the recording papers are ejected;
   an attachment unit, adapted to attach a detachable memory to said image recording apparatus, the memory storing a plurality of image data and a plurality of attribute data corresponding to the plurality of image data, each attribute data having a plurality of attributes, each attribute including attribute information;

a designation unit, adapted to designate one attribute from among the plurality of attributes; and a determination unit, adapted to make a determination, based on the attribute information stored in the detachable memory included in the attribute designated by said designation unit, such that a plurality of recording papers on which a number of image data with the same attribute information are recorded are output to the same bin.

2. An apparatus according to claim 1, wherein the plurality of image data are obtained by a digital camera and the attribute information is added by the digital camera.

3. An apparatus according to claim 1, wherein the attribute includes a title.

4. An apparatus according to claim 1, wherein the attribute includes a photographing date.

5. An apparatus according to claim 1, wherein the attribute includes a destination user.

6. An image recording apparatus for connection with a recording unit that records an image on a recording paper based on image data and a plurality of bins to which the recording papers are ejected, said image recording apparatus comprising:

a read unit, adapted to read attribute data from a memory storing a plurality of image data and a plurality of attribute data corresponding to the plurality of image data, wherein each attribute data has a plurality of attributes and each attribute includes attribute information;

a designation unit, adapted to designate one attribute from among the plurality of attributes; and a determination unit, adapted to make a determination, based on the attribute information read by said read unit included in the attribute designated by said designation unit, such that a plurality of recording papers on which a number of image data with the same attribute information are output to the same bin.

7. An apparatus according to claim 6, wherein the plurality of image data are obtained by a digital camera and the attribute information is added by the digital camera.

8. An apparatus according to claim 6, wherein the attribute includes a title.

9. An apparatus according to claim 6, wherein the attribute includes a photographing date.

10. An apparatus according to claim 6, wherein the attribute includes a destination user.

11. A method of determining a paper output port, comprising:

a recording step of recording an image on a recording paper based on image data;

a step of reading, from a memory storing a plurality of image data and a plurality of attribute data corresponding to the plurality of image data, wherein each attribute data has a plurality of attributes and each attribute includes attribute information;

a step of designating one attribute from among the plurality of attributes; and a step of making a determination, based on the attribute information stored in the detachable memory included in the attribute designated in said designation step, such that a plurality of recording papers on which a number of image data with the same attribute information are recorded are output to a same bin of a plurality of bins to which the recording papers are ejected.

12. A method according to claim 11, wherein the plurality of image data are obtained by a digital camera and the attribute information is added by the digital camera.

13. A method according to claim 11, wherein the attribute includes a title.

14. A method according to claim 11, wherein the attribute includes a photographing date.

15. A method according to claim 11, wherein the attribute includes a destination user.

16. A program stored on a computer-readable medium, comprising:

a step of reading, from a memory storing a plurality of image data and a plurality of attribute data corresponding to the plurality of image data, the plurality of image data wherein each attribute data has a plurality of attributes and each attribute includes attribute information;

a step of designating one attribute from among the plurality of attributes; and a step of making a determination, based on the attribute information read in said reading step included in the attribute designated in said designating step, such that a plurality of recording papers on which a number of image data with the same attribute information are recorded are output to a same bin of a plurality of bins to which the recording papers are ejected.

17. A program stored on a computer-readable medium according to claim 16, wherein the plurality of image data are obtained by a digital camera and the attribute information is added by the digital camera.

18. A program stored on a computer-readable medium according to claim 16, wherein the attribute includes a title.

19. A program stored on a computer-readable medium according to claim 16, wherein the attribute includes a photographing date.

20. A program stored on a computer-readable medium according to claim 16, wherein the attribute includes a destination user.

* * * * *

UNITED STATES PATENT AND TRADEMARK OFFICE
CERTIFICATE OF CORRECTION

| | | |
|---|---|---|
| PATENT NO. | : 7,106,461 B2 | |
| APPLICATION NO. | : 09/908696 | |
| DATED | : September 12, 2006 | |
| INVENTOR(S) | : Nobuyoshi Kakigi et al. | |

It is certified that error appears in the above-identified patent and that said Letters Patent is hereby corrected as shown below:

DRAWINGS:
Sheet 5, Figure 5, "RELATIVE PASS OF IMAGE FILE" should read -- RELATIVE PATH OF IMAGE FILE --;
Sheet 7, Figure 7, "RECODING" should read -- RECORDING --;
Sheet 11, Figure 11, "CONTORLLER" (both occurrences) should read -- CONTROLLER --;
Sheet 11, Figure 11, "CHANEGED" should read -- CHANGED --; and
Sheet 12, Figure 12, "POTION" should read -- OPTION --.

Figure 53A:
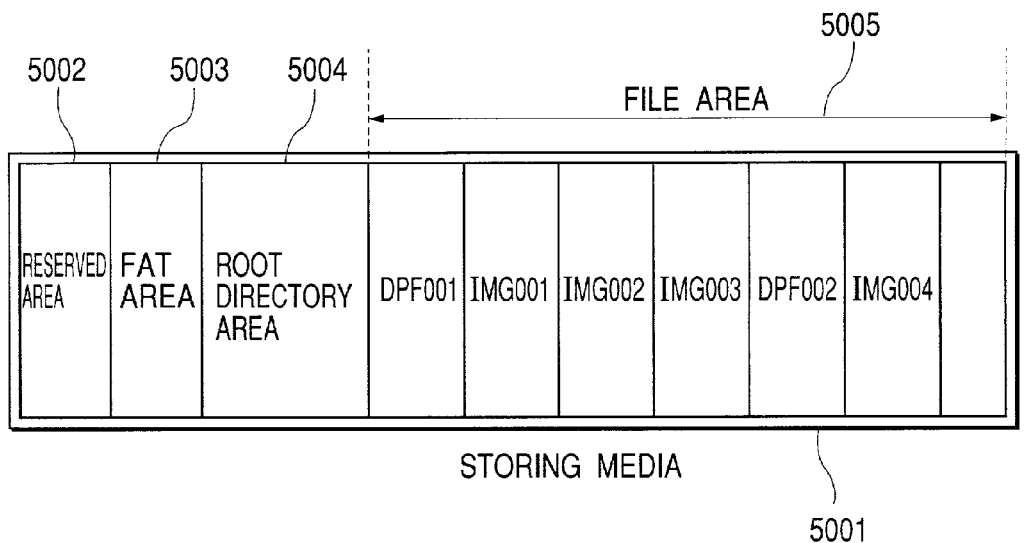
FIGS. 53A, 53B and 53C show a conventional technology, and shows an example of the configuration of the storage medium as an information storage medium.
Figure 53B:
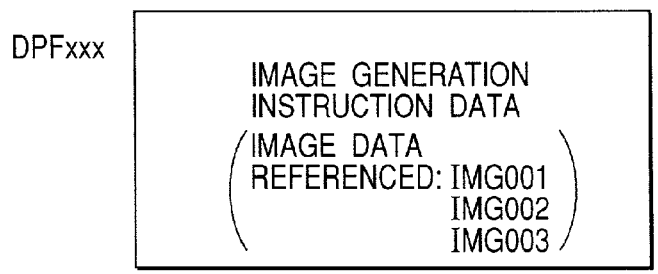
Figure 53C:
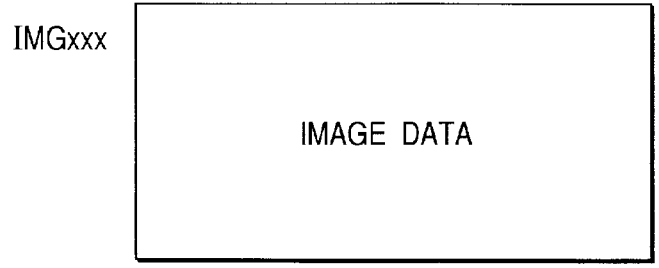
Figure 54:
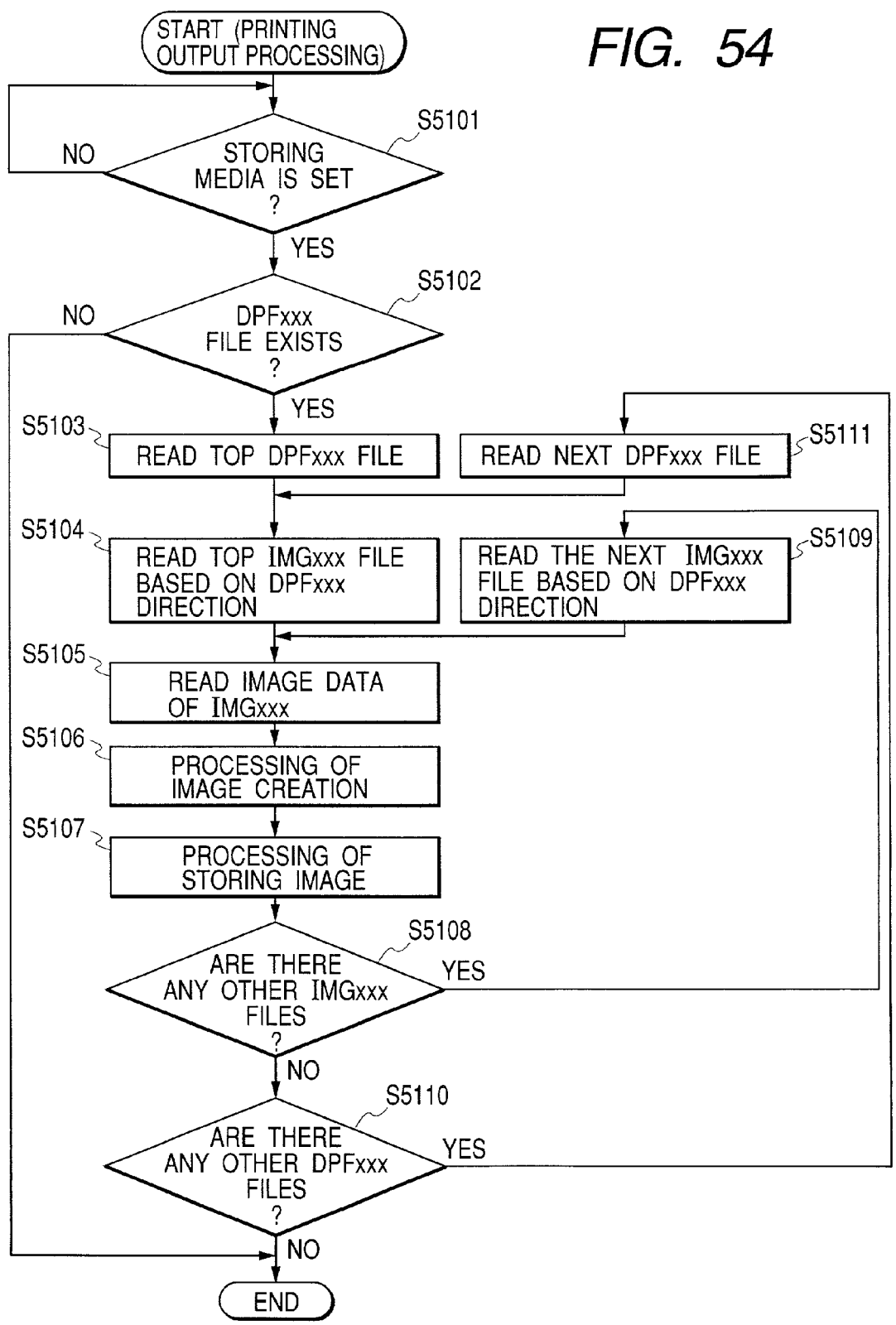
FIG. 54 shows a conventional technology, and is a flowchart of the procedure of a print control process in which a desired print image is generated and output using the image data recorded in a storage medium.

COLUMN 2:
Line 44, "FISG. 53A" should read -- FIGS. 53A --.

COLUMN 3:
Line 67, "user prints," should read -- user print --.

COLUMN 7:
Line 5, "detained" should read -- detailed --.

COLUMN 8:
Line 14, "hose" should read -- host --.

COLUMN 10:
Line 41, "forth" should read -- fourth --.

COLUMN 14:
Line 57, "on" should read -- or --; and
Line 66, "instruction" should read -- instructing --.

COLUMN 15:
Line 60, "flush" should read -- flash --; and
Line 61, "flush," should read -- flash, --.

COLUMN 20:
Line 18, "pass" should read -- path --.

COLUMN 24:
Line 37, "and" should read -- and is --.

UNITED STATES PATENT AND TRADEMARK OFFICE
CERTIFICATE OF CORRECTION

PATENT NO. : 7,106,461 B2
APPLICATION NO. : 09/908696
DATED : September 12, 2006
INVENTOR(S) : Nobuyoshi Kakigi et al.

It is certified that error appears in the above-identified patent and that said Letters Patent is hereby corrected as shown below:

COLUMN 25:
Lines 22 and 25, "paper S" should read -- paper 8 --;
Line 56, "in" should read -- on --; and
Line 67, "papers S" should read -- papers 8 --.

COLUMN 26:
Line 1, "numeral 213" should read -- numeral 213S --;
Line 19, "flush," should read -- flash, --;
Line 40, "paper S" should read -- paper 8 --;
Line 41, "covey" should read -- conveying --;
Line 41, "coveys" should read -- conveys --;
Line 42, "paper S" should read -- paper 8 --;
Line 50, "numeral 241" should read -- numeral 241S --; and
Line 52, "paper S" should read -- paper 8 --.

COLUMN 27:
Line 6, "detention" should read -- detection --; and
Line 34, "251" should read -- 281 --.

COLUMN 28:
Line 3, "covey" should read -- conveying --; and
Line 47, "seed" should read -- speed --.

COLUMN 29:
Line 4, "the/CCRT" should read -- the /CCRT --;
Line 10, "became" should read -- becomes --;
Line 11, "/DYR signal became" should read -- /RDY signal becomes --; and
Line 17, "became" should read -- becomes --.

COLUMN 30:
Line 12, "CPU409." should read -- CPU 409. --;
Line 15, "POUTT93," should read -- POUTT 93, --;
Line 16, "PFEDT94" should read -- PFEDT 94 --; and
Line 16, "SPCNG95" should read -- PCNG 95 --.

COLUMN 32:
Line 49, "link" should read -- links --; and
Line 58, delete " "Release flag" ".

UNITED STATES PATENT AND TRADEMARK OFFICE
CERTIFICATE OF CORRECTION

PATENT NO. : 7,106,461 B2
APPLICATION NO. : 09/908696
DATED : September 12, 2006
INVENTOR(S) : Nobuyoshi Kakigi et al.

It is certified that error appears in the above-identified patent and that said Letters Patent is hereby corrected as shown below:

COLUMN 33:
Line 34, "RAM407." should read -- RAM 407. --;
Line 42, "during" should read -- when --;
Line 43, " "FAISE" " should read -- FALSE --;
Line 43, "/DFY" should read -- /RDY --; and
Line 51, "a" should read -- an --.

COLUMN 34:
Line 22, "ROM 440" should read -- ROM 404 --;
Line 58, "TRUE→FAISE," should read -- TRUE→FALSE, --; and
Line 59, "an" should read -- a --.

COLUMN 35:
Line 56, "U1" should read -- UI --.

COLUMN 36:
Line 3, "name" should read -- name is --.

COLUMN 37:
Line 53, "called," should read -- called --.

COLUMN 39:
Line 27, " "2000.04.2 2" " should read -- "2000.04.22" --.

COLUMN 41:
Line 21, "to" should read -- to a --; and
Line 27, " "000-0001" " should read -- "000-0001", --.

COLUMN 42:
Line 29, "mode" should read -- modes --; and
Line 41, "detailed-classification" should read -- detailed classification --.

COLUMN 44:
Line 66, "date" should read -- data --.

COLUMN 46:
Line 59, "these process" should read -- these process steps --.

COLUMN 49:
Line 48, "title" should read -- title, --.

UNITED STATES PATENT AND TRADEMARK OFFICE
CERTIFICATE OF CORRECTION

PATENT NO. : 7,106,461 B2
APPLICATION NO. : 09/908696
DATED : September 12, 2006
INVENTOR(S) : Nobuyoshi Kakigi et al.

It is certified that error appears in the above-identified patent and that said Letters Patent is hereby corrected as shown below:

COLUMN 52:
Line 25, "host's" should read -- host --; and
Line 54, "notified" should read -- notified of --.

COLUMN 54:
Line 31, " "1999. 12.31", " should read -- "1999.12.31", --; and
Line 41, "unit," should read -- unit --.

COLUMN 56:
Line 54, "image" should read -- images --.

COLUMN 58:
Line 30, "head" should read -- header -- and
Line 45, "name" should read -- names --;

COLUMN 59:
Line 40, "down load" should read -- download --.

COLUMN 60:
Line 4, "102" (first occurrence) should read -- 500 --; and
Line 60, "notified" should read -- notified of --.

COLUMN 61:
Lines 20 and 22, "carried" should read -- carried out --; and
Line 48, "with" should read -- with IP address --.

COLUMN 62:
Lines 41, 43, 45, 52 and 55, "with" should read -- with IP address --;
Line 50, "of" should read -- of IP address --; and
Lines 65 and 67, "another" should read -- other --.

COLUMN 65:
Line 15, "is" should read -- are --;
Lines 19 and 55, "adopted;" should read -- adopted: --; and
Line 40, "realized;" should read -- realized: --.

UNITED STATES PATENT AND TRADEMARK OFFICE
CERTIFICATE OF CORRECTION

PATENT NO. : 7,106,461 B2
APPLICATION NO. : 09/908696
DATED : September 12, 2006
INVENTOR(S) : Nobuyoshi Kakigi et al.

It is certified that error appears in the above-identified patent and that said Letters Patent is hereby corrected as shown below:

<u>COLUMN 66</u>:
Line 11, "realized;" should read -- realized: --;
Line 15, "added," should read -- added --;
Line 21, "request" should read -- requests --;
Line 43, "instructions" should read -- instruction --; and
Line 50, "a" should read -- an --.

Signed and Sealed this

Third Day of April, 2007

JON W. DUDAS
*Director of the United States Patent and Trademark Office*